(12) United States Patent
Lev

(10) Patent No.: US 7,575,171 B2
(45) Date of Patent: Aug. 18, 2009

(54) SYSTEM AND METHOD FOR RELIABLE CONTENT ACCESS USING A CELLULAR/WIRELESS DEVICE WITH IMAGING CAPABILITIES

(76) Inventor: Zvi Haim Lev, 20 Wisotzky Street, Apartment 1, Tel Aviv (IL) 62338

( * ) Notice: Subject to any disclaimer, the term of this patent is extended or adjusted under 35 U.S.C. 154(b) by 252 days.

(21) Appl. No.: 11/468,504

(22) Filed: Aug. 30, 2006

(65) Prior Publication Data
US 2007/0175998 A1 Aug. 2, 2007

Related U.S. Application Data

(60) Provisional application No. 60/712,811, filed on Sep. 1, 2005.

(51) Int. Cl.
*G06K 7/10* (2006.01)
(52) U.S. Cl. .................. 235/470; 382/154; 705/27
(58) Field of Classification Search .......... 235/470; 382/154; 705/27
See application file for complete search history.

(56) References Cited

U.S. PATENT DOCUMENTS

| | | | |
|---|---|---|---|
| 5,455,875 A | 10/1995 | Chevion et al. | |
| 5,579,471 A | 11/1996 | Barber et al. | |
| 5,926,116 A | 7/1999 | Kitano et al. | |
| 6,055,536 A | 4/2000 | Shimakawa et al. | |
| 6,192,360 B1 | 2/2001 | Dumais et al. | |
| 6,286,036 B1 | 9/2001 | Rhoads | |

(Continued)

OTHER PUBLICATIONS

Ismail Haritaoglu: "InfoScope: Link from Real World to Digital Information Space", Proceedings. Lecture Notes in Computer Science, vol. 2201—Spring, 201: Gregory D. Abowd, Barry Brummitt, Steven A. Schaefer (Eds.), Ubicomp 2001: Ubiquitous Computing Third International Conference, Atlanta, Georgia, USA, Sep. 30-Oct. 2, 2001, pp. 247-255, ISBN: 3-540-42614-0.
International Search Report, dated Jul. 31, 2008.

*Primary Examiner*—Michael G Lee
*Assistant Examiner*—Kristy A Haupt
(74) *Attorney, Agent, or Firm*—Sughrue Mion, PLLC

(57) ABSTRACT

A system and method for reliable content access using a cellular/wireless device with imaging capabilities, to use part of a printed or displayed medium for identifying and using a reference to access information, services, or content related to the reference, including capturing an image of the reference with an imaging device, sending the image via a communications network to a processing center, pre-processing to identify relevant frames within the image and to perform general purpose enhancement operations, detecting the most relevant frame within the image, and frame properties, applying geometric, illumination, and focus correction on the relevant frame, using color, aspect ration, and frame color, to perform a coarse recognition and thereby limit the number of possible identifications of a reference within the relevant frame, and using specific techniques of resealing, histogram equalization, block labeling, edge operation, and normalized cross correlation, to identify the reference within the image.

21 Claims, 45 Drawing Sheets

U.S. PATENT DOCUMENTS

| | | |
|---|---|---|
| 6,577,755 B1 | 6/2003 | Lorie |
| 6,651,053 B1 | 11/2003 | Rothschild |
| 6,687,421 B1 | 2/2004 | Navon |
| 6,687,697 B2 | 2/2004 | Collins-Thompsn et al. |
| 6,690,407 B1 | 2/2004 | Parker et al. |
| 6,753,883 B2 | 6/2004 | Schena et al. |
| 6,766,363 B1 | 7/2004 | Rothschild |
| 7,016,532 B2 | 3/2006 | Boncyk et al. |
| 7,058,689 B2 | 6/2006 | Parker et al. |
| 7,121,469 B2 * | 10/2006 | Dorai et al. .................. 235/470 |
| 2002/0019784 A1 | 2/2002 | Ritz |
| 2002/0090132 A1 * | 7/2002 | Boncyk et al. .............. 382/154 |
| 2002/0102966 A1 * | 8/2002 | Lev et al. .................... 455/412 |
| 2002/0156866 A1 | 10/2002 | Schneider |
| 2002/0165801 A1 * | 11/2002 | Stern et al. .................... 705/27 |
| 2005/0011957 A1 | 1/2005 | Attia et al. |
| 2005/0050165 A1 | 3/2005 | Hamynen |
| 2005/0185060 A1 * | 8/2005 | Neven ..................... 348/211.2 |
| 2005/0261990 A1 * | 11/2005 | Gocht et al. ................. 705/27 |

* cited by examiner

SYSTEM AND METHOD FOR RELIABLE CONTENT ACCESS USING A CELLULAR/WIRELESS DEVICE WITH IMAGING CAPABILITIES

CROSS-REFERENCE TO RELATED APPLICATIONS

This application claims the benefit of U.S. Provisional Application Ser. No. 60/712,811, filed Sep. 1, 2005, entitled, "System and method for reliable content access using a cellular/wireless device with imaging capabilities", which is incorporated herein by reference in its entirety.

BACKGROUND OF THE EXEMPLARY EMBODIMENTS OF THE PRESENT INVENTION

1. Field of the Exemplary Embodiments of the Present Invention

The exemplary embodiments of the present invention relate generally to the field of interactive advertising, content download and related applications. In the exemplary embodiments of the present invention, the trigger for effecting an operation of information inquiry or content download is the user taking a picture/video shot of printed/displayed object which is graphical in nature, rather than material which is simply "machine readable" code.

The embodiments described herein are illustrative and non-limiting. Definitions are provided solely to assist one of ordinary skills in the art to better understand these illustrative, non-limiting embodiments. As such, these definitions should not be used to limit the scope of the claims more narrowly than the plain and ordinary meaning of the terms recited in the claims. With that caveat, the following definitions are used:

"Activation mechanism" refers to the method that activates the recognition of a "symbol" (defined below) of the "link" (defined below). Links are typically supplied by a publisher with some selection mechanism, which activates the detection of link's "frame" (defined below) recognition of the symbol inside the link's frame. There are many types of activation mechanisms include, among others, pressing a button on the imaging device, zooming on the link, or voice activation.

"Banner" means any printed object surrounded by a "frame" (defined below), which is to be activated by the user in an imaging operation.

"Computational facility" means any computer, combination of computers, or other equipment performing computations, that can process the information sent by the imaging device. Some examples would be the local processor in the imaging device, a remote server, or a combination of the local processor and the remote server.

"Content" is a service or information prepared by the publisher and associated with the link and available to the imaging device user via activation mechanism of the link. For example, if a publisher has placed an image of an actor on a webpage, then the user pressing a button on an imaging device while taking a picture of the actor results in display of actor's biography or a coupon to his latest movie.

"Displayed" or "printed", when used in conjunction with an imaged document, is used expansively to mean that an object to be imaged is captured on a physical substance (as by, e.g., the impression of ink on a paper or a paper-like substance, or by embossing on plastic or metal), or is captured on a display device (such as LED displays, LCD displays, CRTs, plasma displays, ATM displays, meter reading equipment or cell phone displays).

"Form" means any document (printed or displayed) where certain designated areas in this document are to be filled by handwriting or printed data. Some examples of forms are a typical printed information form where the user fills in personal details, a multiple choice exam form, a shopping webpage where the user has to fill in details, and a bank check.

"Frame" is some easily recognizable feature surrounding a symbol. Typically the frame is a rectangular color box around an icon or an image. However, frame may also be non-rectangular (e.g., cloud shape or hand-written closed line), non-connected (e.g., dash-line or corners markers), not colored (e.g., using page background colors, or texture), or differing in other ways from a rectangular color box around an icon or image. Moreover, the frame, in the sense referred to in these exemplary embodiments of the present invention, need not surround the symbol (that is to say, the frame itself can be another small easily recognizable symbol, such as a computer mouse "arrow" icon, on a predefined offset from the symbol of interest).

"Image" means any captured view or multiplicity of captured views of a specific object, including, e.g., a digital picture, a video clip, or a series of images.

"Image recognition" means an array of algorithms for recognizing various objects in images and video data. These algorithms include, among others, optical character recognition (OCR), optical mark recognition (OMR), barcode recognition, alphanumeric data detection, logo and graphical symbols recognition, face recognition, and recognition of special marks.

"Imaging device" means any equipment for digital image capture and sending, including, e.g., 3G videophones, a PC with a webcam, a digital camera, a cellular phone with a camera, a videophone, or a camera equipped PDA, video conferencing device, a personal computer tethered to a camera, or a laptop with 3G modem card. Note that the imaging device may be digital, or may be analog (such as a TV-camera with a Frequency Modulated link), as long as the imaging device is connected to the computational facility.

"Link" is a symbol logically associated with some data or operation. Typically, selecting a symbol of the link activates dedicated software on the computational facility, resulting in the user receiving service associated with the symbol of the link.

"Network connectivity" means a connection to a one-to-one or one-to-many data transmission network. Examples of the transmission network to which connectivity might be applied include a wireless 2G or 3G network, the Internet, an Ethernet network, and a private data network (where the private data network might be used, e.g., for security purposes). The connectivity could be achieved in any number of ways, including, e.g., wireless communication, cable, an Infrared connection, Bluetooth, a USB connection, a Firewire connection, or a WiFi link.

"Publisher" means a person or organization responsible for content preparation, including designing an object on which a link appears. Typically a publisher designs a page with symbols acting as links to some predefined information, updates the services considered by these exemplary embodiments of the present invention, and distributes the page with the links to the potential users of imaging devices.

"Symbol" refers to some well defined and recognizable object and/or feature that is visible to the imaging device. Typically symbols appear in the form of logos, icons or thumbnails, as a part of a designed page. In printed media symbols may be part of page design, and in displayed media symbols may be part of a webpage. A symbol may also be any text or graphical object or handwritten mark. A symbol may be printed on a 3D object (e.g., a shirt), or may be any other objects visible by the imaging device. In these exemplary embodiments of the present invention, "machine readable" symbols are those which are optimized for decoding by specific machinery, cannot be easily understood by a human observer, and must be forcefully introduced into the page design from "natural symbols". In contrast, the "natural symbols" are those which may be easily recognized by a human and are naturally integrated into the page design.

"User" refers to the imaging device user. The imaging device user may be a human user, or an automated or semi-automatic system. An automated or semi-automatic system could be, e.g., a security system, which could be fully automated (meaning without direct human intervention) or semi-automatic (meaning that the system would be tied directly to specific people or to specific functions conducted by humans).

"Video call" means two-way and one-way video calls, including, e.g., calls performed via computers with webcams. Any connection performed by an imaging device with a data connection and with video capture and sending capabilities, could be included with the definition of "video call". The video call is performed from a user to a computational facility, which takes actions according to the video data. Examples of video call protocols are the H.323 and 3G-324M video conferencing protocols, the IMS/SIP standard, and the proprietary protocols used in some software video conferencing clients (CuSeeMe, Skype, etc.).

"Video data" is any data that can be encapsulated in a video format, such as a series of images, streaming video, video presentation, or film.

2. Description of the Related Art

One of the most powerful features of the Internet as a medium for browsing and information retrieval is the ability to connect every piece of graphics or text in a web page to a new link or URL. This feature also applies just as well to browser based information from other data sources (a data source which might be, e.g., a Corporate Intranet). This ability to connect gives the user great control and ability to navigate between subjects, and to make choices and create new information, all of this without any typing (that is, just by pointing and clicking).

On the printed media and on static displayed media (i.e., a TV screen, a DVD player screen, or a computer screen where the user has no access to a keyboard/mouse), such capabilities do not exist. (Such printed and static display media will be referenced as "passive media".) This is a problem in the use of passive media. In order to ameliorate this problem, many different and interesting technologies have evolved in the recent decade to try and provide a "browsing-like experience" for these passive media. Some of those known technologies, in the form of systems and methods, are:

System 1: A system where each object in the printed medium is tagged with a unique numeric code. This code can by typed or read into the system by the user, and then used to access the related information. Such a technology has been promoted by a company called MobileSpear, Ltd, and also by companies such as Bango.net Limited.

System 2: A system where standard well-known, or possibly standardized, machine readable code, such as, e.g., a one-dimensional UPC barcode, has been added next to printed material. In this case, the user may use a standard barcode reader or other imaging device to read/scan the code. The system then utilizes a connection of this reader or device to a data transmission device, so that information related to the scanned code may be retrieved. This system and method are promoted by companies such as Airclic, Neomedia, and Scanbuy.

System 3: A system utilizing special or proprietary machine readable codes in a similar manner to System 2, the main difference from System 2 being that these new codes are smaller, more robust, have stronger visual appeal, are easier to spot, and/or are more easy to decode by devices the users may have in their possession. That is, the specific encoding method used in these codes has been optimized for the constraints and requirements of the specific machine decoding hardware and software utilized by the users. For example, if the device used to image the code is a mobile handset with imaging capabilities, then there will be a specific coding method for that specific type of device. There exist many different implementations of this sort, a few of which are:

Implementation 1 of System 3: QR codes are two dimensional barcodes developed by Denso-Wave of Japan, used by most Japanese cellular phones.

Implementation 2 of System 3: Semacodes are different two dimensional barcodes designed for easy decoding by present day Western camera phones. This technology is developed by a company called Semacode, Inc.

Implementation 3 of System 3: Watermarks are two dimensional machine codes that are encoded using low intensity spread spectrum variations on the initial image, and which may be decoded using low quality digital imaging devices. Unlike the previously described machine codes, watermarks generally are not visible to the naked eye. Such a system has been developed by, among others, Digimarc, Inc.

All of the systems described above share the following key drawbacks:

Drawback 1: Due to the very many different possible data encoding methods, it is hard for the content publisher to decide which system to incorporate into the printed displayed content. Obviously, trying to accommodate all the different methods is impractical, as most of the visible "page" would be taken by the different machine readable codes.

Drawback 2: The visible machine readable codes present a visually non-appealing concept, and interfere with the graphic design of the content, as well as taking up valuable space on the page/screen.

Drawback 3: The non-visible codes (that is, watermarks as described above) require high quality printing/display and take relatively large areas (e.g., half or all of a whole page) for reliable encoding. Furthermore, since they are non-visible, it is hard for the user to know if these codes exist in a specific page and where to aim the scanner/phone/camera in order to scan these codes.

Drawback 4: The required alterations (adding codes and/or watermarks) to the content imply that this "linking" process must take place during the content preparation, and that certain rules must be kept while printing/distributing the content. For example, bar codes cannot be decoded if they are on the fold area of a newspaper/magazine, and/or if they are on glossy paper. (Watermarks on an advertisement will be decodable if printed on the high quality high density glossy printing used in magazines, but not if the same advertisement is printed in a regular newspaper.) Furthermore, it is impossible to "link" content which has been printed in the past before the incorporation of the chosen new codes.

Drawback 5: In most of these systems, there are uncertainties related to intellectual property issues, including whether royalties for use of the system should be paid, and if so to whom. These issues all stem from the use of special machine codes that have been developed and patented by some entities. Thus, there is a great preference to being able to decode printed/displayed content without requiring any alterations to the content.

A company called Mobot, Inc., claims to have developed technology which allows the scanning/decoding of full page ads from a high quality magazine. This technology has the following drawbacks:

Drawback 1 of Mobot technology: Since only full page color magazine pages can be used, a large portion of the print media (newspapers, black and white publications, tickets, packaging, labels, envelopes, etc.) cannot be used, and similarly content displayed on a screen cannot be used.

Drawback 2 of Mobot technology: Since only a whole page is used, it is impossible for the user to select a specific part of the page. Hence, small advertisements, or different sections of an article/picture/advertisement, cannot be used. This limitation is equivalent to having only one clickable URL per Web page on the Internet, and makes the entire approach commercially unattractive.

Drawback 3 of Mobot technology: Often a page in a magazine/newspaper would include more than just the link symbol, with the result that even if other objects on the page are not to be linked, the user will not understand which link on the page he or she is currently activating.

Drawback 4 of Mobot technology: When a whole page is used, in many cases the user will take a picture which contains just a part of the page for convenience reasons (e.g., the magazine is on a table, or the user is sitting and does not wish to get far from the medium to image whole page). Then, in a setting where many advertisements are already in the database, it may become even more difficult, really impossible, to differentiate between a photo of a part of one page and a photo of part of a different page. For example, imagine the user taking a picture of the part of a page containing a corporate logo and some uniform colored background, as would often appear at the bottom of many advertisements. This kind of photo could be generated from many different advertisements of the same company, and thus one could not know which advertisement specifically the user is looking at.

Some notable examples of systems utilizing machine readable codes include:

Example 1: Proprietary "machine code" readers, such as a product known as "the CueCat".

Example 2: Standard barcode readers such as those manufactured by Symbol, Inc.

Example 3: Still digital cameras, and tethered or web cameras. These provide high quality images, and are thus especially suitable for watermark scanning. Such web cameras are used by companies such as Digimarc for decoding watermarks.

Example 4: Portable imaging devices such as cellular phones with cameras, PDAs with cameras, or WiFi phones with cameras. These devices have the great advantage of being portable and of having a wireless data transmission capability. Thus, the user can access the content in a great variety of locations and while using a personal device carried with the user at all times.

SUMMARY OF EXEMPLARY EMBODIMENTS OF THE INVENTION

The exemplary embodiments of the present invention, which can utilize existing user-owned devices (e.g., webcams, camera phones), have a great advantage in practical terms over related art approaches requiring new and/or special purpose equipment. The need to support a wide range of different imaging devices presents great technical difficulties in the image identification stage, which the exemplary embodiment of the present invention solve for the first time.

The exemplary embodiments of the present invention fulfill the need of the user to access information/services/content simply by just pointing the portable imaging device at the desired section of the printed page/TV or computer screen. Unlike present methods, the system described in the exemplary embodiments of the current invention work with everyday drawings/photos/symbols/icons, and does not assume or necessitate the utilization of specially prepared "machine readable" marks. By eliminating the need or special marks, the exemplary embodiments of the present invention are radically different from present day systems. However, the exemplary embodiments of the present invention do require that these marks or icons be entered a-priori into a proper database, with specific instructions (which may change over time, or depending on user location, or depending on user profile, or for any other reason) on what service/content to provide when they are accessed.

The exemplary embodiments of the present invention provide a method for using any printed or displayed picture as a link or identifier to a content or service. A user performs imaging of the picture using a digital imaging device. The image is then analyzed by image processing software to locate a "frame" which contains the picture. The location, size, and other properties of the frame are used to determine the scale, location, orientation, and illumination parameters, of the picture, and to assist in the recognition process. In the recognition process, the part of the image containing the picture is used to search in a database of such pictures. Once the picture is recognized using this database, the proper content or service is delivered to the user.

The usage of the frame, as opposed to a whole page, is a key ingredient of the system. Since the system of the exemplary embodiments of the current invention enable the precise determination of scale, orientation, gray scale levels, and color, the system of the exemplary embodiments of the current invention serves to greatly increase recognition reliability, and allows for the usage of traditional (or improved) machine vision technologies rather than relying on unproven image understanding techniques. The increase of recognition reliability is particularly important when imaging is done with mobile devices, and where the imaging is of small objects, both cases where the image is expected to be defocused and suffer from strong illumination and orientation variations.

At the same time, the utilization of the frame makes it far easier for the user to know that the picture is indeed connected to some content/service, and to know which part of the printed/displayed page the user should image.

A good analogy for the use of the framed picture would be "Banners" used in most modern HTML/Web pages. Such Banners typically include a small picture, graphics, or text. While there is a great variety in design of such Banners, users who have surfed the Internet for a while find them very easy to spot and identify, and have no problems "clicking" on them with the computer mouse to initiate some action. The exemplary embodiments of the present invention make any printed/displayed banner effectively equivalent to a Web Page Banner, with the user's imaging operation replacing the mouse click. It is important to stress that since almost any graphic design of a frame can be accommodated, under the exemplary embodiments of the current invention (but not under related art) it is possible to "activate", as banners, images that have already been printed and distributed. Thus, existing logos, stickers, cards, vouchers, etc., can be "activated" by adding them to the system database and adding content/services related to them.

Thus, the exemplary embodiments of the present invention achieve all the advantages of present day web page design to both the user and the publisher. The publisher, for example, may choose arbitrary design for the banners, use these banners for services or content which changes dynamically over time, and put many banners on a page with different sizes and locations related to their publishing price or expected popularity. The user intuitively knows how to identify such banners and how to image them easily. Furthermore, the familiar and convenient experience of Internet surfing and clicking is recreated. It should be stressed, however, that the content retrieved for the user and the systems used for that need not be connected to, or reliant upon, the Internet protocol and Internet web sites.

A previous U.S. patent application, incorporated herein by reference, by the same inventor, U.S. patent application Ser. No. 11/293,300, entitled "System and method of generic symbol recognition and user authentication using a communication device with imaging capabilities" invented by Zvi Haim Lev and filed on the 5$^{th}$ of Dec., 2005, also describes a different method for the reliable recognition of any image. There are however some key differences between the invention of this prior application, and the exemplary embodiments of the current invention.

The exemplary embodiments of the present invention rely upon the detection of only a single frame, which implies that there is no need to search multiple scales of the image in order to locate specific symbols. This reduces the amount of CPU time required for the recognition.

The exemplary embodiments of the present invention utilize the frame properties to fix not only the scale and orientation of the image, but also non uniformity levels and color shifts that illumination can introduce into the image.

In the exemplary embodiments of the present invention, detection of the frame is relatively insensitive to blurred or defocused imaging. Furthermore, the recognition algorithms described in the exemplary embodiments of the present invention enable reliable recognition under severe blurring. Thus, the exemplary embodiments of the present invention outperform related art (including the related art described in patent application Ser. No. 11,293/300, previously cited) when the image is blurred. It should be stressed that blurring is highly likely when imaging a small framed image (say 2 cm×2 cm) with a fixed focus camera, or when the imaging is performed under low light levels, with hand movement, and/or subject to image compression. Thus, the exemplary embodiments of the present invention are superior and well adapted in those imaging conditions.

Exemplary embodiments of the present invention may help overcome the above-described disadvantages and address other disadvantages not described above. The present invention is not necessarily required to overcome most of the disadvantages described above, and the exemplary embodiments of the present invention may not overcome any of the problems described above.

BRIEF DESCRIPTION OF THE DRAWINGS

Various other objects, features and attendant advantages of the exemplary embodiments of the present invention will become fully appreciated as the same becomes better understood when considered in conjunction with the accompanying drawings, wherein.

DETAILED DESCRIPTION OF THE PREFERRED EMBODIMENTS

Figure 1:
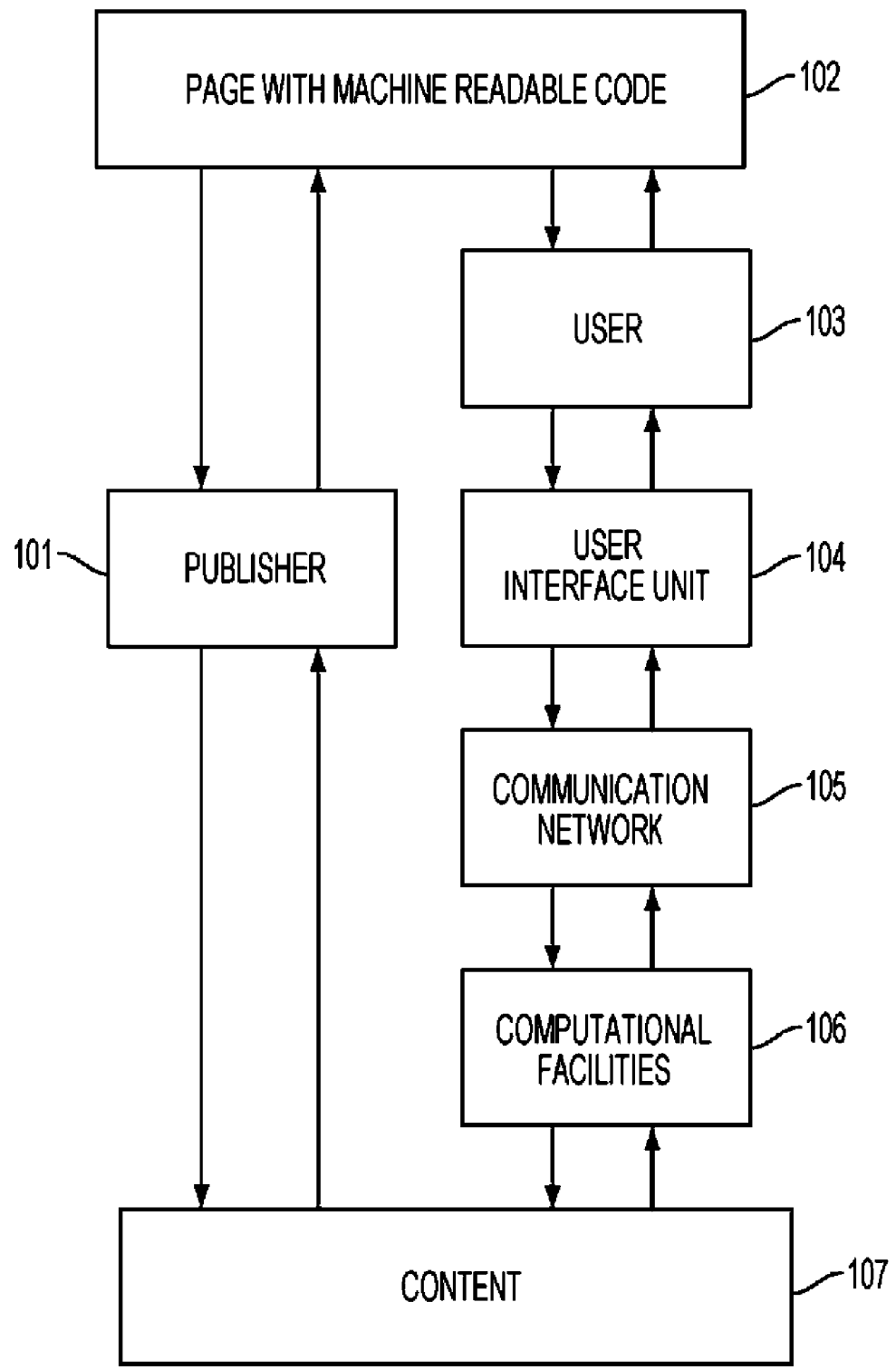
FIG. 1 shows an embodiment of a related art code-link system.

A typical embodiment of a related art system utilizing machine readable codes is depicted in FIG. 1. This is a system that supplies content upon reading some machine-readable code, e.g., barcode, or URL. The system comprises the following subsystems:

Subsystem 101: The publisher 101, being a man or robot/program or organization, plays a key role in the system. It is the publisher's responsibility to provide page design, to allocate space for code links, to facilitate the activation of these links by the user, and to provide content for the user for each activation code. It is also the publisher's responsibility to verify that the user 103 experience is adequate and the content 107 the user 103 gets as the result of the machine-readable code 102 activation is adequate.

Subsystem 102: The machine-readable code 102 on a page readable by users' scanner is distributed to the potential users 103. The page, with the machine readable code, is an important part of the system, since the page has to be designed especially for the code recognition purposes.

Subsystem 103: The 103 user detects the machine-readable code 102 of interest in a page, and scans it in order to get easy access to the content. Typically the user is not specially trained specialist, but rather someone from the general public using, for example, a wireless device with imaging capabilities.

Subsystem 104: The user interface unit 104 allows the user 103 to scan the document 102, communicate with the computational facilities 106, and finally see the content 107 when the recognition process is finished.

Subsystem 105: The communication network 105 allows for information transport between the computational facilities 106 and the use interface 104.

Subsystem 106: The computational facilities 106 provide services of code detection, code recognition and content 107 routing.

Subsystem 107: The content 107 is provided by the publisher 101 or by some third party. The content is routed through the network 105, to the user 103, via the user interface 104 based on the code recognition in computational facilities 106.

Figure 2:
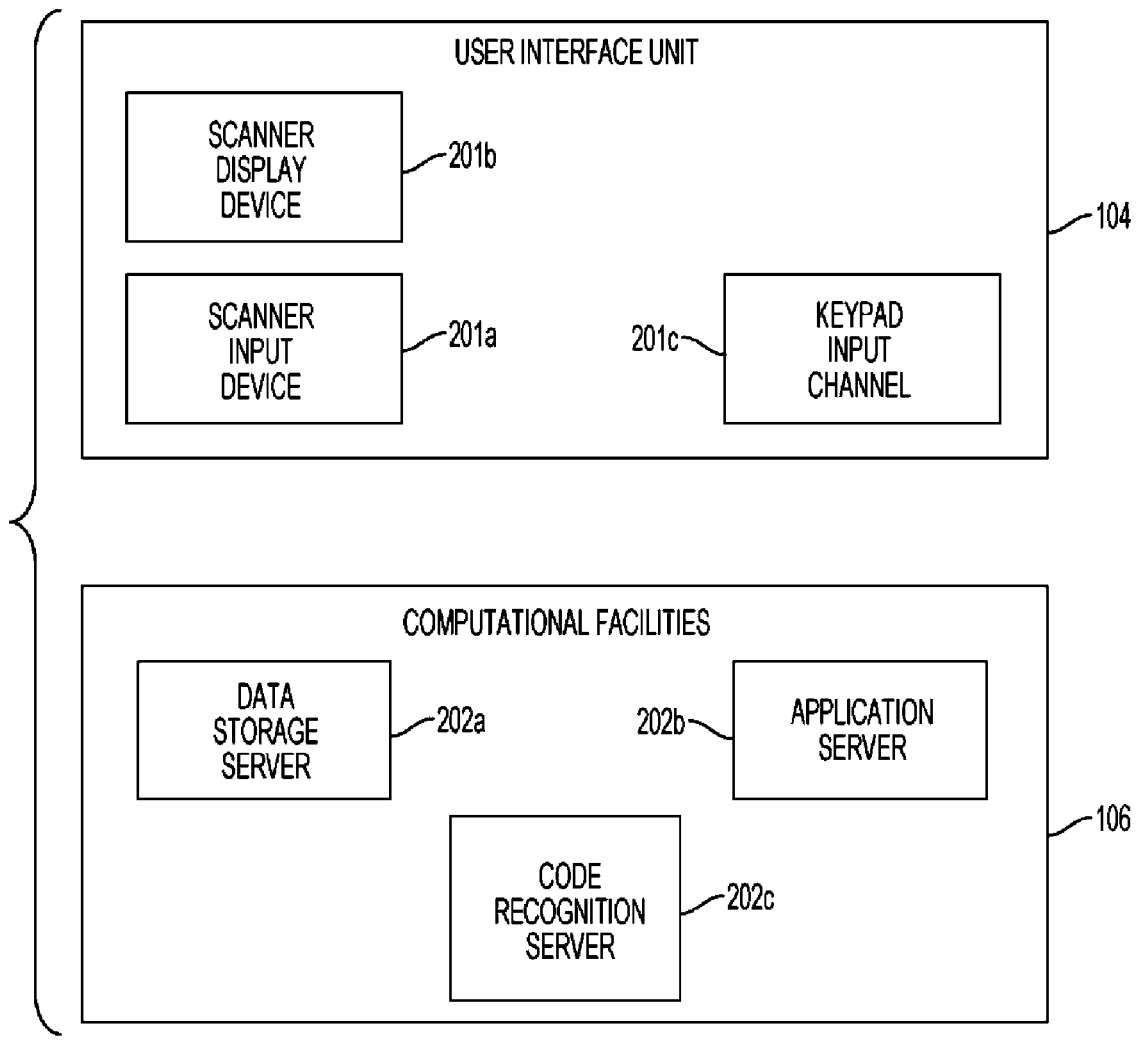
FIG. 2 shows an embodiment of the computational elements in a related art code-link system.

The computational elements of the system 1, mainly the user interface 104 and computational facilities 106, are further described in FIG. 2, which includes the following elements:

Subsystem 104: This is the same user interface subsystem 104 previously described. It consists of the following components:

Component 201a: Scanner input device 201a allows the scanning of the machine-readable code 102. Typically the scanner is a high-resolution hand-hold infrared device with some interfaces to another device 201b used for display and network access purposes.

Component 201b: Scanner display device 201b allows the feedback from the scanner input device 201a and computational facility 106. It also has an access card to network 105. Typically this device 201b is a portable computer or a mobile phone device.

Component 201c: Keypad input channel 201c allows the user 103 to communicate with the remote facility 106, when activating code detection and recognition. This channel 201c can be activated via a keyboard on a display device 201b or a button on a scanning device 201a.

Subsystem 106: These are the same computational facilities 106 previously described. They typically contain the following components Component 202a: Data storage server 202a allows storage of the user's requests, log request information, and store content on its way to the user.

Component 202b: Application server 202b allows access to the content based on the recognized code, provides billing services and manages communication with the user.

Component 202c: The code recognition server 202c detects the machine-readable code from scanner input and recognized the code.

Figure 3:
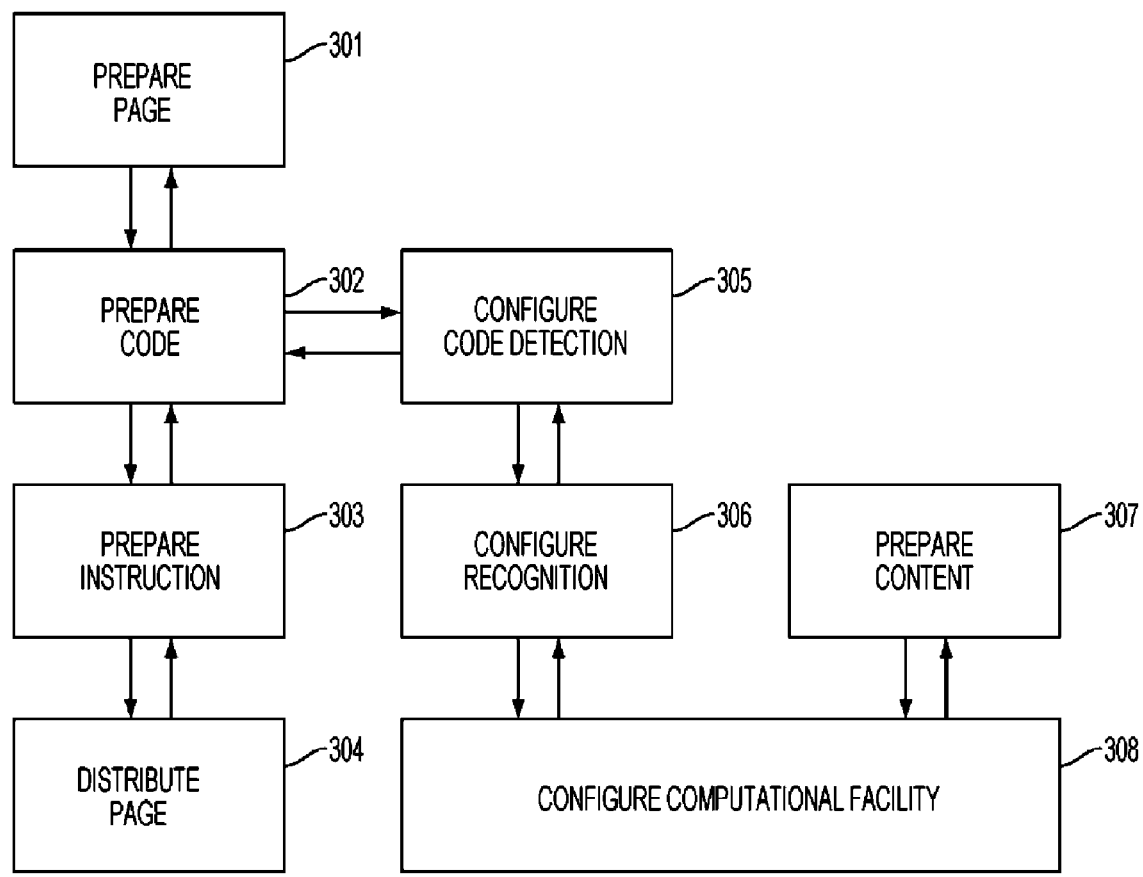
FIG. 3 shows an embodiment of the data preparation in a related art code-link system.

The method of data preparation by publisher 101 for a typical related art system, described above, is shown in FIG. 3.

Stage 301: The publisher prepares the page design 301 for the page with the machine-readable code 102 based on the page design's needs and requirement.

Stage 302: The page design 301 is modified to allow a place for the machine readable code and the code is prepared 302. Usually this 302 changes significantly the visual qualities of the page with machine-readable code 102.

Stage 303: The design of page with machine-readable code 102 is (optionally) modified to prepare the instructions 303 for the user to do scanning of the machine code. Since the instructions are in small print, usually such instructions do not alter the visual qualities of the page with machine-readable code 102.

Stage 304: The page with machine-readable code 102 is distributed 304 for the use of the potential user 103.

Stage 305: The process for code detection is configured 305 to eliminate problems resulting with texture in the page with machine-readable code 102, or in the background, or in colors, or similar such problems. The process for configuration of the process for code detection 305 is based on the properties of the prepared code 302, while the selection of the code 302 is guided by the capabilities of the computational facilities 106 and the software version for the code detection and recognition configured in 305 and 306, respectively.

Stage 306: The process for recognition of the code is configured 306 to take into the account the specific parameters of the code, such as code ID.

Stage 307: The content is prepared 307 by the publisher 101 to be delivered to the user 103 upon the recognition of the machine-readable code in 102.

Stage 308: The computational facilities 106 are configured specifically for the application considered by the publisher 101, including, among other things, billing server configuration.

Figure 4:
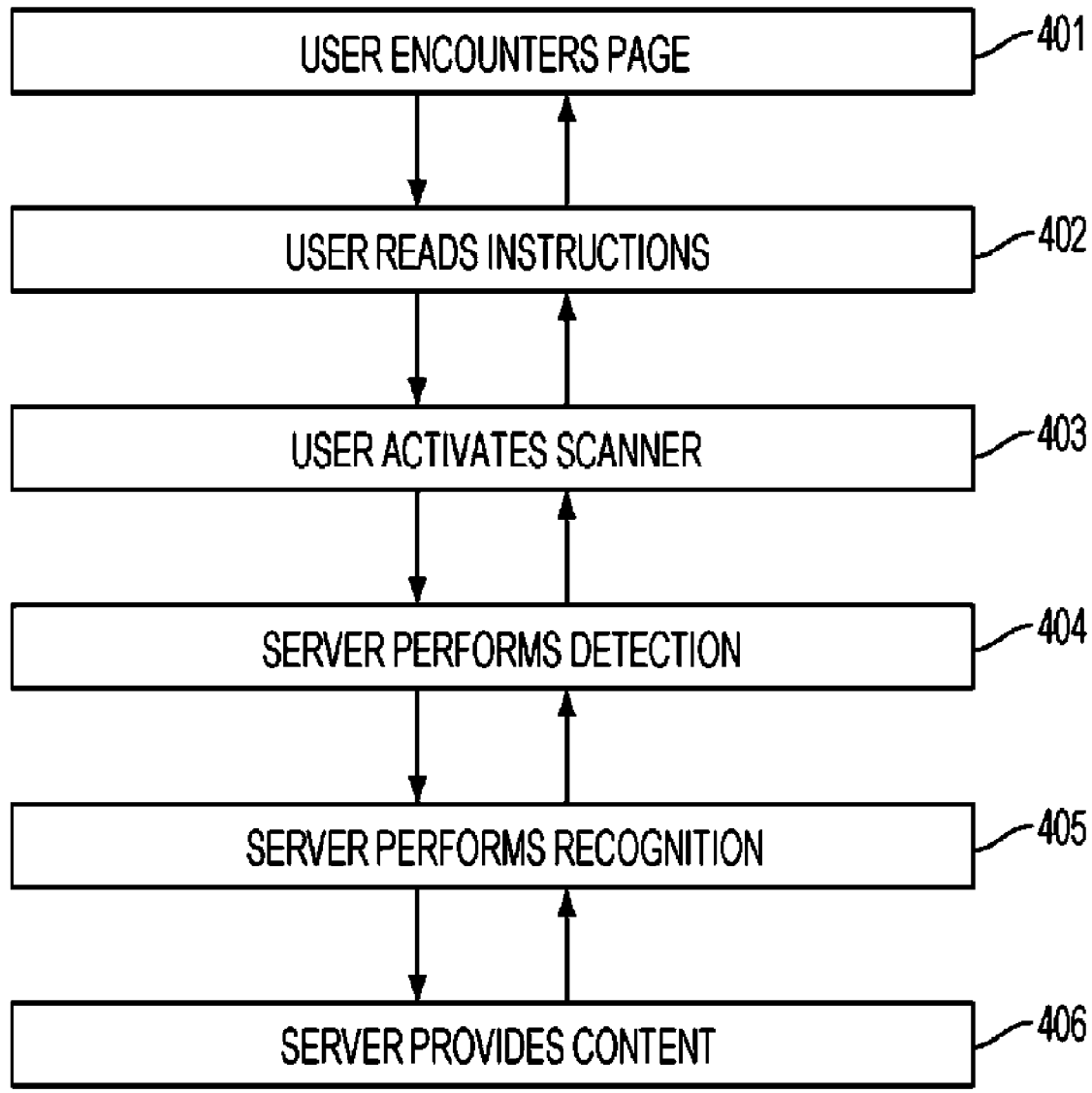
FIG. 4 shows an embodiment of the operation stages in a related art code-link system.

The operation stages of related art system are depicted in FIG. 4:

Stage 401: The user 103 encounters 401 the page with machine-readable code 102 in some kind of magazine.

Stage 402: The user 103 reads the instructions 402 for operation prepared 303 by the publisher 101.

Stage 403: The user 103 activates the scanning device's user interface unit 104 and scans the code.

Stages 404 and 405: The computational facilities 106 server receives the data from the device's interface 104 through the network 105. The computational facilities 106, acting as a server, then perform code detection 404 and recognition 405.

Stage 406: The computational facilities 106, acting as a server, provide the content 107 to the user 103 via the user interface 104 (through the network 105).

Figure 5:
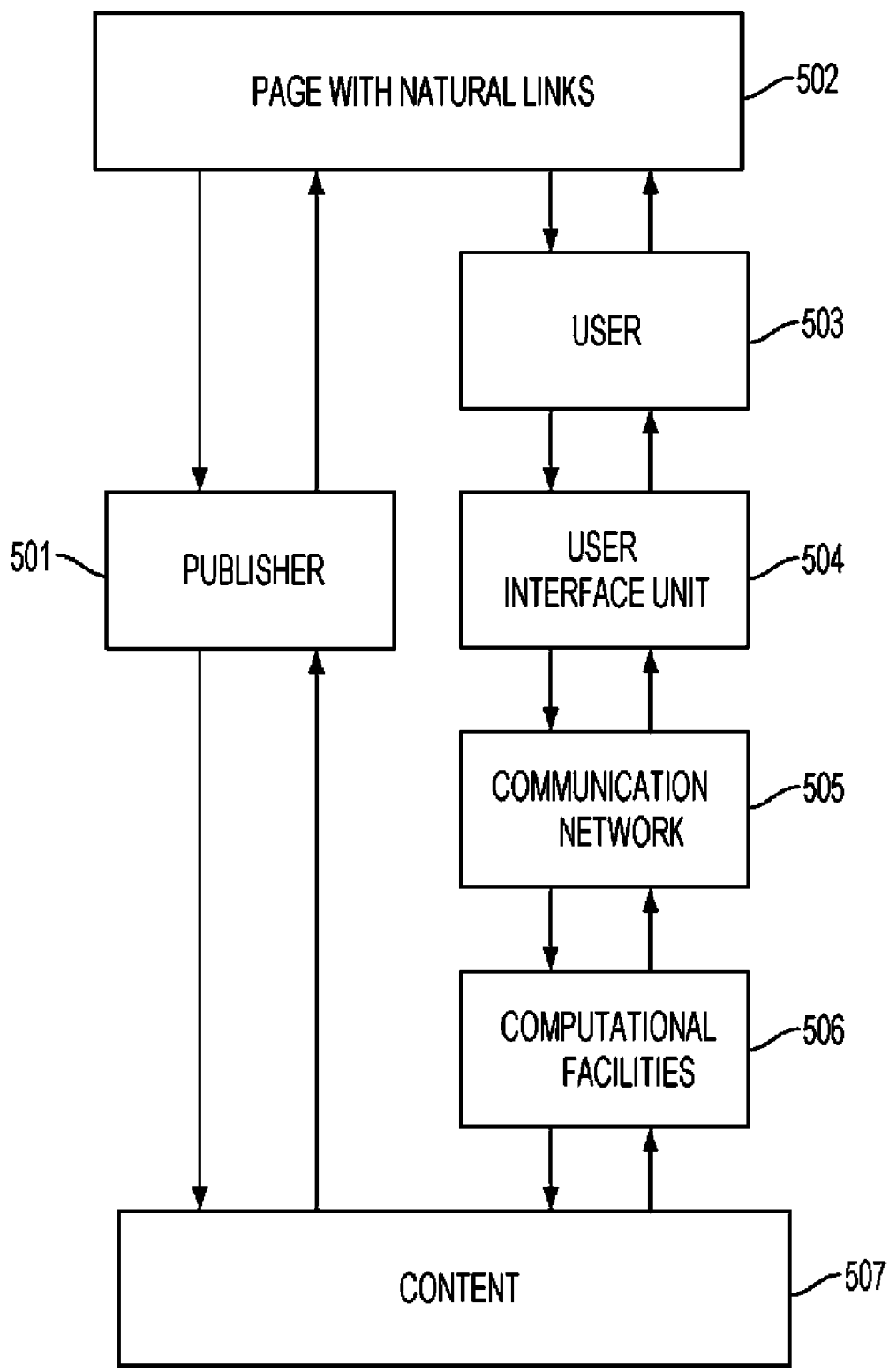
FIG. 5 shows a system according to an exemplary embodiment of the present invention.

A typical embodiment of the system presented in an exemplary embodiment of the present invention is shown on FIG. 5. The system comprises the following subsystems:

Subsystem 501: The publisher 501, is much less constrained than the publisher in 101. The page design typically does not have to be specifically modified for proper operation with the natural links. Moreover, the links may be activated after the page is published. Since the presented system poses fewer limitations than the related-art system described in FIG. 1 above, the publisher 501 includes a wider range of organizations than the publisher 101. Limitations specific to the publisher in 101, which are not present in the exemplary embodiment of the present invention publisher 501, include:

Limitation 1: The machine-readable code 102 is introduced by publisher 101 in the stage of the page preparation 301, and cannot be introduced in the later stages. Publisher 501 can introduce the link recognition mechanism even after the page publication Limitation 2: The media available for the publisher 102 is more limited than the media available for the publisher 501, since this exemplary embodiment of the invention presents a large body of algorithms for media-specific processing, such as the removal of CRT screen artifacts 1403.

Limitation 3: The services for 3G wireless devices require very robust algorithms due to video-related artifacts 1405. The use of the frame around the link improves the operational envelop of the link recognition mechanisms.

Limitation 4: Introducing of the machine-readable code in the page 102 alters the user's visual experience from the link, and therefore limits the effectiveness of the published material. This is especially important for the advertisement and voting applications, where the marketing information or visual image should be conveyed to the user unaltered.

Subsystem 502: The natural links on a page 502 are distributed to the potential users 503. The page need not be designed especially for the recognition purposes, that is to say, the page may contain print ads. These advertisements may contain a multitude of small logos/pictures, printed in several media formats. Some such formats include (1) Regular daily newspapers; (2) Glossy magazines; (3) Posters placed in malls; (4) Stickers; and (5) Web ads—the logos/pictures were also placed in web sites.

Subsystem 503: The user 503 detects the link of interest in a page 502, and "scans" it in order to get easy access to the content. In case of problems with recognition process, the user receives further instruction via the user interface unit 504, and can even choose the proper link manually in a menu on 504. The user 503 requires less knowledge and experience than the user 103, since some artifacts caused by incorrect user 503 actions are corrected by the image processing algorithms. For example, the geometrical artifacts 1401 are corrected via frame edge detection algorithms described further in FIG. 12*a*. Also, the user 503 is more informed and can be involved in decision making process due to special capabilities of the user interface 504 and computational facilities 506.

Subsystem 504: The user interface unit 504 allows the user 503 to "scan" the document 502 taking an image/number of images/video of 502. The unit 504 communicates with the computational facilities 506, so that the user 502 gets the content 507 when the recognition process is finished. Moreover, the unit 504 provides additional services, such as voice activation, "zoom-on-object" activation (which is described in U.S. patent application Ser. No. 11/353,151, incorporated herein by reference, entitled "SYSTEM AND METHOD OF USER INTERFACE AND DATA ENTRY FROM A VIDEO CALL" by the inventor Zvi Lev filed on Feb. 14, 2006), keypad activation, and other activation mechanisms. The user interface 504 is different from the user interface 104 in the following aspects:

Difference 1: The user interface 504 is interactive, in the following capabilities:

Capability 1: The user can influence the symbol recognition via manual input.

Capability 2: The instructions of the operation 702 can be displayed though the user interface 504, especially in 3G devices.

Capability 3: Partial detection information, such as frame detection results, can be presented through the user interface 504 to guide further user actions.

Difference 2: The user interface 504 includes 3G capabilities, typically not supported by 104.

Difference 3: Some of the image processing operations, such as frame detection, can be integrated on the mobile device, rather than remote computational facility 506. These operations are generally included in user interfaces 504 functionality.

Subsystem 505: The communication network 505 allows for information transport between the computational facilities 506 and the user interface 504. This system is similar to 105, but it allows a wider range of protocols, including those for various video links, fiber optics links, and wide-band protocols, all of which an operate on network 505. Note that more than one protocol can be used in 505. For example, the message sent though MMS can activate a cheap 3G video call from the content server to the user.

Some sort of network 505 is required to access computational facilities 506 services and content. In some cases, some processing is actually performed prior to network access (that is, such processing is said to be "embedded in the device"). For example, the content/service can be sent to the user from the server via any combination of an MMS/email message with the content, an MMS/email message with a link to the content, an SMS, a binary (e.g. WAP PUSH) SMS, or as part of the video call. Typical times for the end-to end process using MMS would be significantly longer than for the end-to-end process using a video call.

Subsystem 506: The computational facilities 506 provide services of image processing, application support and content 507 routing. The content routing is not generally available in 106, and is useful when:

Scenario 1: Multiple information sources appear in one link, for example slogan and alphanumerical code in 905.

Scenario 2: The user 503 introduces manual input through user interface 504.

Scenario 3: Some of the information is routed back to the user in the form of display on user interface 504.

Additional capabilities specific to 506 and not 106 relate to interactive application of the system. These capabilities include image detection and recognition server 602c, video and image preprocessing server 602d, speech recognition server 602e and routing server 602f, as shown on FIG. 6.

Subsystem 507: The content 507 is provided by the publisher 501 and used the same way as in related art systems 107, except for the user feedback discussed in the description of the user interface unit 504.

Figure 6:
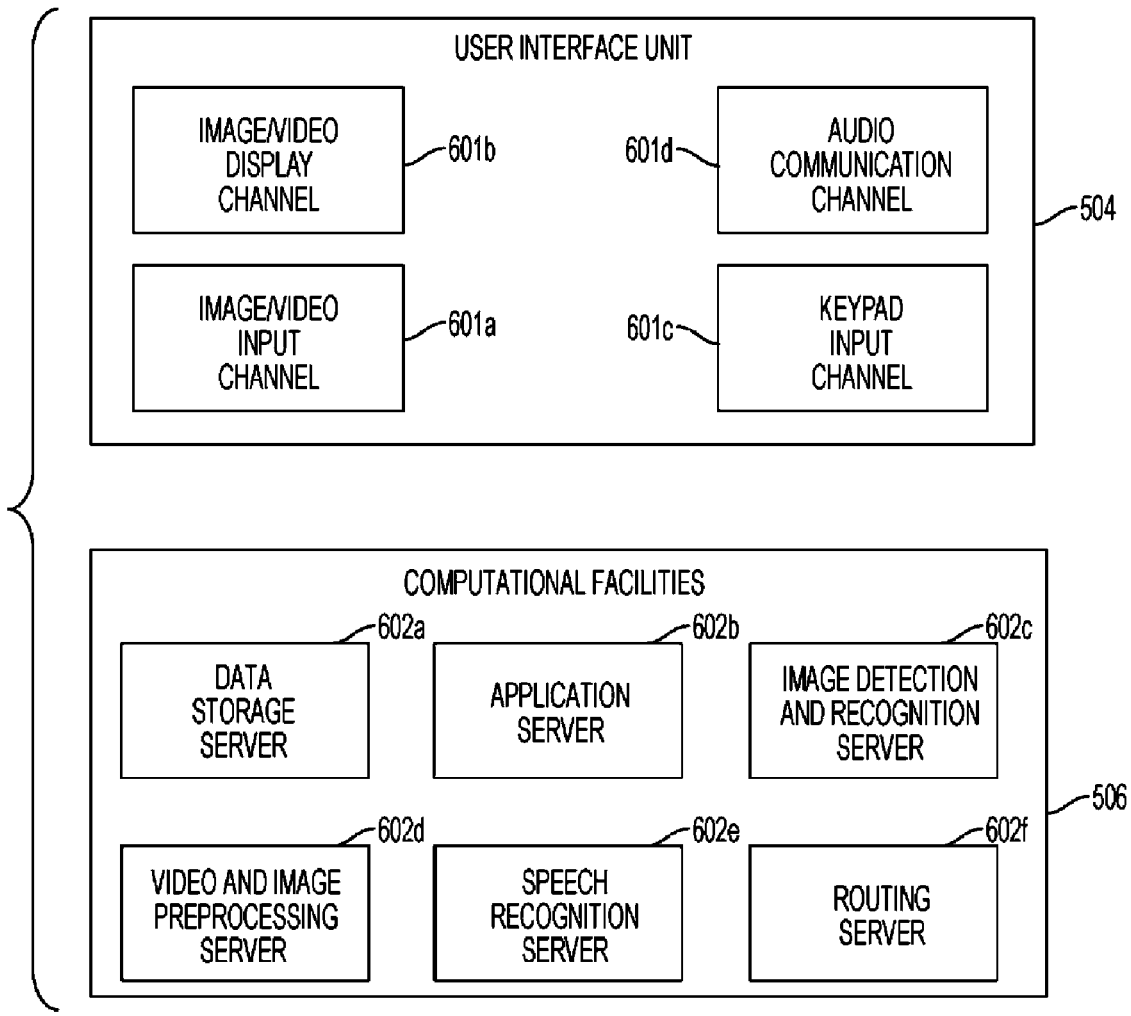
FIG. 6 shows the computational elements in the exemplary embodiment of the present invention.

The computational elements of the system 5, mainly the user interface 504 and computational facilities 506 are further described in FIG. 6.

Subsystem 504: The user interface subsystem 504, is the same as described in FIG. 5, and is typically a general-purpose imaging device connected to a network. Examples of devices connected to the network include:

Device example 1: MMS/email capable phones and devices. These phones, such as the Nokia 6600, the Nokia 7650, the Ericsson P800, the Alphacell M5 phone, the Palm Treo and others, have been used by users to capture images and send them to an email address and/or a service phone number.

Device example 2: 3G imaging video-phones making video calls. Several models, such as the LG 8120, the Nokia 6680, and the Motorola E1000, have been tested. These devices are used to make video calls to a service phone number.

Device example 3: Web Camera connected to a PC, and capable of making a video call to the service phone number. Examples are the Intel™ CS6500 web camera and the 3Com™ Homeconnect™ camera.

The following software, among others, may be used with device 504:

Software example 1: The internal email and MMS clients of the relevant phones.

Software example 2: The Cognima Snap client for automatic image and video file, uploading from a Symbian series 60 phone.

Software example 3: The internal 3G video call client of 3G phones.

Software example 4: PC software for making video calls, such as Netmeeting by Microsoft, or the OpenPhone open source project.

Software example 5: An IMS/SIP client on the device enabling image transfer/video transfer and videoconferencing.

The device 504 consists of the following components:

Component 601a: Image/video input channel 601a allows the imaging of the link in 502 for further link recognition.

Component 601b: Image/video display channel 601b allows the feedback from the input channel 601a and computational facility 506.

Component 601c: Keypad input channel 601c allows the user 503 to communicate with remote computational facilities 506, when activating code detection and recognition.

Component 601d: Audio communication channel 601d allows the user 503 to communicate with the remote facility 506, via integrated voice response and receive the instruction in on-line mode.

Subsystem 506: The computational facilities 506, some examples for which are:

Computational facilities 506 Example 1: An email server capable of receiving incoming MMS/email messages containing images and/or video clips. Example 2: An H.323 client capable of conducting a live video call with a PC/webcam endpoint and/or a 3G cellular endpoint. Example 3: An output component capable of sending MMS, SMS, or email to cellular numbers and/or email addresses. Example 4: A processing server capable of recognizing the objects in the image/video clip/live video according to the algorithms outlined in the rest of this document. Example 5: A logging component capable of making records of all incoming/outgoing transactions for billing purposes, customer behavior studies, performance monitoring etc. Example 6: A video encoding and streaming system for preparing and delivering the media to the user once the recognition has taken place and during the recognition process.

The computational facilities 506 typically contains the following components:

Component 602a: Data storage server 602a allows storage of the user's requests, log request information and store content on its way to the user. Moreover the server 602a keeps the log and statistics for the other servers. The function in which 602a is different form the 202 is its ability to store all relevant link images in a database for recognition purposes.

Component 602b: Application server 602b allows access to the content based on the recognized link, provides billing services, and manages communication with the user 503.

Component 602c: The image detection and recognition server 602c detects the frame of the link and performs the recognition on link's symbol.

Component 602d: The video and image preprocessing server 602d performs the following functions:

Function 1: Combines video frames and frames from various requests for the best resulting image. (The process of combination is described further in U.S. patent application Ser. No. 11/353,151, previously cited.)

Function 2: Support zoom-on activation mechanisms (described further in U.S. patent application Ser. No. 11/353,151, previously cited).

Function 3: Provides some basic image improvement services (such as illumination correction and color domain transforms) prior to more dedicated processing in 602c.

Component 602e: The speech recognition server 602e supports the application server 602b for the audio interface with the user.

Component 602f: The data routing server 602f allows:

Capability 1: Interfaces with various communication protocols supported by 505

Capability 2: User 503 feedback

Capability 3: Data distribution to various content providers. For example, a coupon in the link may include a dinner at a McDonald's™ restaurant, or and a 3G video from Warner Brothers™.

Figure 7:
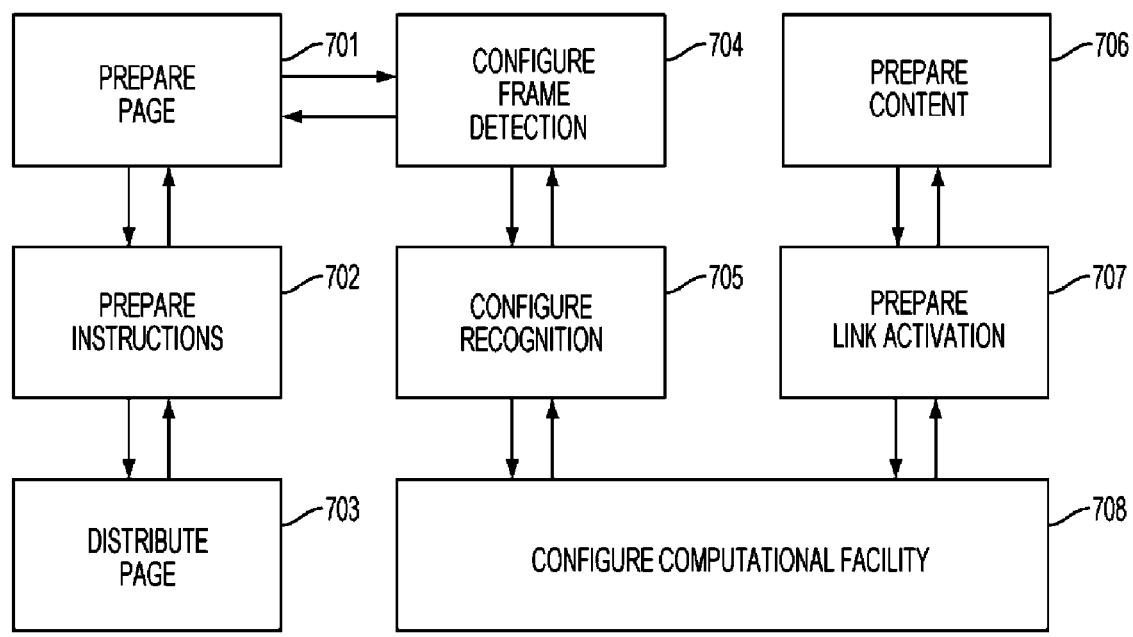
FIG. 7 shows the data preparation according to an exemplary embodiment of the present invention.

The method of data preparation for system 5 by publisher 501 is shown in FIG. 7.

Stage 701: The publisher prepares the page 701 with natural links 502 based on the page's needs and requirement. In the exemplary embodiment of the current invention, the page design is not modified to allow place for the links, since such modification is unnecessary.

Stage 702: The design of page with natural links 502 is (optionally) modified to include the instruction for the user willing to activate the link 703. Since the instructions are in small print, usually they do not alter the visual qualities of the page 502.

Stage 703: The page with natural links 502 is distributed 704 for the use of the potential users 503.

Stage 704: Configure the frame detection process 704 on 506 to use the proper frame type and parameters. Note that stage 704 may occur after 703, which is not the case in related-art systems. In this case the frame design is typically based on some templates inside the symbol, as illustrated in 908.

Stage 705: The recognition of the links on 506 is configured 705 to take into account the specific parameters of the links, other symbols available for the same application, and imaging-induced variations on link symbols.

Stage 706: The content 507 is prepared 706 by the publisher 501 to be delivered to the user 503 upon the recognition of the link in 502.

Stage 707: The link activation process is configured 707 by the publisher 501 for the access of the content 507.

Stage 708: The computational facility 506 is configured specifically for the application considered by the publisher 501, including billing server configuration for page distribution 703.

Figure 8:
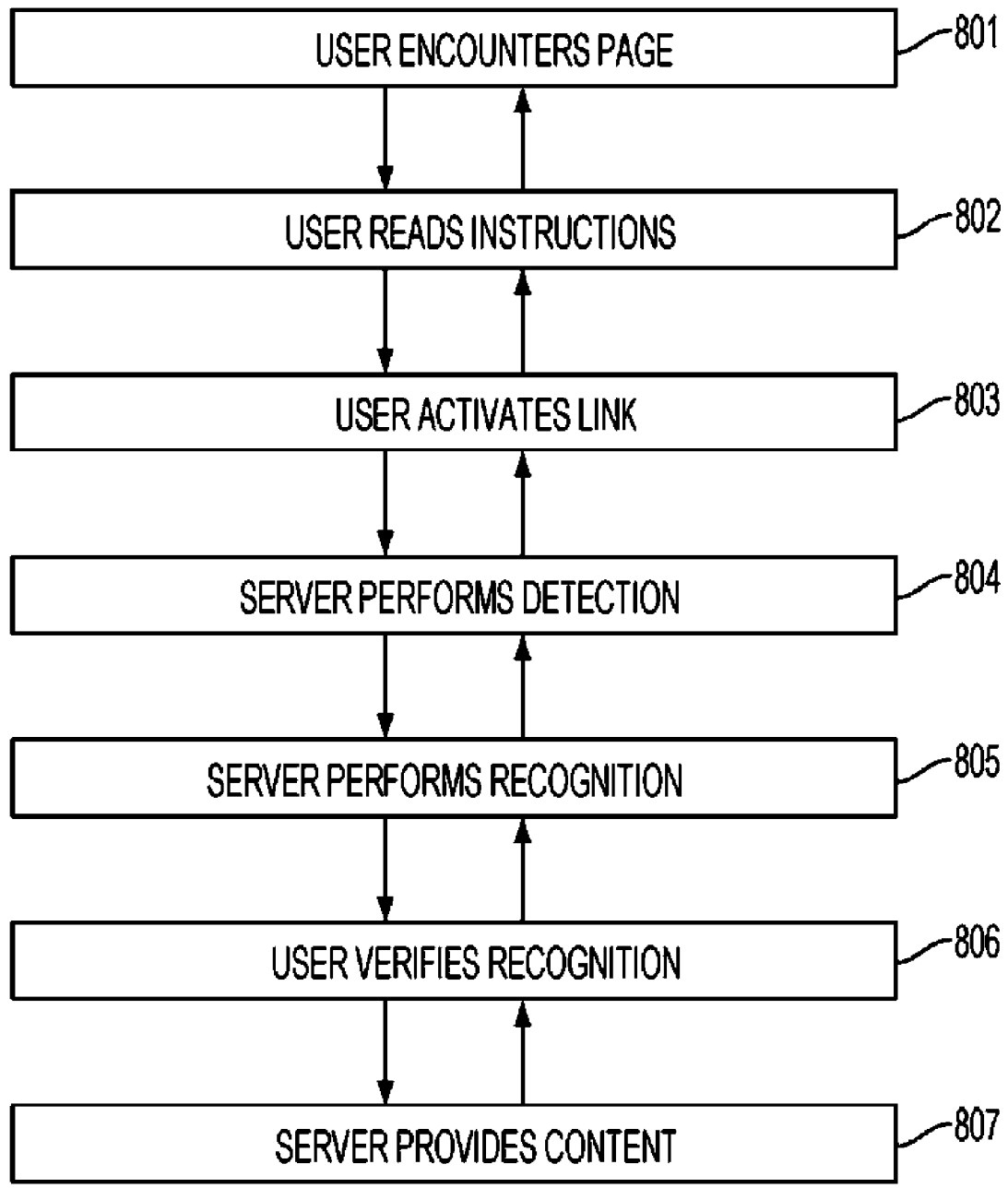
FIG. 8 shows the operation stages according to an exemplary embodiment of the present invention.

The operation stages of the system 5 are depicted on FIG. 8:

Stage 801: The user 503 encounters 801 the page 502 in some kind of magazine, on some website, or from another source.

Stage 802: The user 503 (optionally) reads the instructions 802 for operation prepared by the publisher 501. Some additional information can be supplied to the user via 504.

Stage 803: The user 503 activates the imaging device 504 and activates the link. For example, the user may take an image of the link and sends the image to a predefined phone number via MMS interface. As a second example the user may use a "zoom-on" technique, in this manner: First, the user starts video call; second, the user zooms on the link from a distance; third, the user presses keypad button to activate video preprocessing; fourth, the user brings the imaging device close to the link; and fifth, the user presses keypad button to activate recognition.

Stage 804: The computational facilities 506, in the form of a server, receive the data from the device 504 through the network 505, and perform image/video preprocessing and frame detection 804.

Stage 805: The computational facilities 506, in the form of a server, correct the link image based on frame detection 804, and perform symbol recognition.

Stage 806: The computational facilities 506 (optionally) contact the user and verify that the recognition results are correct. In case of doubt, the server can request the user to repeat scanning operation, or to choose between best candidates for link. This verification stage is more important than in related art applications, since according to the exemplary embodiment of the present invention, general purpose imaging device may be used on a general-purpose page.

Stage 807: The computational facilities 807, in the form of a server, provide the content 507 to the user 503 via the user interface 504 (through the network 505). Potentially, the content/service itself is provided by a third party or wireless carrier. In such a case, the server sends the recognition results to the third party by, e.g., an HTTP POST operation, a virtual MMS sending operation, or something similar.

Figure 9:
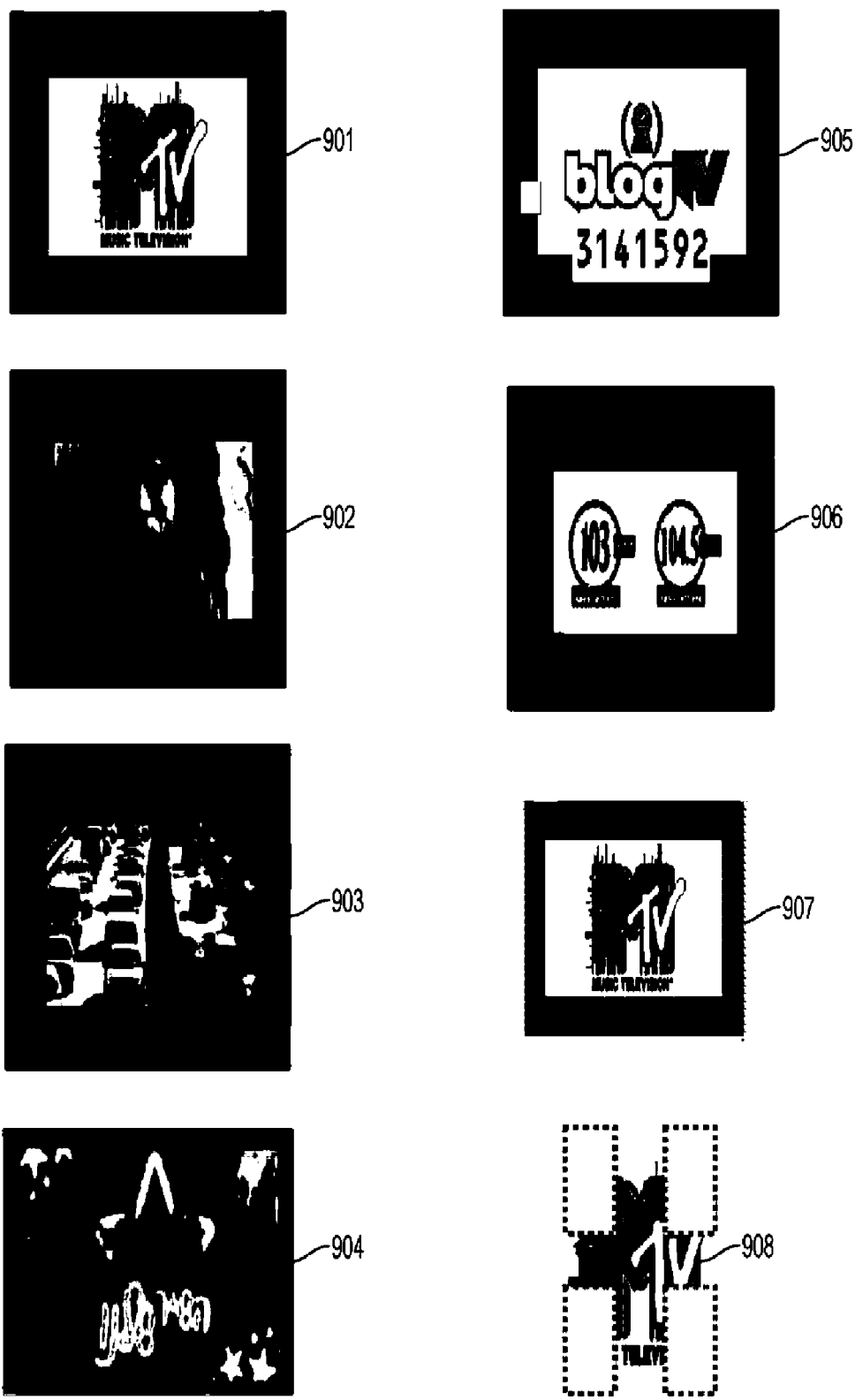
FIG. 9 presents variations on possible icons and possible frames of the exemplary embodiment of the present invention.

Some illustrations of valid links are given on FIG. 9.

Illustration 901: Illustration 901 shows a logo inside the link. Company logos can appear inside the link, to identify the sponsor/provider of the service.

Illustration 902: Illustration 902 shows a photographical portrait image inside the link. For example, in voting applications, the photographs of the candidates may appear inside the links.

Illustration 903: Illustration 903 shows a scenery photograph inside the link. Complex scenery can appear inside the link to identify the location of an event.

Illustration 904: Illustration 904 shows an advertisement slogan inside a link. Synthetic graphics, slogans and other advertisement information can appear inside the link to affect the potential customers regarding the service.

Illustration 905: Illustration 905 shows a combination of graphical symbol and alphanumerical code inside the link. Alphanumeric code can accompany the icon inside the link to facilitate accurate identification of the service or the operator. A good example for this service would be lottery tickets.

Illustration 906: Illustration 906 shows customer-designed frame inside the link. The frame itself can be modified to enforce the message of the link. For example, a paintball fighting club may include target mark in the design of the specific links.

Illustration 907: Illustration 907 shows a combination of various textures inside the link. Combinations of various textures can be used to in the design of the link. For example, if the link is a sticker of jeans pants, the rough texture of pants and the smooth texture of the sticker can be used for link identification.

Illustration 908: Illustration 908 shows usage of templates to identify the link. In this example 908 the frame is defined by 4 templates at the corners of the symbol. This particular application would be typical for service activation after the publication of the document.

Figure 10:
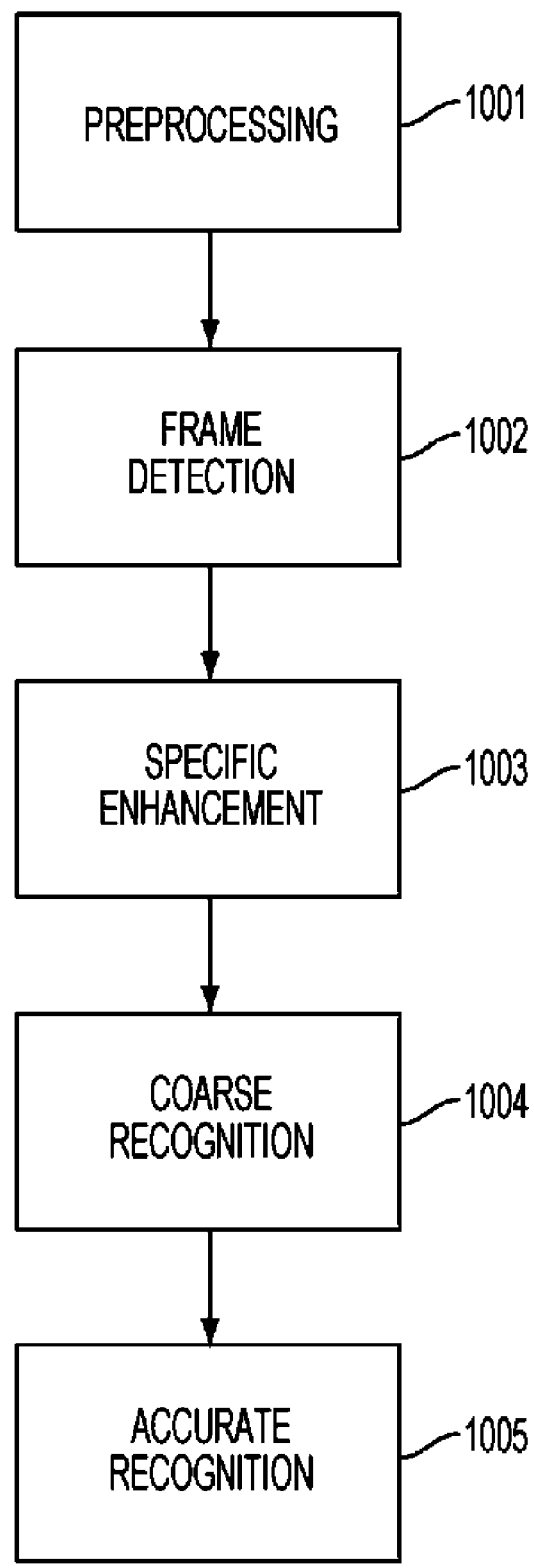
FIG. 10 shows a general algorithmic flow according to an exemplary embodiment of the present invention.

A general algorithmic flow for this exemplary embodiment of the present invention is given in FIG. 10.

Stage 1001: Image preprocessing 1001 stage implies various forms of images or video frames selection and combination, as well as various general-purpose image enhancement operations, as illustrated in-detail in FIG. 15. Image preprocessing allows better detection and recognition of links.

Stage 1002: Frame detection stage 1002 is the detection of the frame of the relevant link. The frame detection operation is performed on the best available image provided by the preprocessing stage 1001. Frame detection allows detection of the location of the relevant symbol and some of its properties, such as size in pixels, axis ratio, illumination characteristics, and other similar properties. This stage 1002 is further illustrated in FIG. 19. It should be noted that in cases where the automated frame detection does not succeed, it is possible to have a human detect the frame. Thus, the system will use human intervention to divert images where the automatic algorithms.

Note that more than one link candidate can be detected and the best candidate can be chosen in the end of the recognition process Stage 1005.

Figure 31:
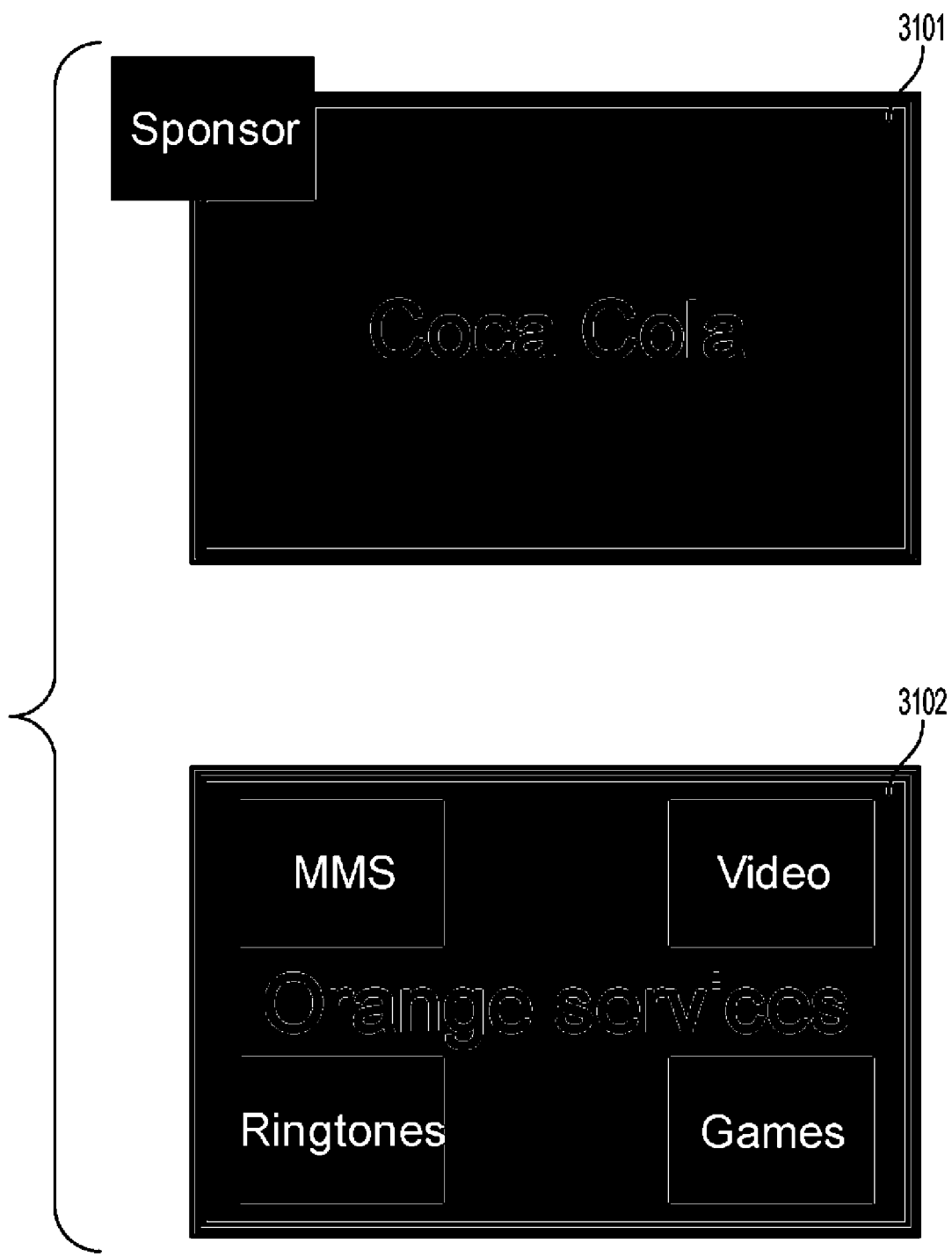
FIG. 31 illustrates link inside link according to an exemplary embodiment of the present invention.

Note also that in case of link-inside-link, the processing stages 1002-1005 can be performed iteratively. The second link can appear both besides the primary link, as in FIG. 31, element 3101, or inside the primary link, as in 3102. Element 3102 illustrates that there can be clusters of multiple link-inside-link elements.

Note also that it is possible to implement several different options of pre-processing, which will yield several versions of the "enhanced" image, and to apply the later stage to all of those versions so as to increate the probability of frame detection and content recognition.

Stage 1003: Specific enhancement stage 1003 implies image enhancement specifically for the purposes of image recognition in the area of interest of the symbol of interest, using the information from stage 1002. This stage 1003 allows usage of image frame properties and symbol location for better symbol recognition. This stage 1003 is further illustrated in FIG. 21.

Stage 1004: Coarse recognition stage 1004 allows limiting the possible link recognition candidates to the minimum, in order to save time during the accurate recognition stage 1005. This stage 1004 is further illustrated in FIG. 23. This coarse recognition stage 1004 may use features such as color, aspect ratio, and frame color, to omit whole groups of potential symbols from the accurate recognition stage which follows.

Stage 1005: Accurate recognition stage 1005 allows accurate recognition of the symbol of interest, provides accuracy marks if more than one candidate is present, and reports if no symbol was reliably recognized. This stage 1005 is built for accuracy rather than speed, therefore it is recommended to use coarse recognition 1004 prior to 1005 (although the opposite, that is, 1005 before 1004, is also possible). This stage 1005 is further illustrated in FIG. 24. It should be noted that in cases where the automated recognition described in stages 1004 and 1005 does not succeed, it is possible to have a human perform the recognition. Thus, where the automatic algorithms have failed, the system will divert images for human intervention.

Figure 11A:
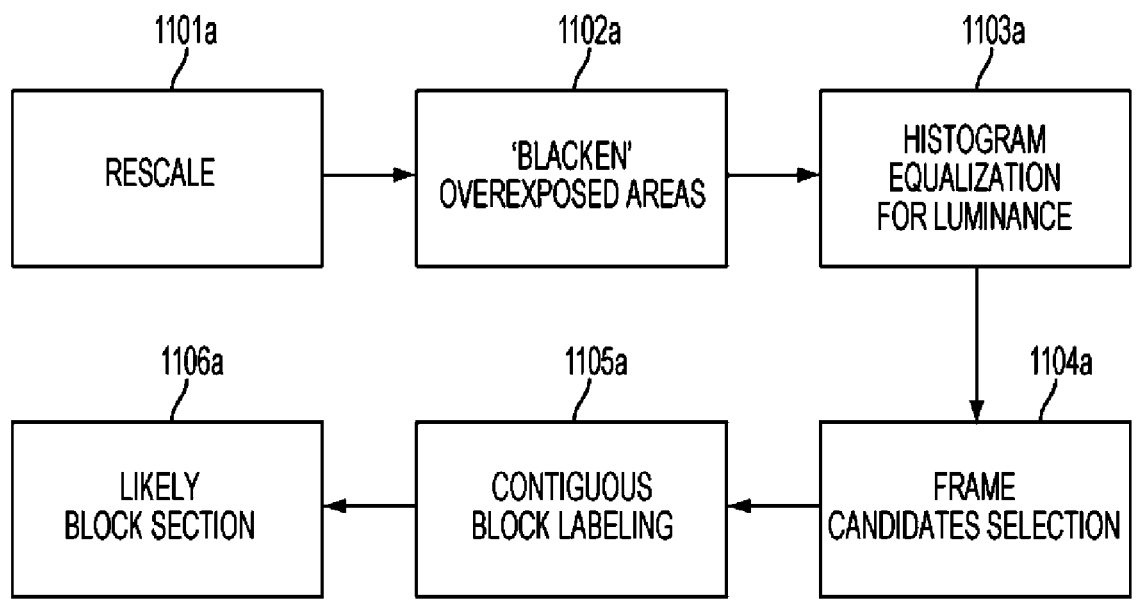
FIG. 11a describes the stages of the frame detection algorithm according to an exemplary embodiment of the present invention.
Figure 11B:
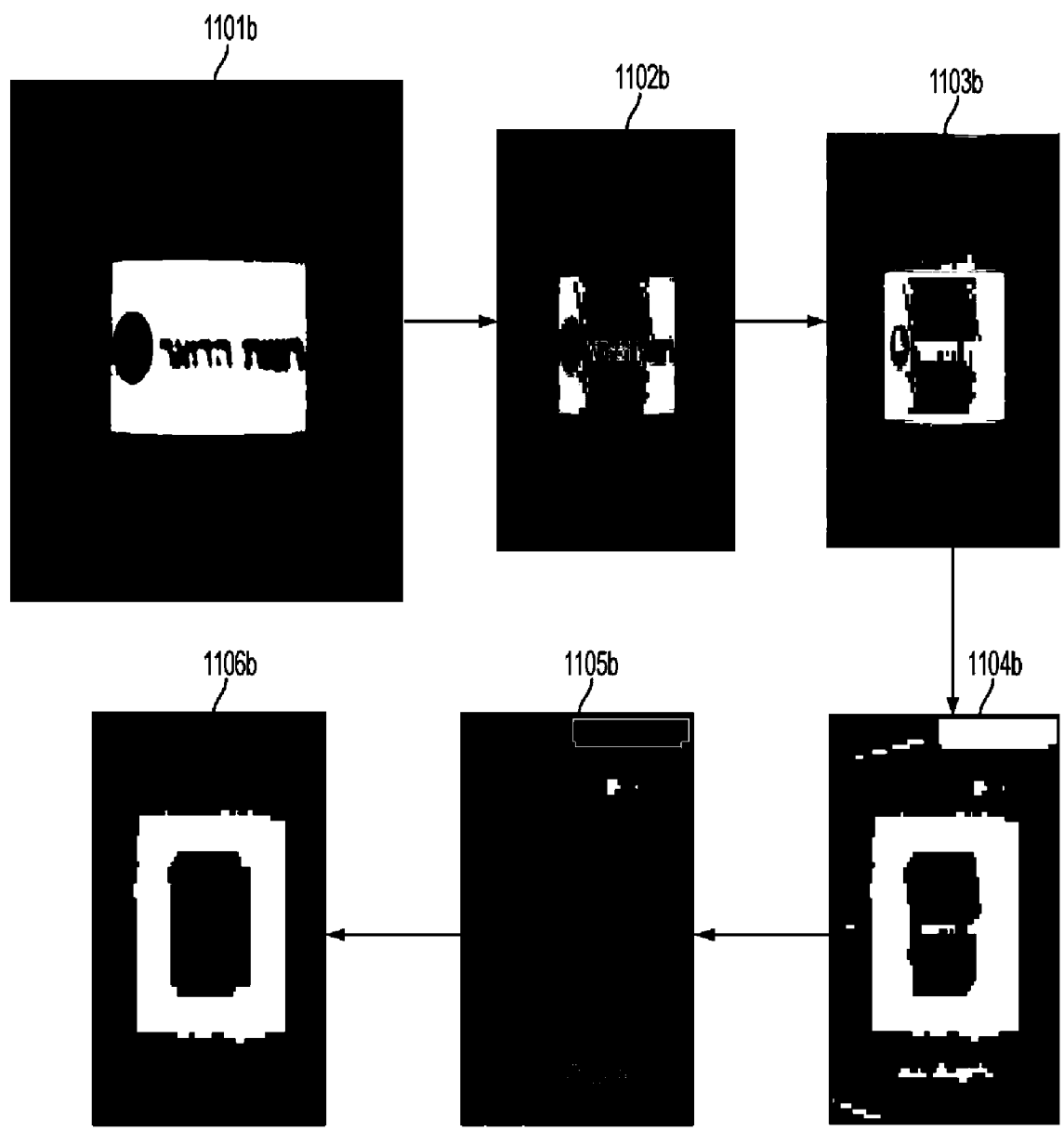
FIG. 11b illustrates the stages of the frame detection algorithm on postal office link according to an exemplary embodiment of the present invention.
Figure 11C:
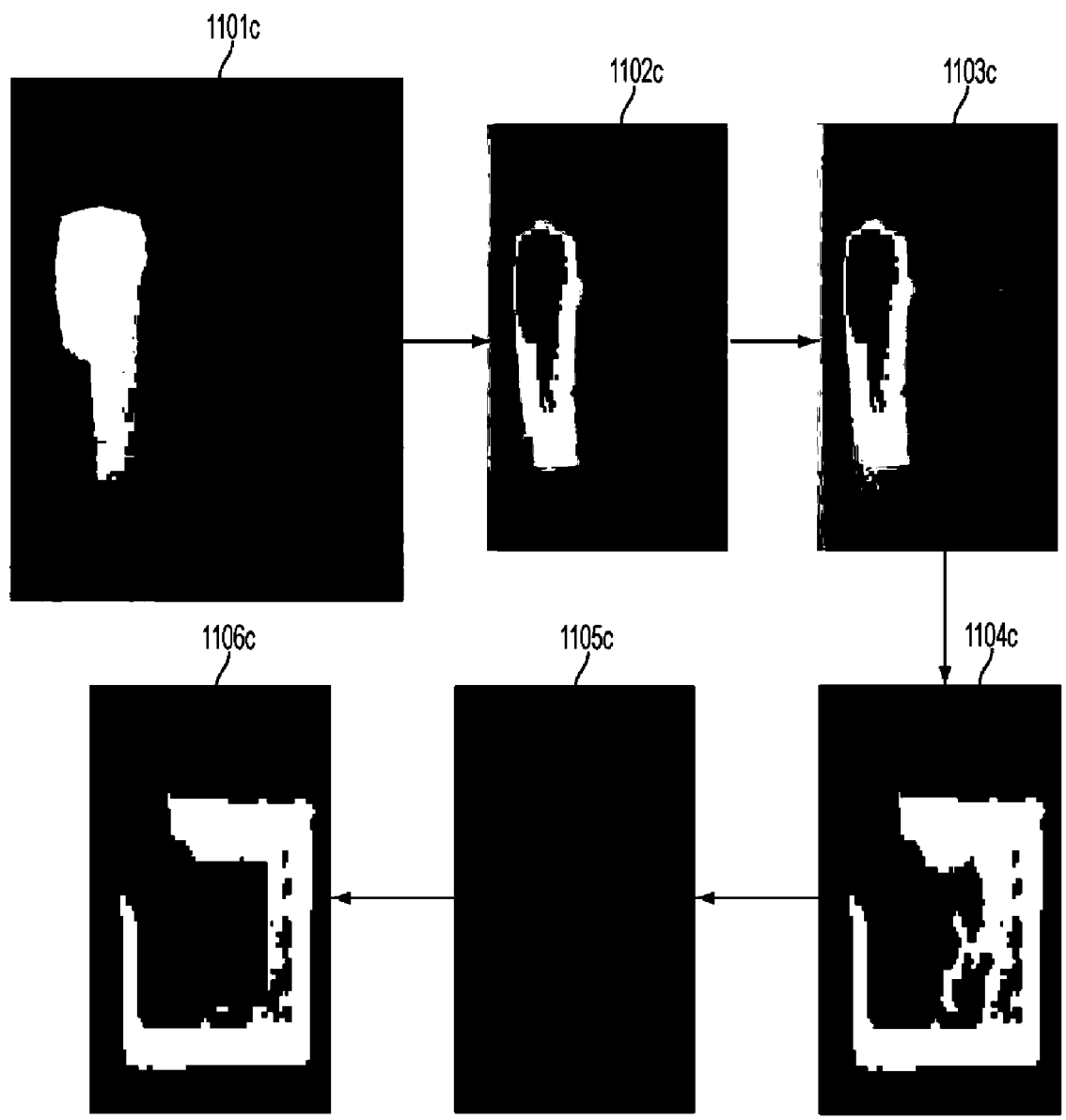
FIG. 11c illustrates the stages of the frame detection algorithm on MTV link according to an exemplary embodiment of the present invention.
Figure 12A:
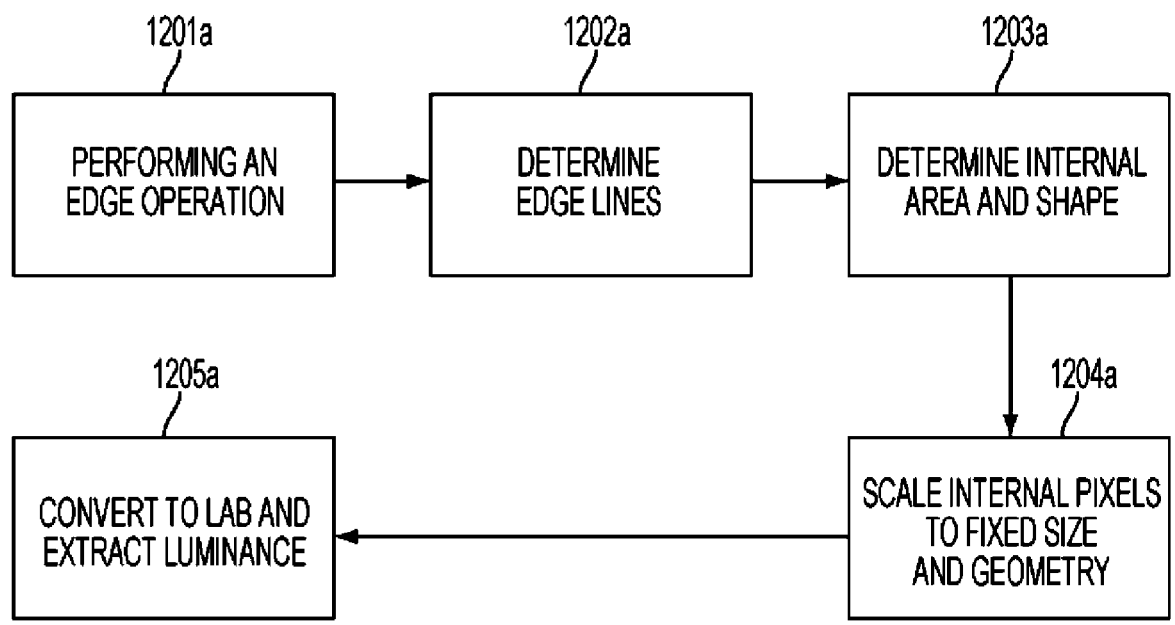
FIG. 12a describes the stages of the frame edge extraction algorithm according to an exemplary embodiment of the present invention.
Figure 12B:
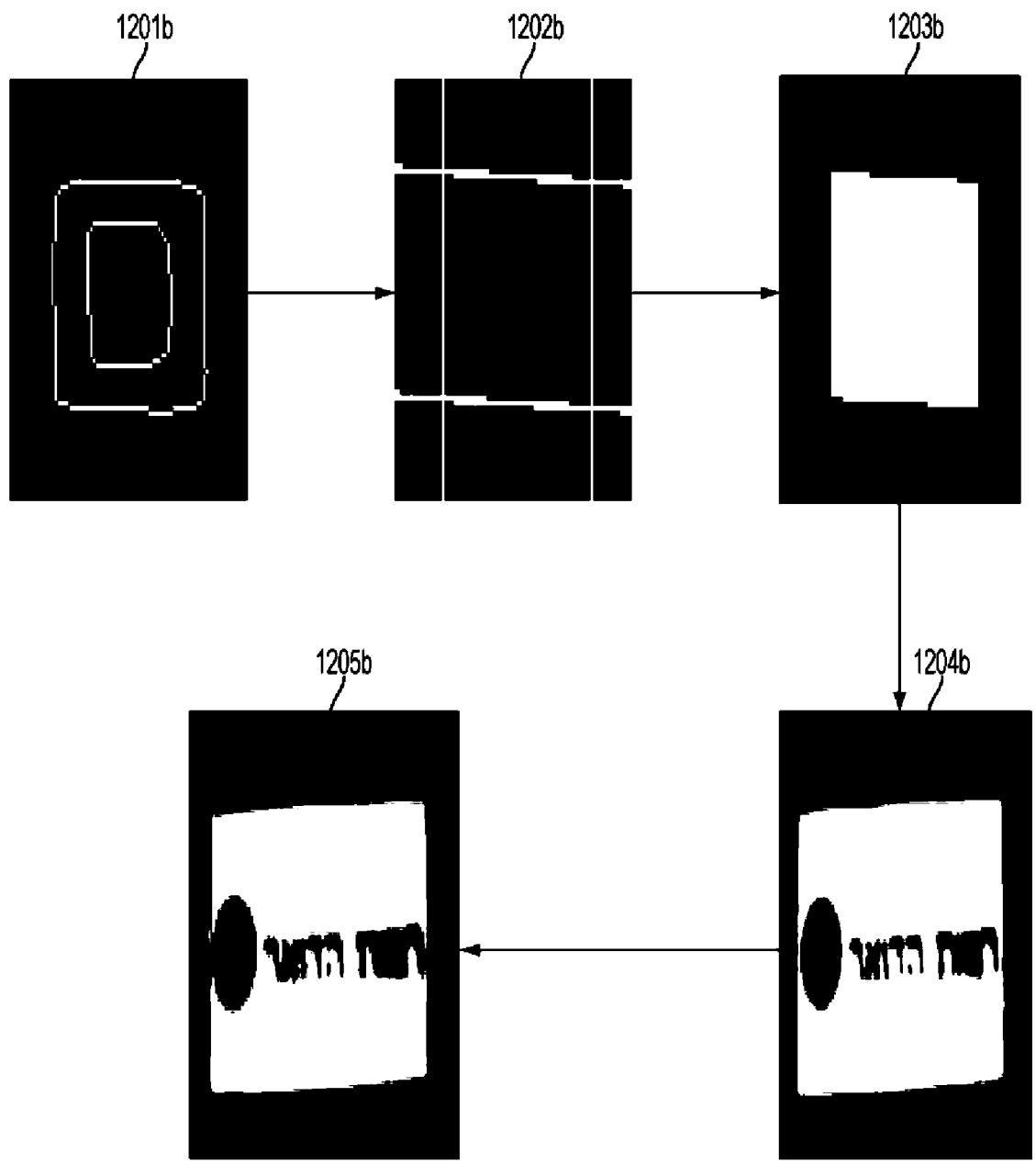
FIG. 12b illustrates the stages of the frame edge extraction algorithm on postal office link according to an exemplary embodiment of the present invention.
Figure 12C:
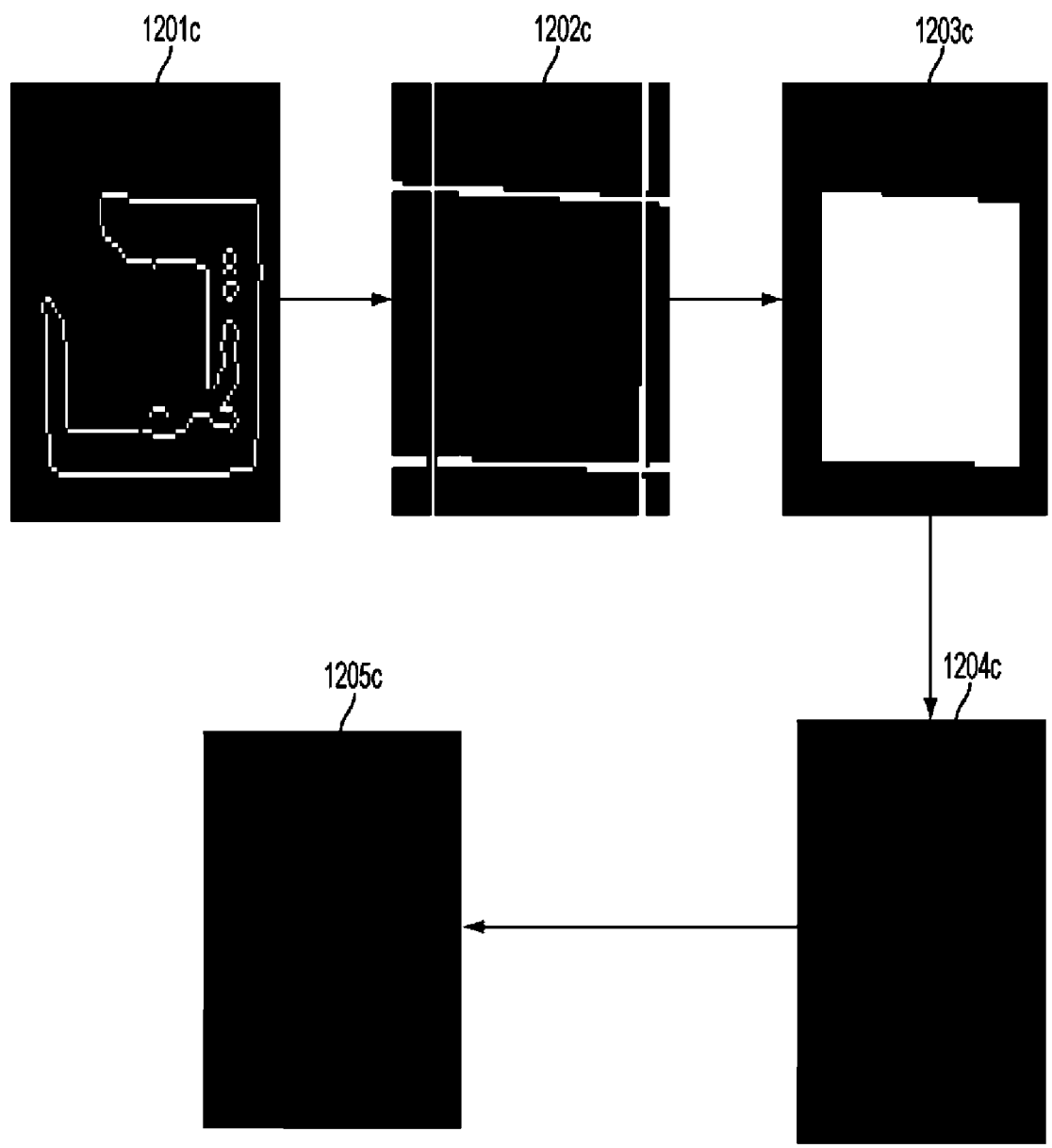
FIG. 12c illustrates the stages of the frame edge extraction algorithm on MTV link according to an exemplary embodiment of the present invention.
Figure 13A:
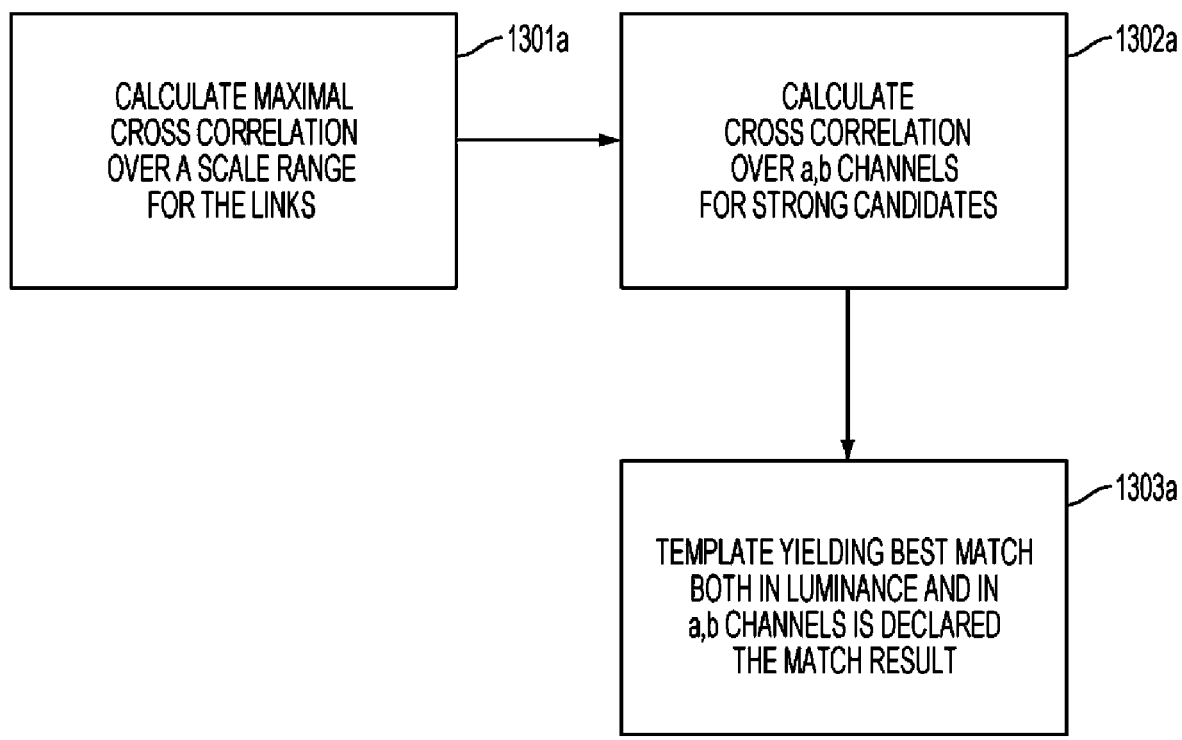
FIG. 13a describes the stages of the logo identification algorithm according to an exemplary embodiment of the present invention.
Figure 13B:
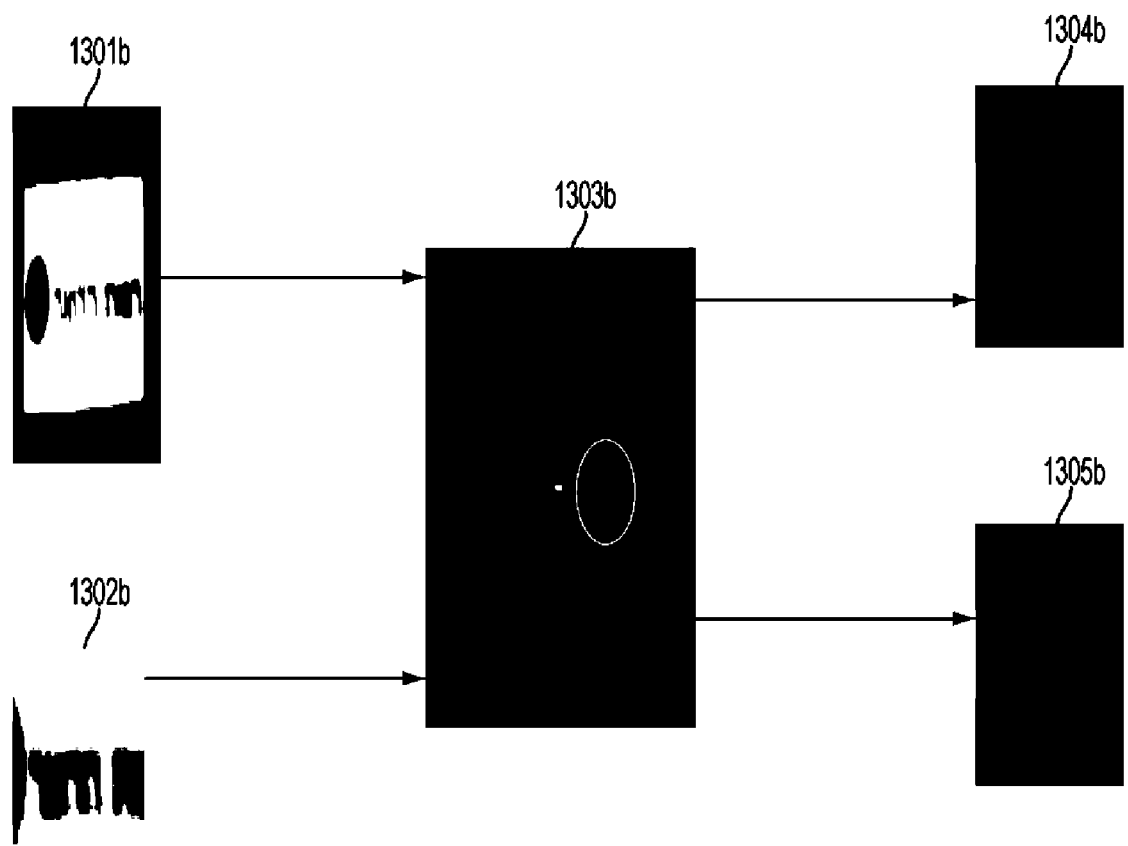
FIG. 13b illustrates the stages of the logo identification algorithm on postal office link according to an exemplary embodiment of the present invention.

One embodiment of the method presented in FIG. 10 is demonstrated in FIGS. 11-13. For this specific embodiment the screens of the processing stages for various documents have been saved along with the algorithmic description. Therefore the FIGS. 11b and 11c, 12b and 12c, and 13b, are illustrations of the FIGS. 11a, 12a and 13a, respectively. Moreover, the fact of selection of a specific embodiment for illustration purposes allows more detailed description of each algorithmic stage, than in more generic case illustrated on FIG. 10.

Stage 1 element 1001: The preprocessing stage 1001 illustrated by image resizing and illumination correction. Since a wide variety of imaging devices, imaging settings, illumination settings, image sizes, and compression settings, can be used by the different users, a certain image size and image illumination level correction should take place. The process of image resizing and illumination level correction is composed of the following phases.

Phase 1.1: Correcting the scale by resealing 1101a the image while maintaining the aspect ratio between the height and width of the image.

Phase 1.2: Blacken the overexposed areas 1102a, by thresholding the illumination values. The results of applying phases 1101a and 1102a on two independent images 1101b and 1101c are illustrated in 1102b and 1102c. The images 1101b and 1101c represent links photographed from on matte and glossy paper respectively. Please notice that processing of the photographs from glossy paper 1101c is more demanding to all related algorithms than 1101b when illumination artifacts are considered.

Phase 1.3: Histogram equalization phase 1103a is performed in two steps: for luminance and color correction respectively.

Step 1.3.1: Histogram equalization for luminance correction. If the average grayscale values of the image's intensity map are below a certain threshold, an incremental histogram stretching process takes place to bring the image into the acceptable range. This procedure is more powerful than regular (power γ) gamma correction and less distorting than common histogram equalization. It is important to note that all of this processing takes place in the Lab colorspace. Hence, only the luminance value is changed, while the color properties are preserved. The results are illustrated in 1103b and 1103c.

Step 1.3.2: Histogram equalization for color correction. Some imaging devices perform automatic internal color balancing. Thus, they modify the colors in the image based on the image contents. Furthermore, devices use sensors and filters with different color response curves, thereby creating a large variation in perceived colors. These color variations can affect the detection of the frame as well as the icon identification process. Hence the process can optionally include the application of a color correction procedure (e.g., in the Lab color space) which maintains luminosity yet modifies the a,b color components based on the image or type of imaging device.

Stage 2 element 1002: Detection of the surrounding frame for the object to be recognized and extraction of the object. The surrounding frame is some graphic sign which clearly encapsulates for the user the area defining the "service". The frame may be of a specific color, or of specific luminance levels compared to the background and surrounding images (such as, for example, a black frame on a white/light background, or a white/light frame on a dark/black background). The frame can be distinguishable from the other parts of the image via color, texture, width, orientation, or other features. The frame might be visible only near the corners of the image. The frame might incorporate some trademark associated with the service. The detection of the surrounding frame is performed by a combination of several key phases:

Phase 2.1: Blob detection. The following steps can be outlined:

Step 2.1.1: Frame candidates selection 1104a. The results are illustrated 1104b and 1104c. Perform detection of all pixels in the image that are candidates for belonging to the frame. Special double-thresholding and iterative thresholding procedures may be used. For example, if the frame is expected to be of a red color, all pixels that fit into the category "red" based on their Lab/RGB values, will be detected.

Step 2.1.2: Contiguous block labeling 1105*a*, that is, accumulation of the frame candidate pixels into distinct, contiguous objects. The results are illustrated in 1105*b* and 1105*c*. This step might apply a certain number of erosion and dilation steps as well as more advanced procedures.

Step 2.1.3: Likely block selection 1106*a*. The results are illustrated in 1106*b* and 1106*c*. Sanity testing and filtering based on a priori known geometric properties of the frame. If, for example, the frame is a rectangular object with certain proportions, then blocks of pixels that deviate from these proportions, from the total size or other geometric parameters of such a rectangle, are eliminated from the candidates' list.

Phase 2.2: Determination of the frame's edges:

Step 2.2.1: Performing an edge operation 1201*a* (such as the Canny edge operation) on the binary image of the pixels belonging to a single contiguous object. The results are illustrated in 1201*b* and 1201*c*. Notice that the edge operators might perform better on some combination of grayscale and binary images.

Step 2.2.2: Determine edge lines 1202*a*. The results are illustrated 1202*b* and 1202*c*. The Radon/Hough transform is applied to the edge image. Substantially vertical/horizontal lines are searched for. These lines are expected to exist at edges of the frame.

Phase 2.3: Extraction of the frame's content (the area with the actual picture/logo). Notice that this step can become tricky in "poor focus" condition due to "diffusion" between the frame and the content:

Step 2.3.1: Determine internal area and shape 1203*a*. The results are illustrated 1203*b* and 1203*c*.

Step 2.3.2: Scale internal pixels to fixed size and geometry 1204*a*. The results are illustrated 1204*b* and 1204*c*.

Step 2.3.3: Convert to Lab and extract luminance 1205*a*. The results are illustrated 1205*b* and 1205*c*.

Stage 3 element 1003: Geometric correction (resizing/rotation) of the content in order to restore a default size and orientation to the image. Perspective transform usually provides the best performance, but is more sensitive to accuracy in frame detection. Further in the process, sensitivity to the image geometry is minimized by using additional algorithmic steps. The reduction in frame detection accuracy may be caused by poor focus, low resolution, or some other illumination problems. It is important to note that knowledge about the frame properties (e.g., the aspect ratio) is used here to correct the image for better subsequent recognition. Other information about the frame (e.g., color, thickness, uniformity) can also be used to perform better image processing on the banner image encapsulated by the frame.

Stage 4 element 1004: Comparison of the resized/corrected image of the insides of the frame obtained in stage 1003 to the database of logos/pictures. This comparison is performed in three phases, as depicted in FIG. 13*a* and FIG. 13*b*, as discussed herein:

Phase 4.1: A rough comparison by calculating the normalized cross correlation. Calculate maximal cross correlation over a scale range for the links 1301*a*. An illustration is given on 1301*b*. The sample 1301*b* is correlated with a template 1302*b* available from the database stored in computational facilities. The correlation result of the luminance channel 1303*b* has a definite maximum. The same maximum appears in the color channels a and b called 1304*b* and 1305*b*, respectively. The correlation provides a fit between the scaled version of the image and a set of templates representing a given logo/symbol. Even though the frame extraction process yields a good estimate of the scale and angle, this rough comparison is done over a set of width and height scales. Six different scales for each dimension of the two might be used, ranging from a given size to twice this size in each dimension. The maximum fit for each scale choice is searched for. The search is performed in a given area around the center of the image, reflecting an expectation that the logo/picture has been quite accurately located inside the frame.

Phase 4.2: For elements of the database where the "rough" comparison has yielded a fit measure exceeding a certain threshold, a more demanding (and time consuming) calculation is performed. Calculate cross correlation over a,b channels for strong candidates 1302*a*. The a and b channels are less sensitive with respect to image focus and illumination. This step is supposed to deal with subtle changes in the image, including perspective geometry corrections, illumination variations across the image, and similarity between various templates. It is possible to utilize the algorithms also used for OCR and for logo recognition, which are described in U.S. patent applications Ser. No. 11/266,378, incorporated herein by reference, entitled "SYSTEM AND METHOD OF ENABLING A CELLULAR/WIRELESS DEVICE WITH IMAGING CAPABILITIES TO DECODE PRINTED ALPHANUMERIC CHARACTERS" by the inventor Zvi Lev, filed on Nov. 4, 2005, and also the algorithms described in U.S. patent application Ser. No. 11/293,300 previously cited.

In a nutshell, the normalized cross correlation of the image with a set of templates and sub-templates of the assumed logo/picture is calculated, and the product of these cross correlations is calculated searching for a unique "peak" in the image space.

Phase 4.3: Template yielding best match both in Luminance and in a,b channels is used for the computation of the match result 1303*a*.

Stage 5 element 1005: Since several items in the database may yield a match exceeding the minimum threshold, the most likely candidate is picked by searching for a maximum value of the normalized cross correlation for the template and the subtemplates. Alternatively, methods involving more advanced classification technologies may be used. Some candidate methods would be:

Method 5.1: Distance measurement classification methods such as the Mahalanobis distance, where the distance of the image from the database images is computed and weighted via statistical weights to determine which is the closest image in the database in terms of selected statistical distance.

Method 5.2: Clustering methods (e.g., Knn) where the distance to several images in the database is used.

Method 5.3: Neural networks, which after training on a training database can classify a new image.

Method 5.4: The database may include for each logo/picture multiple versions of this image taken from different angles, under different lighting conditions. This would improve recognition as the actual image to be classified would more closely correspond to one of these images than to a single "ideal" reference image of the logo taken under optimal conditions.

Below are some variations on the procedure discussed above:

Variation 1: Using control points instead of frame. It is important to note that for the process described above, it is also possible to use as a "frame", certain distinguishing/prominent features of the logo/picture itself Instead of searching for the frame, one could look for the logo/picture. To this end, it is possible to search (via the method outlined in U.S. patent applications Ser. Nos. 11/266,378 and 11/293,300, both previously cited, or by some other method) for some "control points" on any image submitted to the system. Once the control points relevant for a specific logo are found, and their relative position is determined by the system to conform to what is expected, then stages 3 & 4 outlined previously are executed in the same manner as when using a visible frame. One possible advantage of this method is that no visible frame is required. Hence, the method applies to objects already printed in the past, and does not require any conscious effort on the side of the printed ad/page designer. On the other hand, the computational effort required from the processing server is greater (since there is a need to locate "control points" for a multitude of potential logos/pictures), and the user may have a hard time determining which area of the page to image. Furthermore, the reliable location of control points can be difficult when the logo/picture is a fuzzy image with no clear distinct local features and/or when the image taking process has created a very blurry image (see FIG. 14).

Variation 2: Using marks made by user. It is easy to provide the user with the capability to mark the object of interest using some pen or color marker or semi-transparent mask. As long as the mark follows some reasonable guidelines (which is to say, that it has a good contrast to the background and is connected), it is possible to use the detection of the mark instead of the frame. In this case, the object of interest might not appear in the middle of the frame and a larger search might be required. Moreover, the irregular shape of the frame might create some algorithmic difficulties. The main advantage of this marking is potential density of logos/images on the printed page.

Advantage 1: Putting markers inside the logo. Generally, the markers strategically placed in the logo itself might function as well as a frame around the logo. This is important for example, when combining company logo as a marker to product logo as the symbol of interest, further reinforcing the marketing message.

Advantage 2: Using Logos/pictures which are combinations of separate symbols/pictures/logos. An example would be a combination of a logo that can be recognized by the procedure described above as well as some set of symbols (e.g., machine readable codes or digits or letters) that can be decoded by different methods to yield additional information (see FIG. 9). This combination of visual symbol and machine code is important for example, when combining general information such as a discount campaign with a specific detail, such as a unique coupon number.

The algorithms previously described in the last section address and solve some specific issues not handled by previous technology which are pertinent to the described usage method (that is, picture taking by mobile imaging devices). Some of the usages of the algorithms include the following:

Usage 1: The use of a frame surrounding the object to be identified (where that frame can be a contiguous section of the image or some other mark such as, for example, points in the edge of the logo/picture) solves the problem for the user of knowing what to include in the picture, and also gives the processing algorithms a solid reference point to use in order to scale the image to a given orientation, pixel size, and geometry. This is a unique feature not referenced or used in the image-database search literature. The feature is based also on the fact that in the exemplary embodiment of the present invention, the designer of the advertisements/printed material is knowingly placing those "frames" in order to make the content accessible via the method outlined here.

Usage 2: The use of normalized cross correlation between a resized version of the inside of the frame and multiple templates in the database is a solution to the problem of multiple imaging devices with very different imaging characteristics. For example, the grayscale values of each the R, G or B bands of an image may depend considerably on the imaging device, since different digital camera sensors and different illumination conditions (for example, sunlight versus fluorescent light versus incandescent light) may change the relative intensities of different regions in the image in a given band. By enabling the usage of several different templates for a given image in the database, these differences can be addressed. It is important to note that the image database search literature does not usually address this problem, as it is assumed the images were taken from some web site and hence were not subjected to color changes related to imaging device/illumination conditions.

Usage 3: The utilization of the multi-template normalized cross correlation method once the scale has been determined using a single former normalized cross correlation calculation is a unique concept, first described in U.S. patent applications Ser. Nos. 11/266,378 and 11/293,300 previously cited, and developed further in the present application. Such utilization allows for reliable recognition under the real-life imaging conditions provided by handheld imaging devices.

Usage 4: The utilization of the Radon/Hough transform combined with the canny edge operator in order to determine the edges of the surrounding frame.

Usage 5: The utilization of the luminance profile across the frame's edges in order to estimate the illumination and contrast distribution across the image. Since the frame itself is of uniform (or substantially uniform) Luminance/color, variations in Luminance across it can reflect a combination of one or more of the following effects:

Effect 1: Non-uniform illumination of the image. For example, if the light falls on the image from some angle, there is a color gradient on the image. If the user stands between the light and the image, the frame is partially covered. If there is a light blink from the page, the appropriate part of the frame will become white.

Effect 2: Poor light conditions. For example, if the light in the room is poor, there is much higher amount of noise on the frame.

Effect 3: Motion blur. If the camera moves, say horizontally, during imaging, then the contrast along the horizontal lines will be much higher than along the vertical lines.

Figure 14:
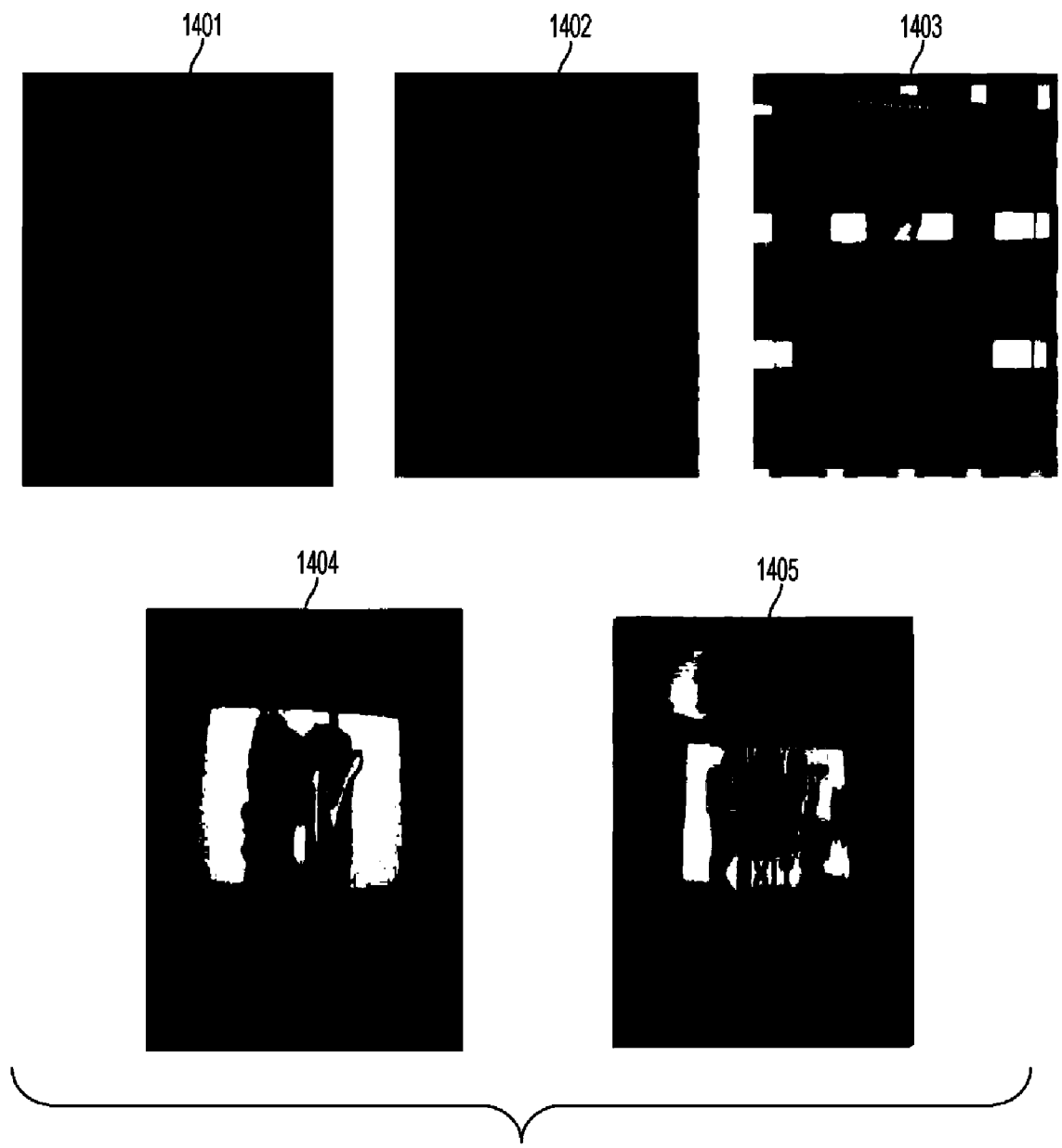
FIG. 14 contains sample images and the differences between the original printed/displayed image and images taken under real life condition by a mobile/portable imaging device according to an exemplary embodiment of the present invention.

FIG. 14 illustrates some artifacts typical for the system discussed in this exemplary embodiment of the invention.

Illustration 1401: Illustration 1401 demonstrates the perspective geometry effects caused by an operator not holding the camera exactly above the link.

Illustration 1402: Illustration 1402 shows various illumination-associated effects, including:

Effect 1: Partial shadow on the right part of the link is caused by the camera partially blocking the light from the light source.

Effect 2: Overexposed area in the upper left part of the link is caused by the glossy texture of the link reflecting the light from the light source.

Effect 3: Non-uniform illumination of the link, here a slight gradient of the illumination, is caused by the upper part of the link getting slightly more light exposure than the lower part of the link.

Effect 4: The non-projective geometric effect in the lower left part of the link was caused by physical deformation of the link, that is, the journal was placed upon the operator's lap and therefore slightly curved.

Illustration 1403: Illustration 1403 demonstrates the effects caused by imaging a link from a CRT screen. The following effects could result:

Effect 1: Banding artifacts on the screen caused by beam scanning mechanism of image generation.

Effect 2: Color balance change from yellow toward the blue colors is typical for all screen snapshots and appears also in Plasma/LCD screen.

Illustration 1404: Illustration 1404 shows the effects of low intensity illumination, including:

Effect 1: High statistical noise appears on the image.

Effect 2: Color balance change toward yellow is caused by the sensitivity of the detector.

Effect 3: The image is blurred due to longer exposure time.

Illustration 1405: Illustration 1405 shows effects associated with video transmission artifacts typical to 3G mobile devices, including:

Effect 1: The image is non-uniform since it was composed from multiple frames. Effect 1a: The artifacts of the P-frames are stronger than the artifacts of the I-frames due to compression. Effect 1b: The video frames with many details suffer more from the compression artifacts. Effect 1c: The non-uniform motion of the operator causes blurred frames in video sequence. Effect 1d: The imaging conditions including geometrical deformations vary between frames.

Effect 2: The effects of imperfect registration of the video frames are highly visible.

Effect 3: Some video frames are lost during the transition.

Effect 4: Blocking artifacts appear due to MPEG compression.

Effect 5: Since video is typically defined in lower resolution (QCIF) than the imaging (VGA), the detail level of the link in the video sequence is lower than in the single image application.

Figure 15:
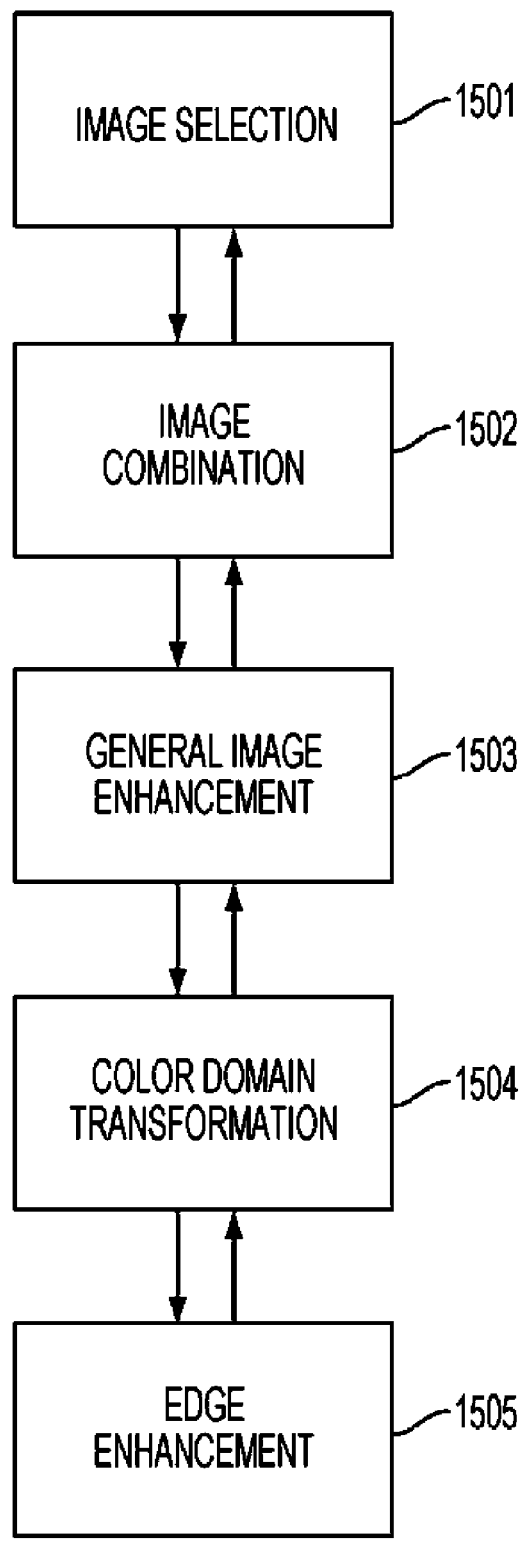
FIG. 15 shows the image/video frames preprocessing algorithmic flow according to an exemplary embodiment of the present invention.

FIG. 15 illustrates image preprocessing for frame detection and symbol recognition in a general form. Note that the order of stages in FIG. 15 is one configuration, but this order is not obliging. The preprocessing operation may take advantage of the knowledge of the mobile device type the images. For example, color correction, geometrical correction, and sharpening measures, applied as part of the preprocessing may be adapted according to device type and knowledge about the optics, imaging sensor, compression technology, etc., used in this device. The device type can be known by the communication protocol (e.g., in the 3G-324M video call protocol, the Multimedia Messaging System-MMS-protocol and the WAP protocol of the device type are provided) or by a database connecting the user device type based on the user's MSISDN or IMEI number. Such a database can be provided by the cellular operator or by the user upon registration to a service.

Figure 16:
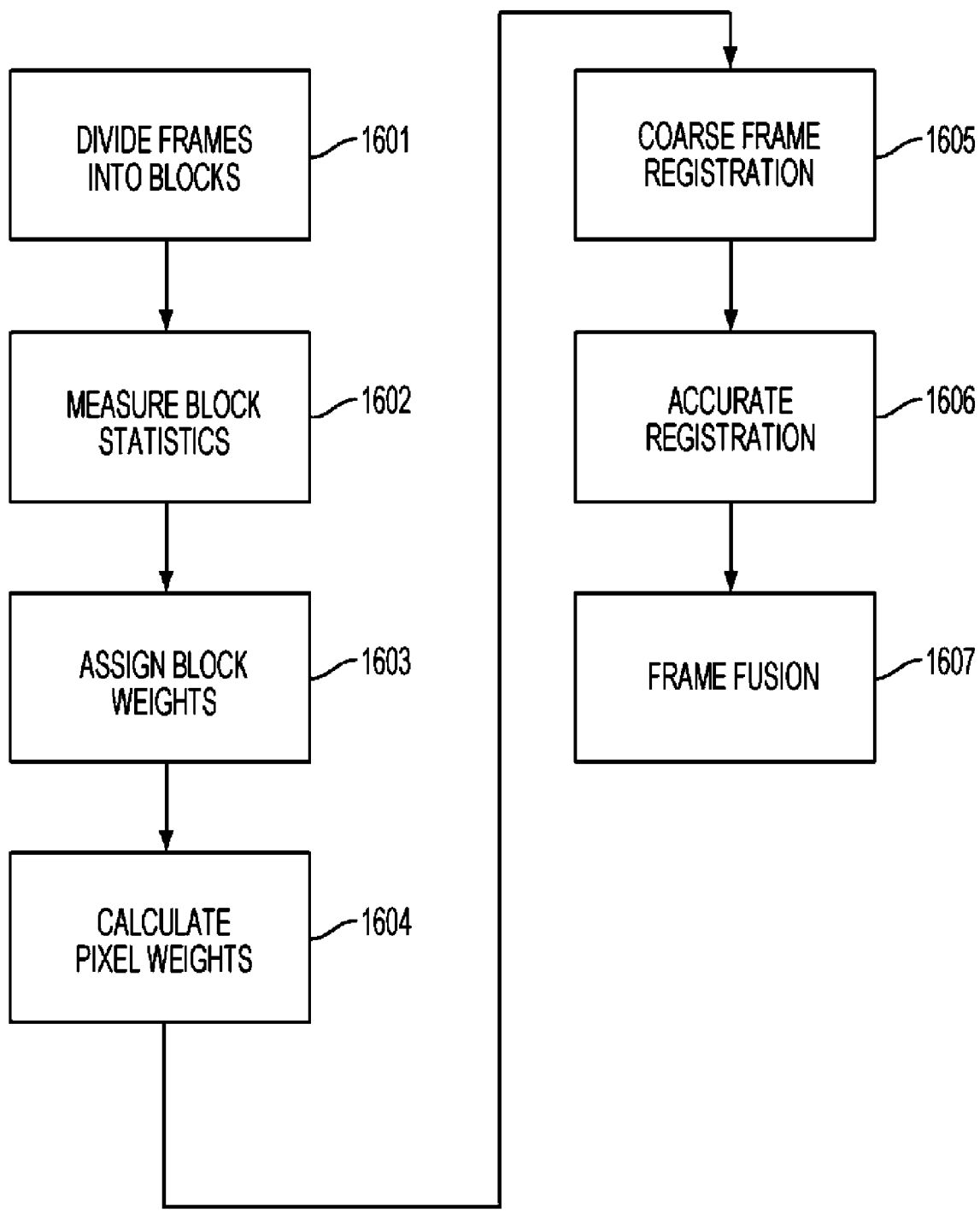
FIG. 16 shows image/video frames selection and combination according to an exemplary embodiment of the present invention.

Stage 1 element 1501: Image selection 1501 implies filtering out irrelevant data to select the final image and reduce the noise in the final image. Below is one embodiment of such procedure, also shown in FIG. 16. The idea behind FIG. 16 is usage of multiple image frames, video frames, and statistics, to produce one image with best possible characteristics via weighted average of the best pixels in each frame as following. The process may be described as follows:

Phase 1.1: Each image is divided 1601 into medium-sized, e.g. 64×64 pixels optionally overlapping blocks.

Phase 1.2: For each block, the information is measured and statistics created 1602. The idea is to calculate block-wise weights for image blocks. The block information used to calculate mark can include:

Information 1.2.1: Entropy.

Information 1.2.2: Standard deviation or other Lp statistics, such as, mean square error, median absolute deviation, contrast, etc.

Information 1.2.3: Illumination, such as colors, or overexposed/underexposed areas.

Information 1.2.4: Focus/resolution measures, such as derivatives of image grayscale, edge width, edge contrast, and amplitude of high frequencies.

Information 1.2.5: Noise measure, such as Lp statistics in small 3×3 pixel neighborhoods.

Note that the image and video frames of interest can be selected by the human operator, using the keyboard of the device or another input medium. In this sense, the human input can be treated as an information channel with binary data (for example, frame and block selected or not selected by the user).

Phase 1.3: Assigning each block a mark 1603 or weight W between 0 and 1 based on the blocks statistics. The idea is to merge multiple parameters available from 1602 into a single number per block. When multiple statistics are available, it is possible to train an artificial intelligence mechanism, such as a neural network or genetic algorithm, for best combination of statistics.

Phase 1.4: Interpolate pixel weight 1604 from overlapping block weights. For example, the Matlab™ griddata common with bicubic interpolation may be used. (References: T. Y. Yang, "Finite Element Structural Analysis", Prentice Hall, 1986, pp. 446-449, and David F. Watson, "Contouring: A guide to the analysis and display of spatial data", Pergamon, 1994. As the result of 1604, the weight will be assigned per pixel with smooth transitions between pixels.

Note that when combining the image/video frames 1607, the result is a weighted combination of the frames, that is, a weighted average of the frames according to the formula Result=(W1*Frame1+W2*Frame2 . . . )/(W1+W2+ . . . ). This way, the meaningful information inside each video frame is used for the final image computation, allowing removal of noisy, shadowed, and overexposed areas.

Stage 2 element 1502: Image and video frames combination 1502 effectively reduces the amount of irrelevant data at the input of the recognition process, and improves signal-to-noise performance of the resulting images. A sample implementation of stage 1502 is discussed in detail in U.S. patent application Ser. No. 11/353,151 previously cited.

In the general case, stage 1502 is comprised of the following phases:

Phase 2.1: Coarse pair-wise image registration 1605, using templates (as described in U.S. patent application Ser. No. 11/353,151 previously cited) or Phase Correlation (FFT registration) mechanism in order to estimate the image to image transformation approximately, prior to applying accurate transformation.

Phase 2.2: Accurate image registration 1606, usually implies the detection of projective transformation with sub-pixel accuracy between each pair of images, as discussed in detail in U.S. patent application Ser. No. 11/353,151 previously cited.

Phase 2.3: Image averaging/stitching/fusion 1607, usually applies local weighted averaging after the images or video frames are transformed into a common coordinate system.

Figure 17:
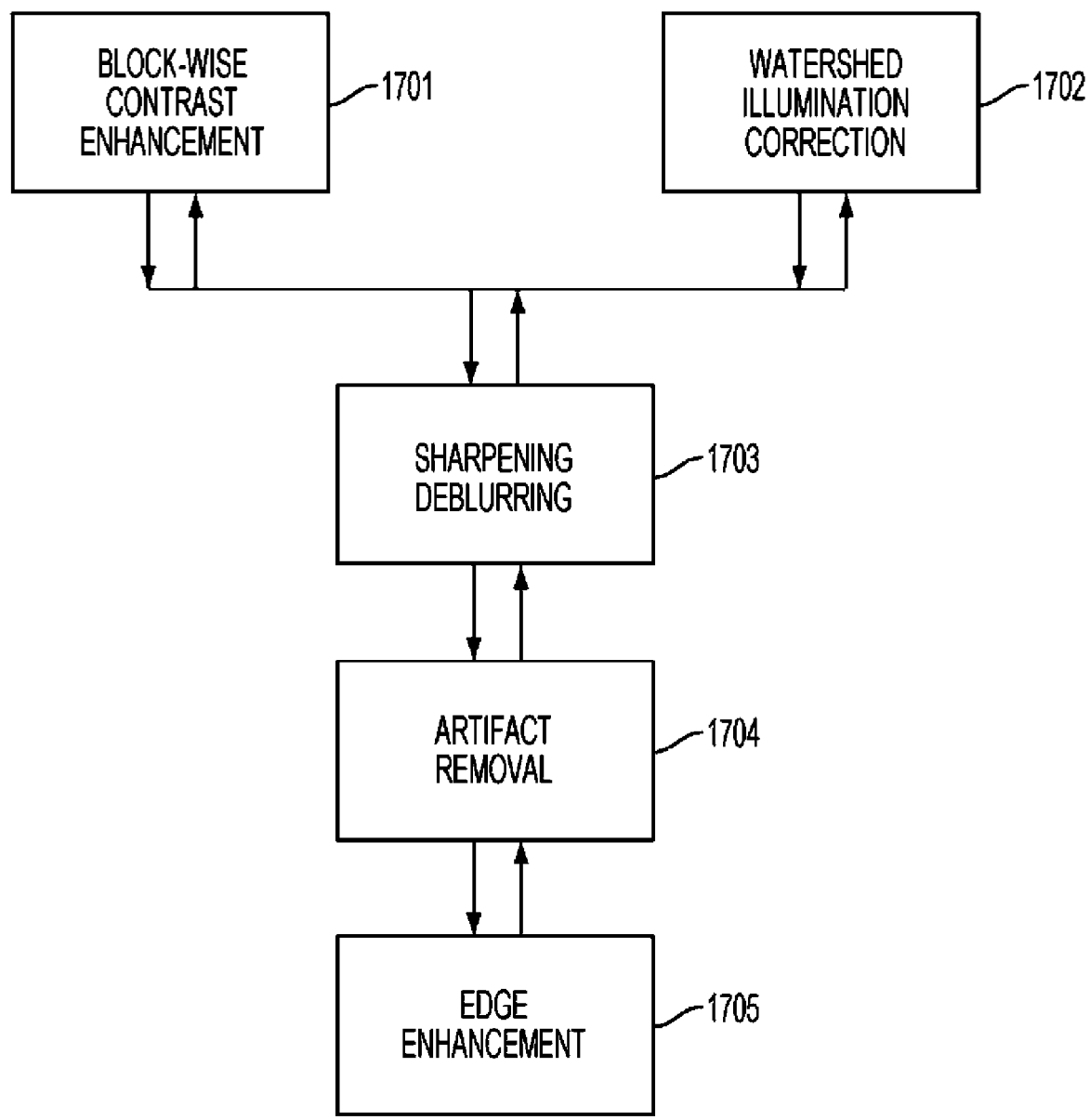
FIG. 17 shows general-purpose grayscale image enhancement according to an exemplary embodiment of the present invention.

Stage 3 element 1503: General image enhancement 1503 allows improvement of the image quality for link detection and recognition using some general properties of the images with links. General image enhancement 1503, also shown in FIG. 17, consists of the following phases:

Phase 3.1: Illumination uniformity correction eliminates contrast and luminance differences between various image areas. The same ideas can be applied for the color channels. Two possible implementations are:

First Implementation 3.1.1 of illumination correction: block-wise contrast enhancement, as shown also in 1701.

Step 3.1.1.1: Divide the image into blocks, such as, for example, 16×16 pixel overlapping blocks.

Step 3.1.1.2: In each block, try to find white reference level and black reference level, e.g., the 16-th highest grayscale is considered white reference if its grayscale is above 128, and the 16-th lowest grayscale is considered black reference if its grayscale is below 64.

Step 3.1.1.3: Calculate block-wise white and black reference levels over the image using a triangulation technique or other techniques. (An example of a triangulation technique is the Matlab™ griddata function, discussed in David F. Watson, "Contouring: A guide to the analysis and display of spatial data", Pergamon, 1994, cited previously.) Since some black and white reference points are missing for overlapping 16×16 blocks, this stage allows getting both white and black reference points for all non-overlapping 8×8 image blocks.

Step 3.1.1.4: Use a filter, such as, for example, a 5×5 Wiener filter (implemented in for example, the Matlab™ wiener2 function, reference: "Two-Dimensional Signal and Image Processing" by Jae S. Lim, pp. 536-540) to smooth the noise computation. Alternatively, fit a number of parametric surfaces to the data (using weighted least squares technique with parabolic surface approximation).

Step 3.1.1.5: Interpolate (for example, up-sample using sync interpolation) the black and white reference planes for the whole image in order to get pixel-wise weights.

Step 3.1.1.6: Use a pixel-wise transform such as aV+b to put the white and black references to the same level throughout the image. The transform parameters a and b are calculated from the white and black reference planes.

Second Implementation 3.1.1.2 of illumination correction: watershed-based algorithm 1702. The watershed algorithm is used for segmentation and clustering of the image, so that only text/symbol areas and background areas are used for illumination correction. Note that another clustering algorithm, such as Matlab™ kmeans (References: Seber, G. A. F., Multivariate Observations, Wiley, New York, 1984; Spath, H. (1985) Cluster Dissection and Analysis: Theory, FORTRAN Programs, Examples, translated by J. Goldschmidt, Halsted Press, New York, p. 226) command can be used instead of the watershed.

Step 3.1.2.1: Perform watershed segmentation of the image using, e.g., Matlab™ watershed command (reference Beucher, S., Watersheds of Functions and Picture Segmentation, ICASSP82 (1928-1931))

Step 3.1.2.2: For each segment measure the following properties:

Property 1: mean value.
Property 2: contrast and grayscale variance.
Property 3: size and orientation.
Property 4: high-frequency components.

Step 3.1.2.3: Use neural network to classify the segment based on its properties and the properties of other segments in the image. The following categories may be used:

Category 1: Overexposed area, very bright and no contrast.
Category 2: Potentially overexposed, very bright medium contrast area bordering overexposed area.
Category 3: Background white, large bright and low-contrast area.
Category 4: Text/symbol on background, small high-contrast area.
Category 5: Underexposed, large dark area.
Category 6: Frame candidates.
Category 7: Noise, including anything else.

Step 3.1.2.4: Divide large segments into smaller parts (e.g., using the Matlab™ watershed command with lower tolerance to grayscale variations, reference: Meyer, F., and Beucher, S., Morphological Segmentation, JVCIR (1), No. 1, September 1990, pp. 21-46).

Step 3.1.2.5: Calculate reference values:
Calculate black reference from the text segments only (minimum value).
Calculate white reference (median value) results from background segments only.

Step 3.1.2.6: Use combination of filtering, interpolation and pixel-wise transformation steps similar to 1701, Steps 3.1.2.3-6.

Phase 3.2: Sharpening/deblurring 1703 implies improvement of image sharpness. Potential algorithms for sharpening and blind deconvolution include:

Algorithm 1: unsharp masking,
Algorithm 2: Lucy-Richardson deconvolution,
Algorithm 3: FFT deconvolution (with Wiener filter),
Algorithm 4: nonlinear contrast enhancement in moving window.

Phase 3.3: Artifact removal and denoising 1704. Possible algorithms include:

Algorithm 1: blocking (JPEG) artifact removal,
Algorithm 2: Wiener filter,
Algorithm 3: translation-invariant wave let denoising,
Algorithm 4: rank filters for outlier removal (salt and pepper noise),
Algorithm 5: morphological filtering e.g. top-hat etc.

Figure 18:
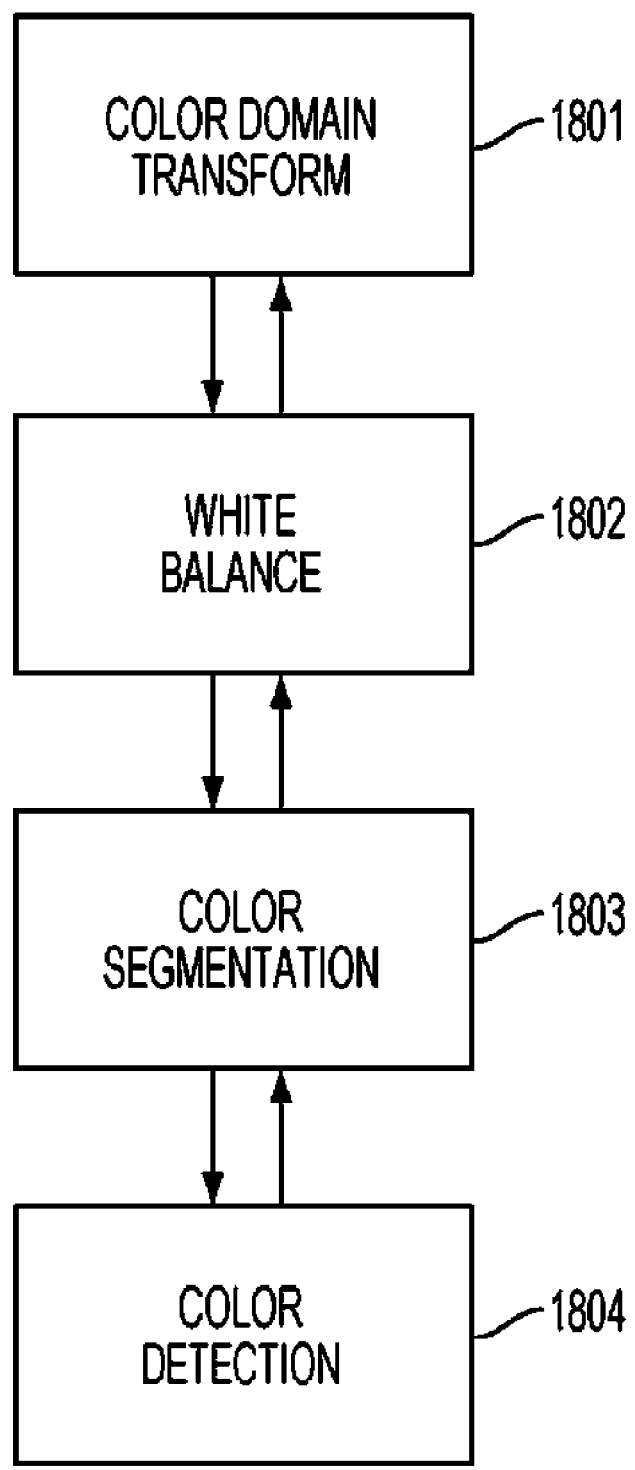
FIG. 18 shows general-purpose color processing according to an exemplary embodiment of the present invention.

Stage 4 element 1504: Color domain transformation 1504, also shown in FIG. 18, implies the following procedures:

Procedure 4.1: LAB/HSV/LUV color and luminance separation transforms 1801. The motivation is different processing in various color planes, such as frame detection in AB planes and symbol recognition in Luminance plane.

Procedure 4.2: White balancing 1802. The white reference surface found in stage 1503 can appear colored due to the light source used during the image acquisition. The light typically appears bluish or yellowish. White balancing based on the white reference detection is required for subsequent color processing. This means applying linear or not-linear transformation with varying parameters for each color axes. The process could be:

Step 4.2.1: Select the white reference, by masking "white" areas only, that is, areas with high luminance and low saturation, and then calculating the average RGB values by Rw, Gw, Bw and target white value Tw=(Rw+Gw+Bw)/3;

Step 2: Calculate gray reference and black reference values Rg, Gg, Bg, Tg, Rb, Gb, Bb, Tb, similarly to step 4.2.1.

Step 4.2.3: Calculate the parameters for red color transformation: Rnew=Ar+Br*power(Rold, Cr), so that Ar+Br*power(Rw, Cr)=Tw, Ar+Br*power(Rg, Cr)=Tg and Ar+Br*power(Rb, Cr)=Tb. Apply the transformation for Red color values.

Step 4.2.4: Similarly to step 3 calculate and apply transformation for green and blue color planes.

Procedure 4.3: Color segmentation 1803. Using image segmentation algorithms, such as k-means (Matlab™ kmeans function, references Seber, G. A. F., Multivariate Observations, Wiley, New York, 1984 and Spath, H. (1985) Cluster Dissection and Analysis: Theory, FORTRAN Programs, Examples, translated by J. Goldschmidt, Halsted Press, New York, p. 226), it is possible to separate the image into the most common color components. For example, if the foreground is black, the background may be white, yellow or cyan. Color segmentation is especially helpful with frame detection when the frame's color is not a priori known, or when the frames are composed of multiple colors, or when there is some other uncertainty about the color.

Procedure 4.4: Color detection 1804 can be used instead of color segmentation 1803 if the frame's color is a priori known. For example, if it is known that the color of the frame is orange, then all orange blobs in the image can be detected.

Stage 5 element 1505: Edge enhancement stage 1505 (also stage 1705) allows better registration, frame detection, and geometry correction. The edge data may be kept in a separate channel for frame detection and recognition purposes. Alternatively, the grayscale representation of the edge pixels may be augmented, so that the image appears sharper in the following recognition stages 1004 and 1005. The following procedures can be applied:

Procedure 5.1: Derivative-based edge detection, such as, find Canny edge.

Procedure 5.2: Morphological edge enhancement, using, for example, top-hat filter.

Procedure 5.3: Wavelet decomposition into high-resolution and low resolution images.

Procedure 5.4: Edge detection via image segmentation. This is especially useful for frame detection if there are large uniform areas in the image. The edge data is insensitive to illumination variations. Moreover, the binary nature of the edge data allows different form of feature selection. Therefore, the edge data can be used as an additional channel to the following processing stages, the same way luminance and color (hue, saturation) channels are used.

Figure 19:
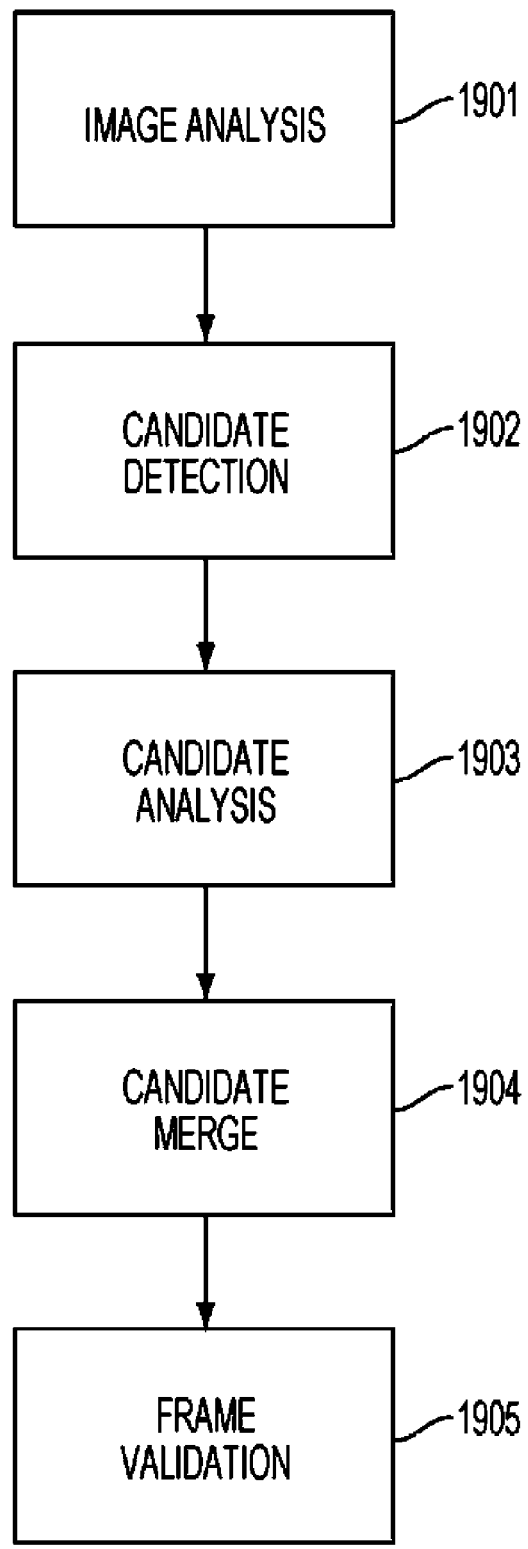
FIG. 19 shows the symbol frame detection flow according to an exemplary embodiment of the present invention.
Figure 26:
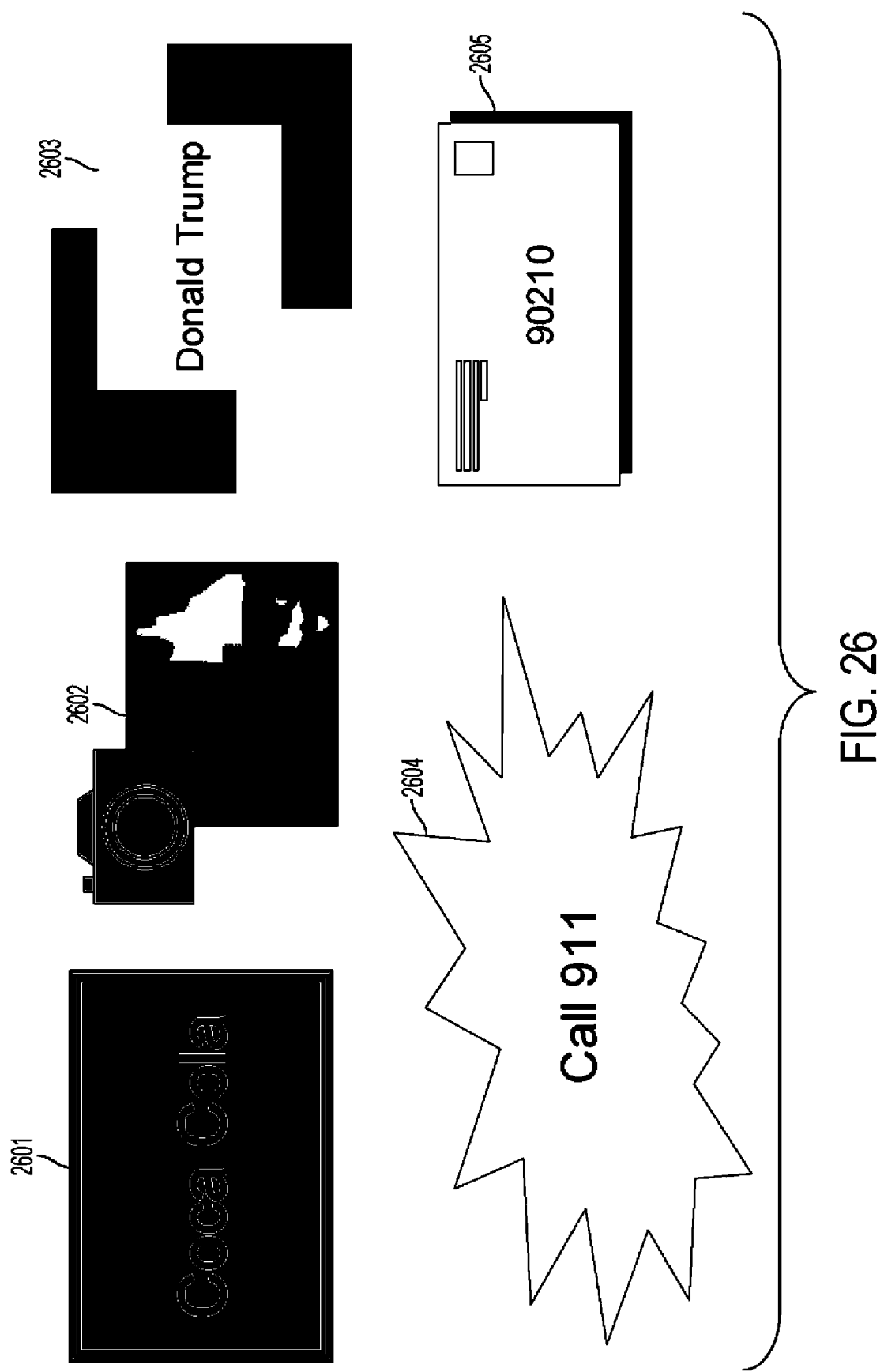
FIG. 26 illustrates variations on possible symbols and possible frames according to an exemplary embodiment of the present invention.
Figure 27:
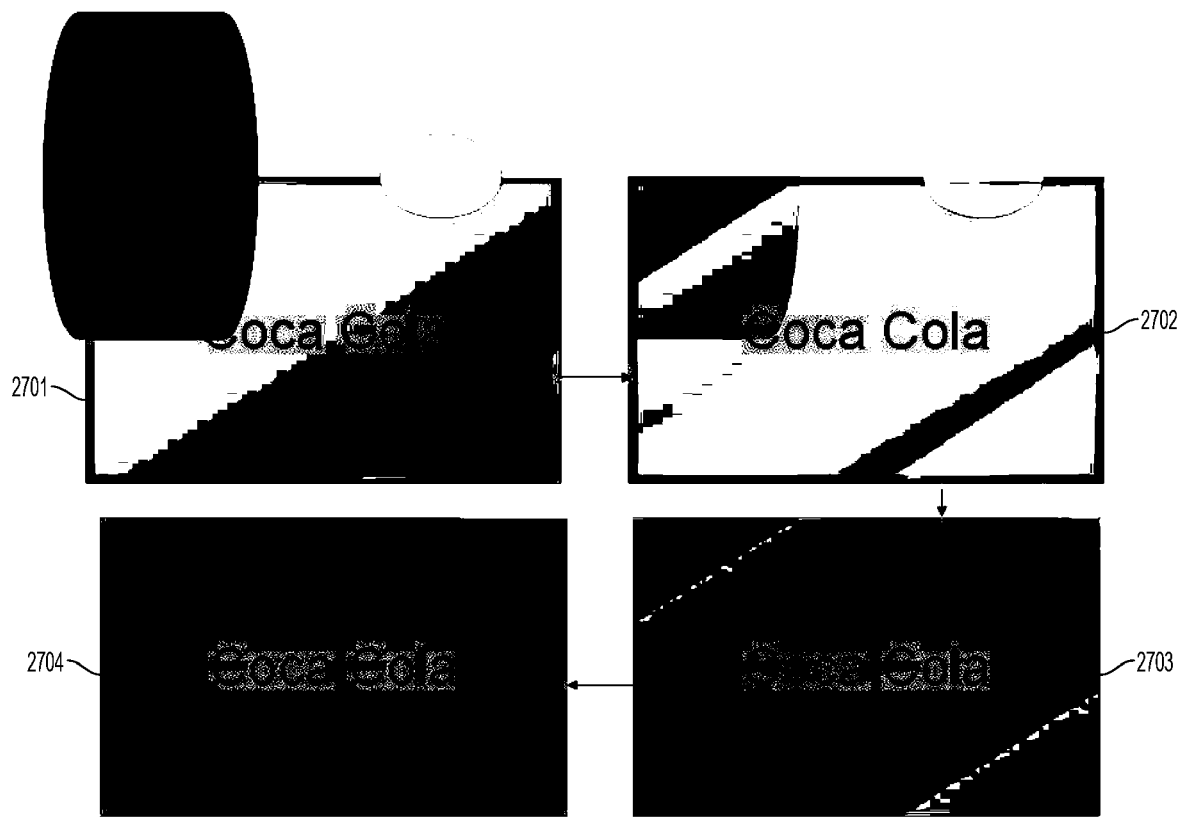
FIG. 27 illustrates various stages of illumination correction according to an exemplary embodiment of the present invention.

FIG. 19 illustrates frame detection of the link's frame in a general form. The detection of link frame is significantly faster and more reliable than detection of the link symbol itself. In this exemplary embodiment of the invention, the link's frame is used in the following embodiments, as illustrated in FIGS. 9 and 26.

Frame embodiment 1: Color rectangular frame with a considerable width. See FIG. 9, element, 901, and FIG. 26, element 2601.

Frame embodiment 2: Large uniform areas of few (1-4) simple colors, surrounding the non-uniform (with multiple details) symbol. See 2603.

Frame embodiment 3: A closed hand-drawn line surrounding the symbol. See 2604.

Frame embodiment 4: A well-defined texture (e.g. dashed line) around the symbol. See 2605.

Frame embodiment 5: A well-defined indicator symbol (e.g., mouse "arrow" icon) in a known range from the symbol-of-interest. See 2602.

Frame embodiment 6: A "natural" textured image around "synthetic" black-and-white symbol. See 907.

In its most general form, the frame detection consists of the following stages:

Stage 1 element 1901: Image analysis 1901 implies getting numeric pixel-wise information whether or not a pixel is a part of the frame. To this end the following techniques can be used:

Technique 1.1: Assuming the frame has some special color, e.g., orange, and the colors have some a priori distribution, it is easy to calculate the probability that any current pixel is orange using the Bias formula Frame=P (Color in image | image).

Technique 1.2: Assuming the frame consists of narrow horizontal and vertical lines of size>15, the following formula enhances the frame:

Outline=(dilate(255−Image, rectangle(3,3)))*(dilate (Image, rectangle(3,3)));

Frame=erode(Outline, rectangle(15,1))+erode(Outline, rectangle (1,15)).

Technique 1.3: Assuming the frame is uniform and the symbol is not uniform, the image can be divided into a number of (optionally overlapping) blocks, and for each block local statistics, such as standard deviation or contrast (max-mean) can be calculated by:

Frame=255*(1−LocalStatistics(Image)/max(LocalStatistics(Image))).

Technique 1.4: Assuming there are some templates associated with the frame, one can calculate normalize correlation of the templates with the image by:

Frame=max_*i*(NormCrossCorr(Template_*i*,Image)).

Technique 1.5: Assuming the spectral characteristics of the frame is approximately known FFTFrame:

Filter=(abs(*FFT*Frame)^2)/(abs(*FFT*Frame)^2+abs (*FFT*(Image))^2);

Frame=*IFFT*(*FFT*(Image)*Filter).

Figure 20:
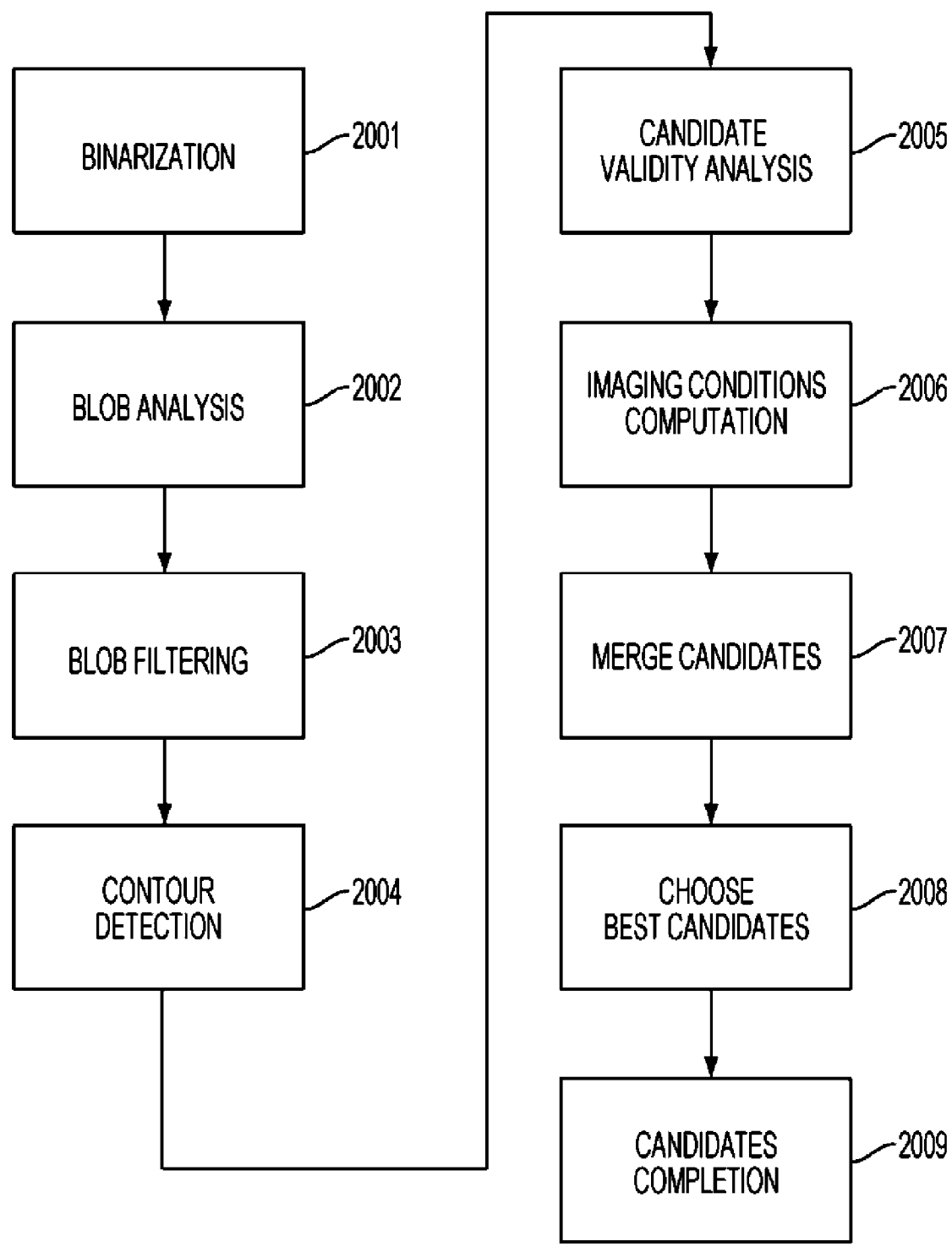
FIG. 20 shows symbol frame detection from frame candidates according to an exemplary embodiment of the present invention.

Stage 2 element 1902: The candidate detection stage 1902 allows detection of large blobs or segments of the frame, based on pixel-wise information available from 1901. During the candidate detection stage 1902, the output of image analysis 1901 undergoes the following processing phases, also shown in FIG. 20:

Phase 2.1: Binarization 2001, such as Otsu thresholding (Matlab™ graythresh function, reference: N. Otsu, "A Threshold Selection Method from Gray-Level Histograms," IEEE Transactions on Systems, Man, and Cybernetics, vol. 9, no. 1, pp. 62-66, 1979.)

Phase 2.2: Blob analysis 2002, such as Matlab™ imfeature function (reference Haralick and Shapiro, Computer and Robot Vision vol. I, Addison-Wesley 1992, pp. 62-64).

Phase 2.3: Blob filtering 2003. Those blobs that are too small, too large, or have strange properties not good for frame candidates, are removed. In case of multiple features and statistics, artificial intelligence algorithm can be trained to provide best filtering performance.

Stage 3 element 1903: The candidate analysis stage 1903 allows setting a confidence level and more accurate shape for each candidate blob found in 1902. During the candidate detection stage 1903 each candidate from 1902 is analyzed, and its contour, validity and imaging conditions are detected:

Phase 3.1: Contour detection 2004 allows setting more accurately the contour of each frame segment, based on pixels that were slightly higher or slightly lower than the threshold during the binarization phase 2001.

Technique 3.1.1: Watershed algorithm using Matlab™ watershed (reference Meyer, F., Topographic Distance and Watershed Lines, SP (38), No. 1, July 1994, pp. 113-125) command, where the starting point (e.g., "marker") is the center of each candidate blob.

Technique 3.1.2: Double thresholding:

Step 1: repeat the candidate detection with different conditions (for example, lower the binarization threshold), Step 2: keep only the pixels neighboring the area of the candidate blobs.

Technique 3.1.3: Morphologic filtering of the contour using combination of morphological close and open operations with various directional filters. The parameters of the filters can be calculated via morphological skeleton and distance functions.

Technique 3.1.4: Active contour dynamic programming. The number of points is set based on the shape (convex hull) of the candidate blob and of the extended candidate blob (found by watershed or double thresholding). The starting shape lies between the contours of the two candidate blobs.

Phase 3.2: Candidate validity analysis 2005 allows filtering out of inappropriate frame blobs using one or several of the following techniques:

Technique 3.2.1: using statistics of all frame pixels inside the candidate contour, keep only large frame candidates blobs.

Technique 3.2.2: using the energy function of the active contour algorithms of the candidate blobs, e.g., using the blobs of simple geometric form.

Technique 3.2.3: using blob features, such as moments, blob sizes, or prolonged horizontal or vertical blobs.

Technique 3.2.4: using artificial intelligence to combine results of various features, perhaps through classification of frame candidates.

Phase 3.3: Imaging conditions 2006, such as illumination color, contrast, exposure, blur, properties of the frame are calculated per candidate. This step provides the information required for successful merge of frame candidates 2007. For example, it is unlikely that the sharpness of the frame changes significantly along the frame, or that the shadowed and overexposed areas appear very close to each other.

Stage 4 element 1904: Candidate merge stage 1904 (also 2007) allows construction of few large frame candidates from numerous frame candidate segments. Candidate merge stage 1904 (also 2007) consists of the following steps:

Phase 4.1: Find candidates with high validity, such as large blobs;

Phase 4.2: Find candidates with lower validity in the vicinity of high-validity candidates, that is, reconstruct large frame segments;

Phase 4.3: Use some kind of rules or genetic algorithms to merge blobs, so that frame properties and illumination conditions are highly probable. See 2006.

Phase 4.4: Recalculate illumination properties and validity of the merged candidate, as in 1902.

Phase 4.5: Continue steps 1-4 iteratively

Stage 5 element 1905: During frame validation stage 1905 the best full frame candidates are detected for symbol recognition in FIGS. 23 and 24.

Phase 5.1: Choose few (between 0 and approximately 5) best candidates 2008 for symbol frame based on various rules regarding candidate validity and illumination.

Phase 5.2: Complete the symbol frame candidate 2009 to match the a priori known frame description (such as, overexposed areas are added, extra pattern noise is removed, etc.). This step involves the merge of non-overlapping secondary candidates with the strongest candidates from 2008, and bridging of areas with missing information.

Figure 21:
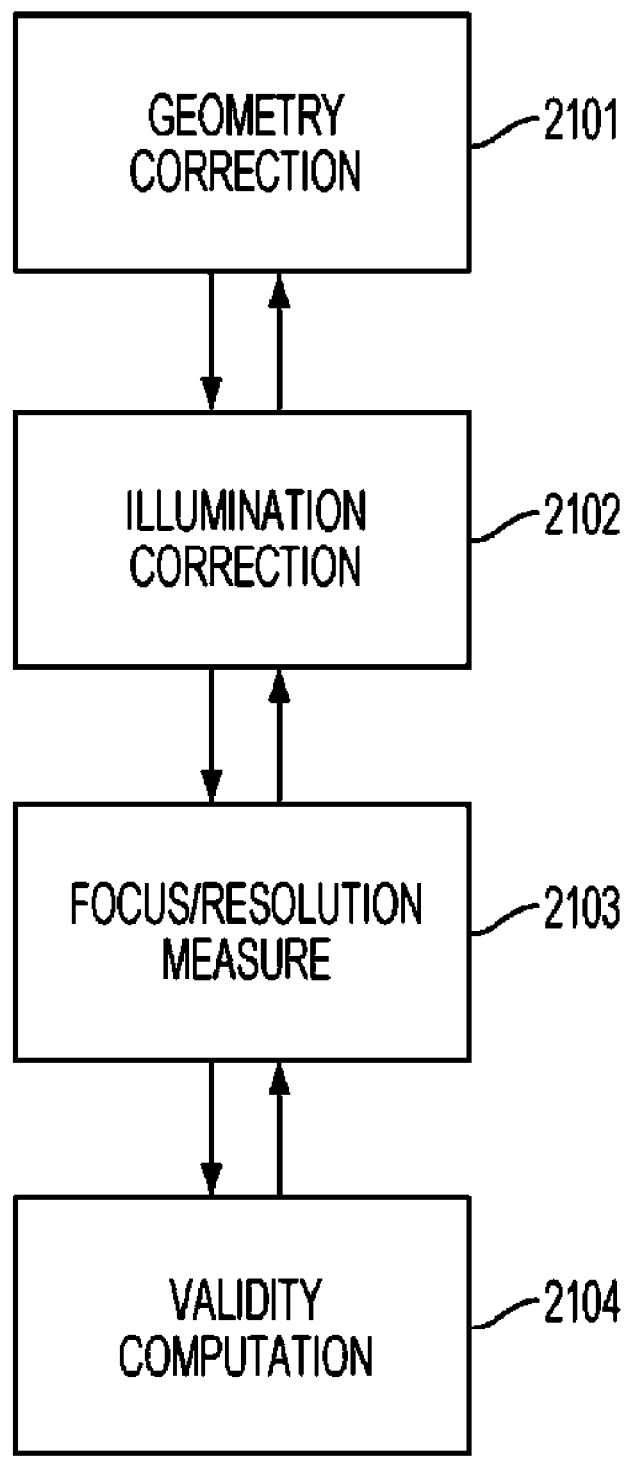
FIG. 21 shows the symbol-specific enhancement according to an exemplary embodiment of the present invention.
Figure 22:
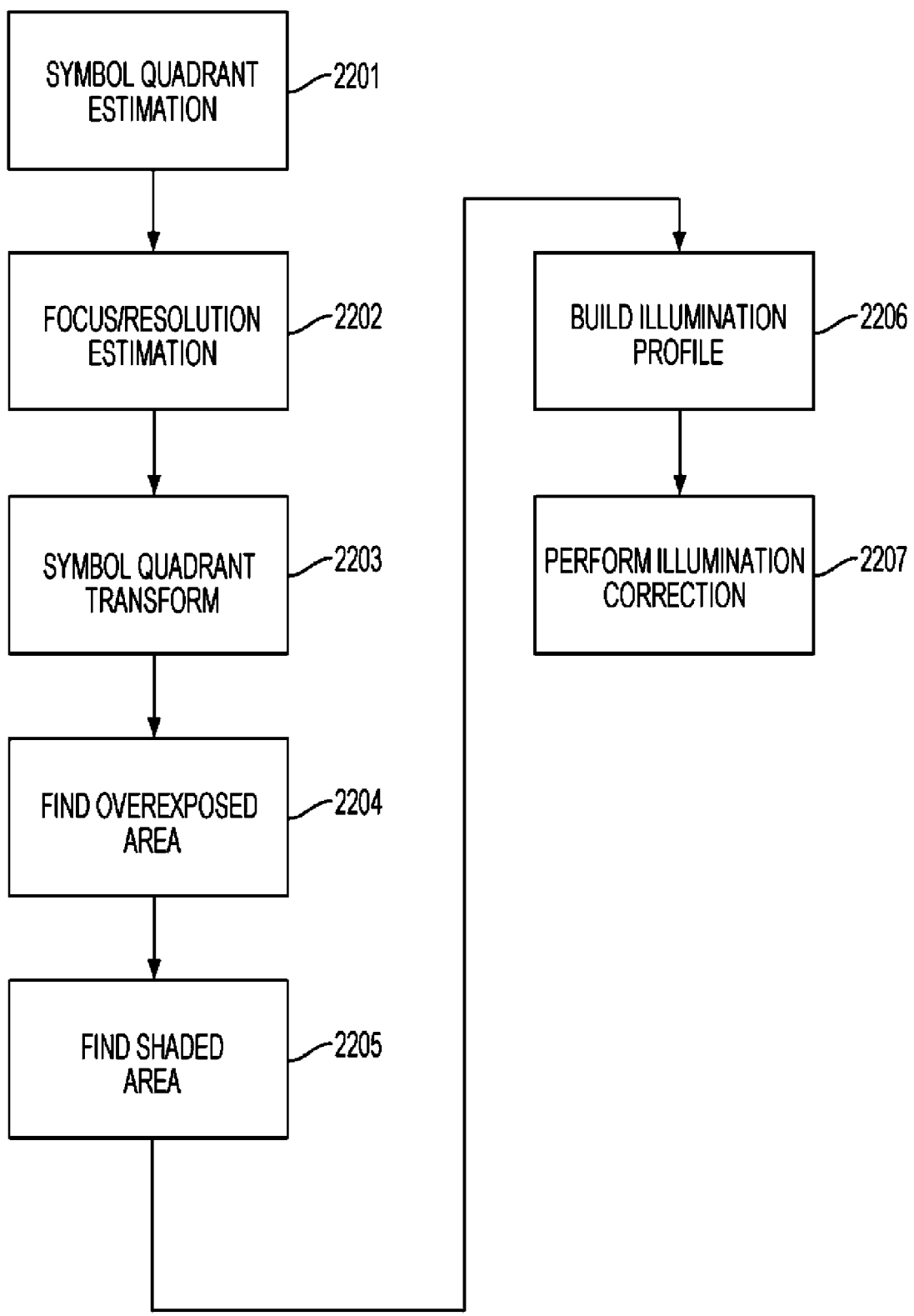
FIG. 22 shows specific image processing for link candidates after frame detection according to an exemplary embodiment of the present invention.

FIG. 21 (also clarified in FIG. 39) illustrates specific symbol enhancement based on link frame properties. The illumination, blur and geometry of the frame is similar to the analogous properties of the symbol, and the shape of the frame is already available from FIG. 19.

Stage 1 element 2101: Geometry correction 2101 implies bringing all symbols to some predefined size and shapes, e.g., a 256×256 pixels rectangle. It is important to normalize the image size to some predefined pixel resolution, rotation, and scale, for image recognition in FIGS. 23 and 24. To this end, the following operations apply:

Phase 1.1: Symbol quadrant estimation 2201 based on geometric properties of the frame. When the shape of the frame is a priori known (say, for example, that it is rectangular), the frame is deformed into a quadrant during the imaging process. After the quadrant properties are detected in 2201, the original rectangular shape of the frame is reconstructed in 2202. To estimate the bounding quadrant of the symbol 2201, one can use the following techniques:

Technique 1.1.1: Dynamic programming with markers. For example, fitting the four corners of the quadrant inside the frame. A dynamic programming method is used for non-linear energy minimization problems, that is, total energy is maximized.

$$E_{total} = a1 * E_{area} - a2 * E_{nonrectantular} - a3 * E_{leakage},$$
where the weights a1, a2, A3 are set ad-hoc, and the energies are:

Earea: The area of the symbol inside the frame;

Enonrectangular: The area between bounding and bounded rectangles of the quadrant;

Eleakage: The area of the symbol's pixels outside the quadrant.

Technique 1.1.2: Parametric estimation. The sequence is

Step 1.1.2.1: Fit a quadrant inside the frame, between the bounded and bounding rectangles.

Step 1.1.2.2: Minimize the mean square distance of all frame candidate pixels from the quadrant (or other statistics).

Step 1.1.2.3: Determine the width of the frame by thresholding, e.g. Otsu thresholding, of the distance histogram, where the distance from the quadrant is available due to Step 1.1.2.2.

Technique 1.1.3: Morphological filtering of the frame. The basic idea is separating the two horizontal and two vertical frame components by directional erosion, and calculating the center of mass and orientation of each component on, for example, a 256×256 image with wide rectangular frame:

Step 1.1.3.1: Run erosion of frame candidate pixels with horizontal line component, e.g. rect(25,1). As a result, only roughly horizontal lines will remain.

Step 1.1.3.2: Remove all blobs with low aspect ratio, small area, or improper orientation. (For example allow up to a 20 degree deviation from the horizontal direction.)

Step 1.1.3.3: Run dilation with line component, e.g. rect(50,5). As a result, adjacent horizontal blobs will merge.

Step 1.1.3.4: Select two largest blobs with a reasonable (>100) vertical distance between them.

Step 1.1.3.5: Find center of mass and orientation of the pixels in the area of each the two blobs prior to binarization. Draw two appropriate lines.

Step 1.1.3.6: Repeat steps 1-5 for vertical axis.

Step 1.1.3.7: Find a quadrant based on the 3 located lines.

Phase 1.2: Quadrant transform 2203. For a given geometrical deformation, such as a perspective transform, calculate the transform of the quadrant to the ideal rectangular shape. (One example would use the Matlab™ cp2tform function, reference "Piecewise linear mapping functions for image registration", Ardeshir Goshtasby, Pattern Recognition, Vol. 19, pp. 459-466, 1986.) Projective transform would be a good transform to use when the lens of the imaging apparatus does not create significant distortions. The correction of the geometrical distortions is based on interpolation. There are some artifacts generally introduced by interpolation. Therefore, a two-step interpolation process is suggested, as follows:

Step 1.2.1: Use accurate interpolation (such as sync interpolation) for scale correction to resize the symbol so that the rectangle of interest is smaller, or bounded by the resulting quadrant. Typically accurate interpolation techniques, such as sync interpolation, have an efficient computational technique for scaling only, and not for a general projective transform.

Step 1.2.2: Use simple interpolation (such as bilinear interpolation) to resize the quadrant into the rectangle. The main problem of simple interpolation is artifacts introduced when the interpolated image is larger than the original image. This problem becomes irrelevant in the suggested two-step procedure.

Figure 32:
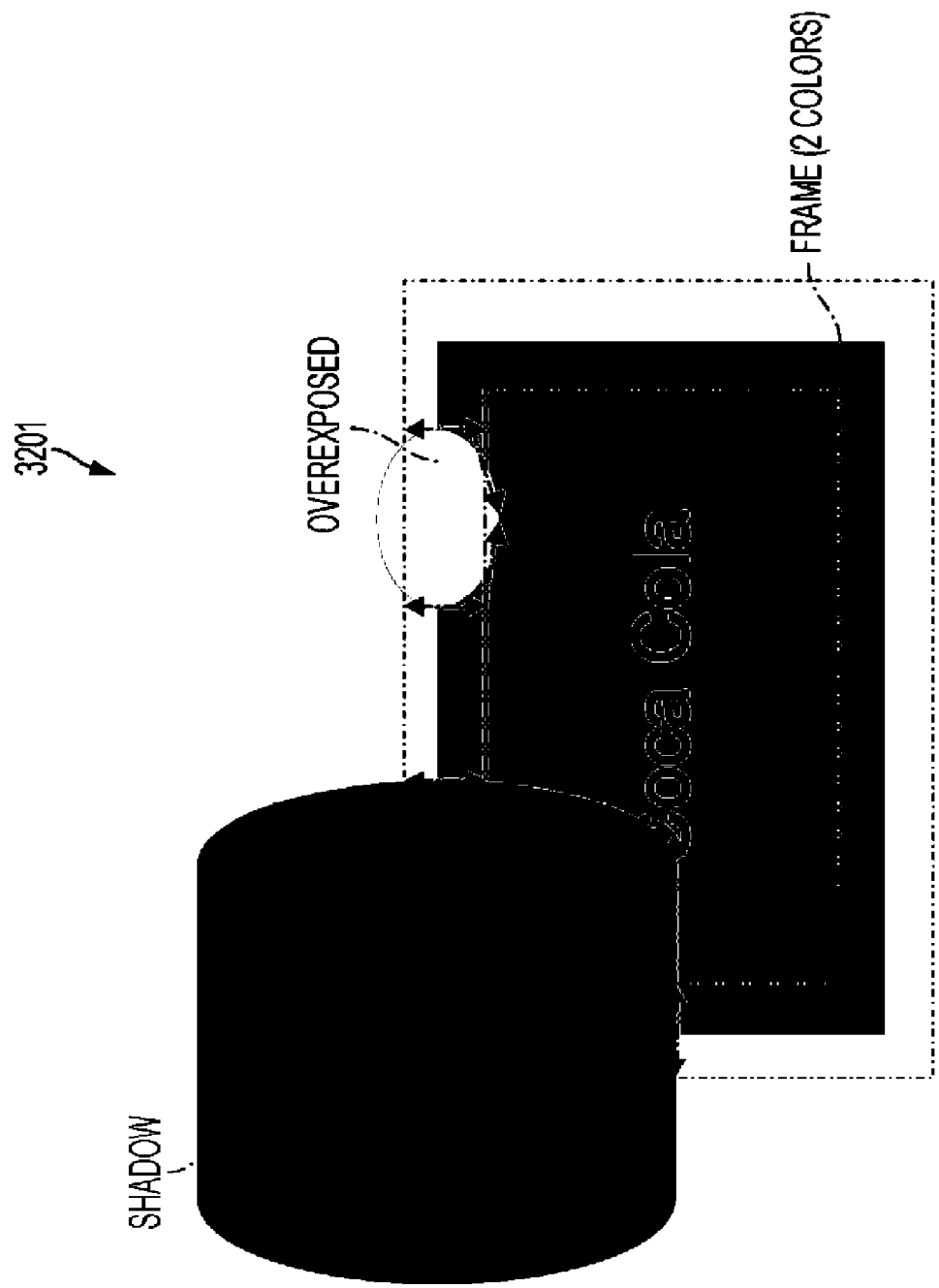
FIG. 32 illustrates light variations across frame and symbol according to an exemplary embodiment of the present invention.

Stage 2 element 2102: Illumination correction 2102 specific for the symbol is generally more sensitive to local illumination changes than 1503, since the frame properties are known. When the frame is of a priori known uniform color, the shading caused by light source obstruction can be measured along the edge of the frame. See illustration in FIG. 32, the dashed line is illustrating the frame around element 3201. The basic phases of illumination correction 2102 are as following:

Phase 2.1: Starting with markers in the very white areas, use watershed or other marks to find overexposed area 2204. The overexposed and potentially overexposed areas are masked out for the processing stages that follow.

Phase 2.2: Find shaded area 2205. The shaded areas have worse contrast and more noise than the illuminated areas.

Figure 33:
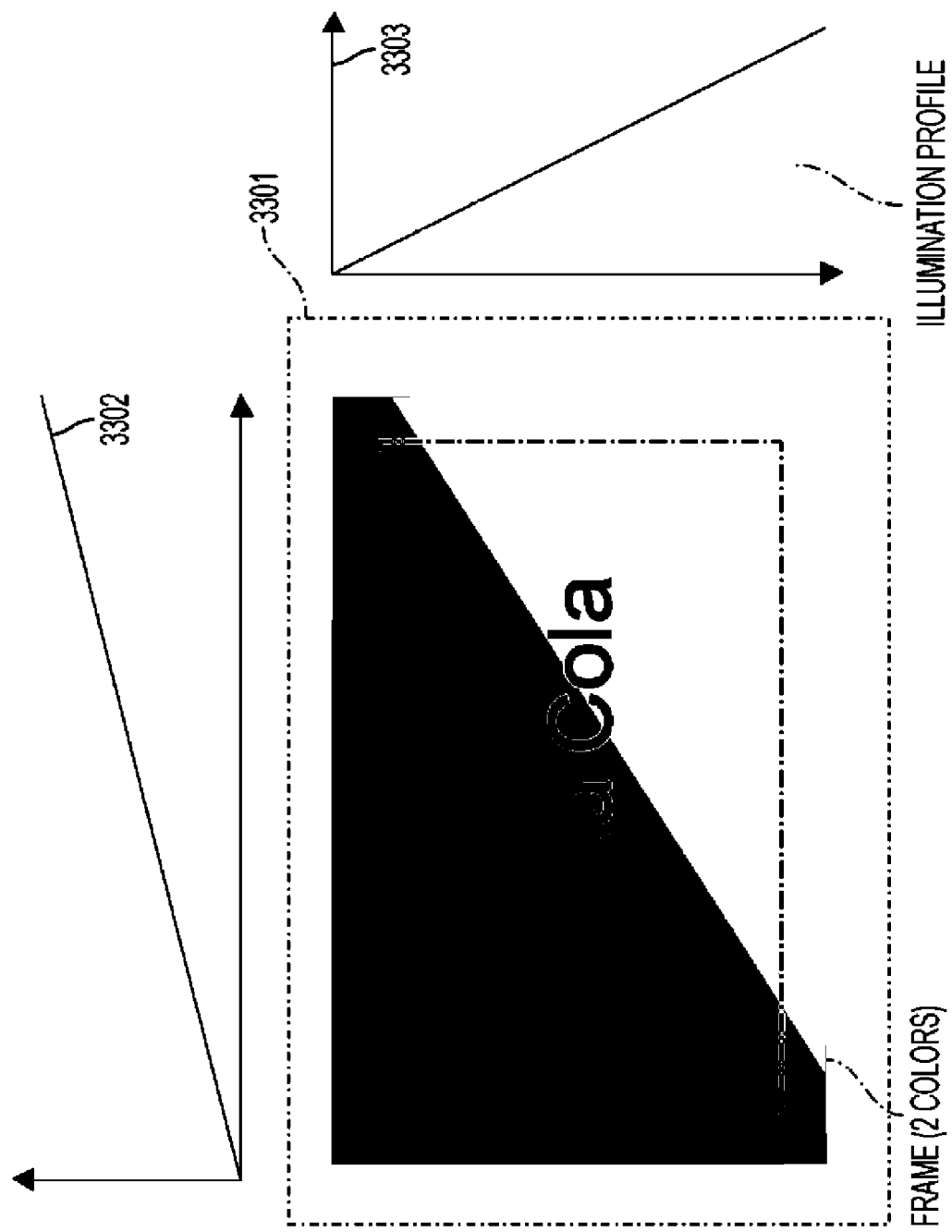
FIG. 33 illustrates illumination gradient fit according to an exemplary embodiment of the present invention.

Step 2.2.1: Build illumination profile along the frame of the link. (In FIG. 33, for example, the illumination profiles for element 3301 are illustrated in elements 3302 and 3303 for vertical and horizontal profiles respectively).

Step 2.2.2: Find sharp changes in the illumination, typically caused by partial shadow.

Step 2.2.3: Fit the shadow line, using parametric estimation or active contours across the link's area.

As the result of 2205 the link area becomes divided into separate (1-3) continuously illuminated areas. See FIG. 33.

Phase 2.3: Build illumination profile 2206 for illumination correction.

Step 2.3.1: For each continuously illuminated area find a number of white and black reference points, using techniques such as morphological filtering (that is, local maxima detection by morphological dilation for white, and local minima detection by erosion for black).

Step 2.3.2: Fit a parametric plane, that is, a parabolic surface along the black and white reference.

Note that the parametric estimation requires few reference points and works fine for small and relatively uniform areas. Therefore, frame detection and shadow detection are performed prior to parametric fit.

Phase 2.4: Perform illumination correction 2207, so that the average grayscale and contrast are roughly uniform along the symbol. For illumination correction 2207 we use e.g. linear pixel-wise transformation with parameters calculated from phases 2205 and 2206.

Stage 3 element 2103: Focus/resolution measure 2103 (and shown also in element 2202) is required for accurate recognition. The images in the database used for recognition are chosen or modified to match the resolution/focus/blur parameters of the symbol of interest. For measuring focus/resolution 2202 the following techniques can be used:

Technique 3.1: Mathematical computation, based on knowledge of original quadrant size from 2102 and the a priori known symbol size.

Technique 3.2: Finding energy of the image derivatives in the region of interest, such as, for example, finding energy of all derivatives in the frame area.

Figure 34:
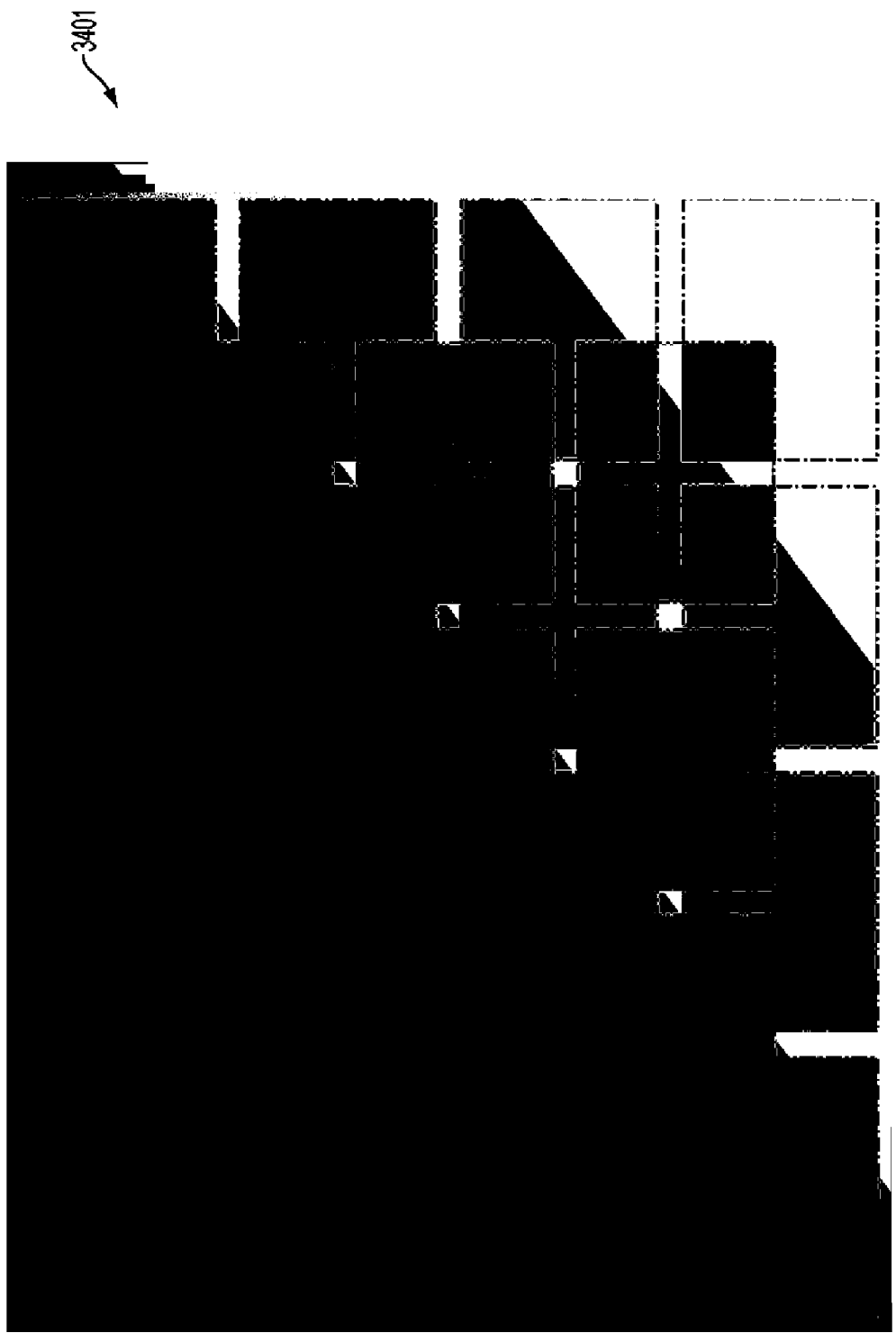
FIG. 34 illustrates image division into 25 overlapping blocks according to an exemplary embodiment of the present invention.

Technique 3.3: Finding zeros in spectrum in Fourier domain. To this end, the following procedure can be used:

Step 3.3.1: Divide the image into blocks, such as 25 overlapping blocks formed by 4×4 image division with 3×3 additional overlapping blocks. See FIG. 34. element 3401. Each block is marked by a dashed line. As can be appreciated by someone familiar with the art, this specific division is illustrative only, and divisions other than that appearing in FIG. 34 could be applied.

Step 3.3.2: Calculate the amplitude spectrum of each block in the Fourier domain.

Step 3.3.3: Average the spectrum amplitude of all blocks to remove sensitivity to the information in each block. As a result, one average spectrum amplitude, or one average power spectrum, remains.

Step 3.3.4: Resample the resulting power spectrum from linear into logarithmic scale both in horizontal and vertical frequencies. As a result, the signal to noise ratio of the spectrum amplitude image becomes similar for high and low 2D frequencies. The resulting image should correspond to focusing accuracy, and should be almost uniform for ideal focusing.

Step 3.3.5: Calculate defocusing from the resulting image. This may be done by:

Operation 1: binarizing the image via Otsu thresholding,

Operation 2: fitting an ellipse to the resulting binary data, and

Operation 3: estimating defocus based on the ratio of the ellipse size to the total image size.

Technique 3.4: Find edge candidates along the frame edge and fit a parametric curve:

Step 3.4.1: Find edges along the frame.

Step 3.4.2: Fit a parametric curve by, for example, $a1+a2*(erf((x-a3)/a4))$, for each edge, where erf is error function (as in Matlab™ erf function, reference Abramowitz & Stegun, Handbook of Mathematical Functions, sec. 7.1).

Step 3.4.3: The resolution is given by the average std parameter ($a4$) and the sharpness is given by the average amplitude ($a2$).

Technique 3.5: Analysis by synthesis, trying to perform best blind deconvolution, thus obtaining the blur function. For example:

Solution 1:

Step 1: Guess some moderate blur function.

Step 2: Perform deconvolution using the Lucy-Richardson algorithm (Matlab™ deconvolucy command, references "Acceleration of iterative image restoration algorithms, by D. S. C. Biggs and M. Andrews, Applied Optics, Vol. 36, No. 8, 1997; "Deconvolutions of Hubble Space Telescope Images and Spectra", R. J. Hanisch, R. L. White, and R. L. Gilliland. in "Deconvolution of Images and Spectra", Ed. P. A. Jansson, 2nd ed., Academic Press, CA, 1997).

Step 3: Measure distortions, such as the number of saturated pixels.

Step 4: If the distortion is small, perform Steps 2-4 with stronger blur guess.

Solution 2: Variational techniques of blind deconvolution. See L. Bar, N. Sochen and N. Kiryati, Semi-Blind Image Restoration Via Mumford-Shah Regularization, *IEEE Transactions on Image Processing*, Vol. 15, No. 2, pp. 483-493, 2006.

Note that it is best to execute the measurement techniques 2-5 prior to geometric correction stage 2101, and then modify the estimate base on the geometric correction result.

Stage 4 element 2104: Validity computation 2104 implies filtering out a priori unsuitable link candidates, thus saving time. The following criteria can be used:

Criterion 1: Symbol information. If there is no information (measured by entropy/stdev/contrast) inside the symbol area, the link candidate is discarded.

Criterion 2: Largely overexposed area. If more than say 25% of the symbol is overexposed (or some other percentage), the link candidate is discarded.

Criterion 3: Irregular shape. If the quadrant of the symbol is very far from the rectangular shape or the axes ratio is very high, the link candidate is discarded.

Criterion 4: Out-of-focus. If the focus of the link candidate is extremely low, the link candidate is discarded.

Criterion 5: Partially present. If the link is partially present in the picture, the missing part is estimated so that the frame's shape is most close to an a priori known rectangular form. If more than say 25% of symbol's area is missing after this approximation, the link candidate is discarded.

Figure 23:
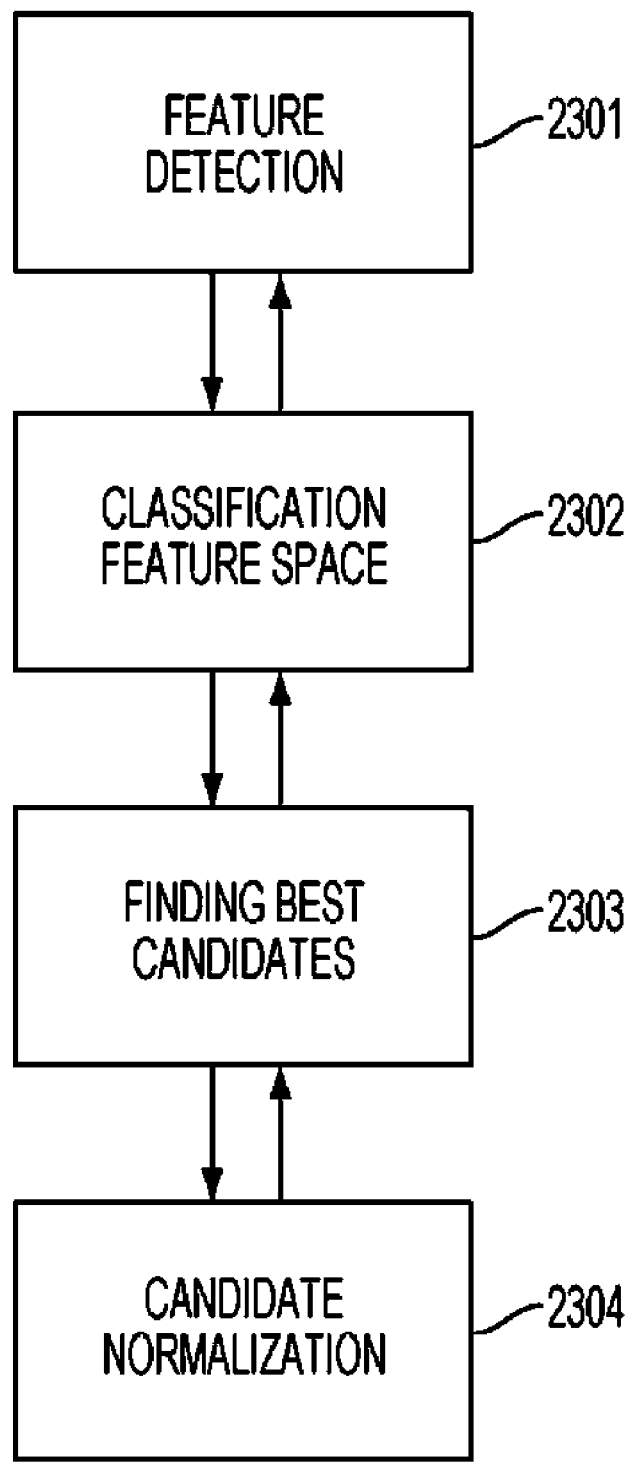
FIG. 23 shows the coarse symbol recognition according to an exemplary embodiment of the present invention.

FIG. 23 illustrates coarse symbol recognition used for finding in the database some matching candidates for the symbol of interest. During this procedure, the symbol of interest is compared to the symbols in the database with similar imaging parameters (such as focus and resolution). If the symbols in the database appear similar to the symbol of interest, the symbol of interest will be reevaluated during final recognition stage described in FIG. 24. Note that this procedure can be performed for all valid link candidates and the best candidate is selected during the final recognition stage, described in FIG. 24.

Stage 1 element 2301: Feature detection 2301 is an most important part of the coarse symbol recognition, since it limits the search dimensionality to the size of the feature space. Note that the features space should not be sensitive to image variations and partial obstructions. Feature detection may be effected by one or more techniques such as:

First Technique 1.1: Using templates.

Step 1.1.1: Select a template, e.g., 16×16 pixels, with high information value, that is, derivatives, edges, high frequencies, and/or energy after Fourier domain whitening.

Step 1.1.2: Mask the area used for template selection. Optionally mask also the areas very similar to the selected template.

Step 1.1.3: Perform steps 1.1.1-1.1.2 until some number of templates, say 3 templates, are available, or until no informative areas appear in the image unmasked.

Step 1.1.4: If there are less than the given number of templates, say 3 templates in this example, select random templates along the link area until the given number of templates becomes available.

Step 1.1.5: Perform correlation of the symbol of interest with the symbols in the database. This could be, for example, normalized cross-correlation of each template.

Step 1.1.6: Multiply the correlation results of all templates pair-wise. This way, if one of the templates is missing, due to overexposed area or some other reason, the candidate is not rejected.

Step 1.1.7: Form feature space with the value and the location of maxima per each correlation and per pair-wise multiplication.

Note that this method is computationally expensive, and should therefore be used for few candidates in the database (as for example 32 or less candidates), or should be used intensively primarily for high value applications.

Second Technique 1.2: Block-wise statistics matching. The symbol image is divided into large, e.g., 64×64 pixel, blocks. For each block, statistics are measured. Some of the statistics which may be measured are:

Statistics 1: Histogram. Measured statistics could include the value and location of histogram peaks, or the ratio of white and black pixels per block.

Statistics 2: Edges. Measured statistics could include edge density and average edge orientation distribution (horizontal/vertical/other) in each block.

Statistics 3: Moments. Measured statistics could include some geometric moments of the grayscale image, binary image, image histogram, or image spectrum.

Figure 30:
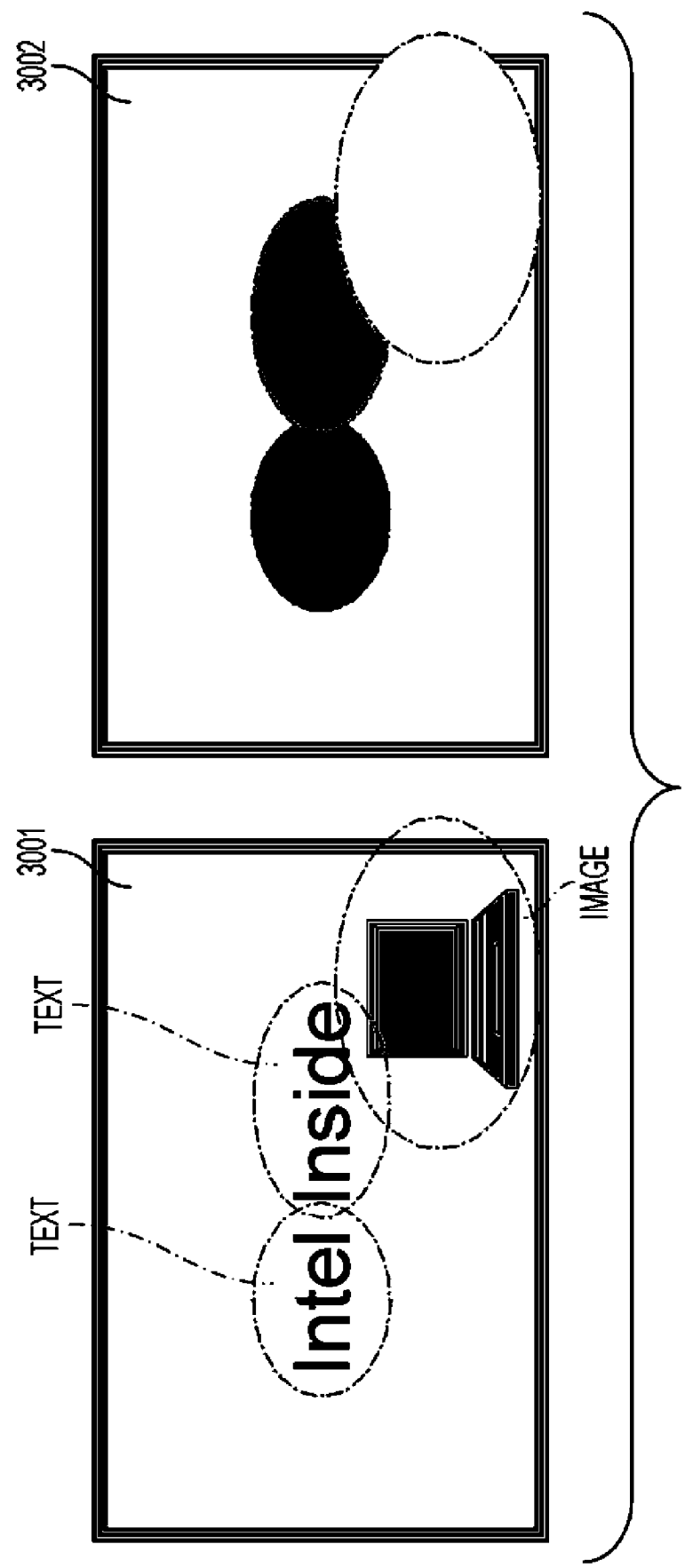
FIG. 30 illustrates feature extraction by pattern analysis according to an exemplary embodiment of the present invention.

Third Technique 1.3: Pattern analysis. A feature is a pattern, e.g., a text box, a line, or an arc on the symbol, with some given parameters. See illustration on FIG. 30. Various distinct patterns illustrated in logo 3001 are sorted into elliptic areas illustrated in 3002.

Fourth Technique 1.4: Wavelet domain features. Various feature detection techniques as depicted in 2301 are used separately for various wavelet scales, such as, for example, measuring the energy in each coefficient of Gabor filter bank with 4 scales and 8 orientations per scale.

Stage 2 element 2302: Classification in feature space 2302 implies finding some entries in the symbol database or classes of entries with features similar to the features of the symbol of interest. The following techniques might apply:

Technique 2.1: Find K e.g. 9 nearest neighbors in some probabilistic sense, such as Mahalanobis distance.

Technique 2.2: Use off-line clustering of the feature space, such as support vector machine, and find the cluster to which the symbol of interest belongs.

Technique 2.3: Use techniques 1 or 2 with principal component analysis, to find the most informative combination of features.

Technique 2.4: Use some artificial intelligence mechanism, such as a neural network or genetic algorithm, to find the most similar candidates.

Stage 3 element 2303: Finding best candidates 2303 means refining the techniques used in 2301 and 2302, and optionally applying some candidate normalization as in 2304. The idea is clear, that is, progressive clustering from coarse to fine clustering, calculating additional features with each step. This stage 2303 can be applied repeatedly until few, say less than 5, candidates are left.

Figure 35:
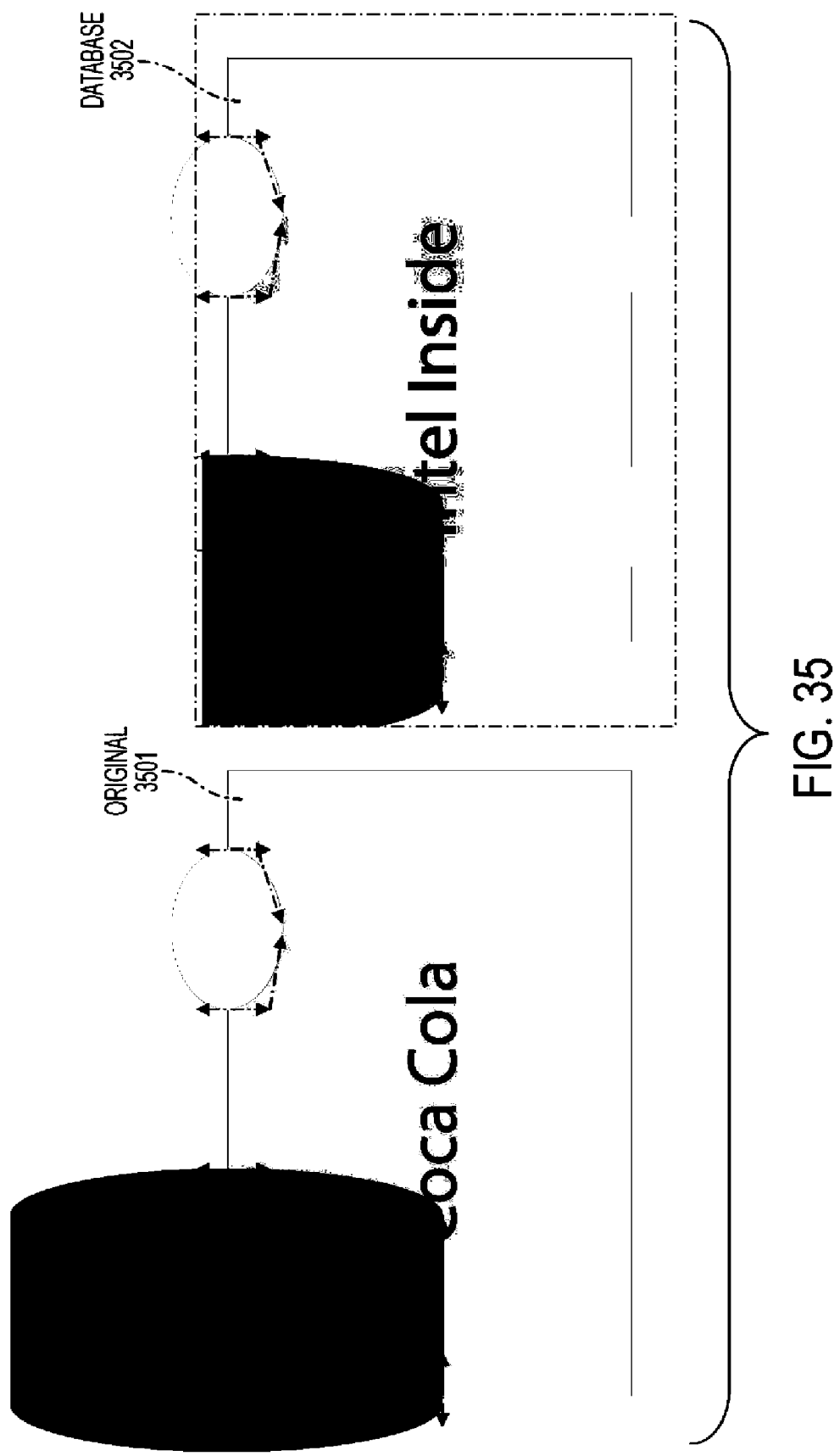
FIG. 35 illustrates illumination correction for database candidates according to an exemplary embodiment of the present invention.

Stage 4 element 2304: Candidate normalization 2304 allows making synthetically a better candidate in terms of imaging conditions similarity, than the candidates already stored in the database. Candidate normalization 2304 implies bringing the feature space of the candidates of interest to the same imaging parameters as the symbol of interest:

Parameter 4.1: Obstructed and overexposed areas should be copied to the database candidates and the feature space of the database candidates recalculated. See FIG. 35. The obstructed/overexposed areas' illumination properties from the image in element 3501 are copied to the candidate in the database as illustrated in element 3502.

Figure 36:
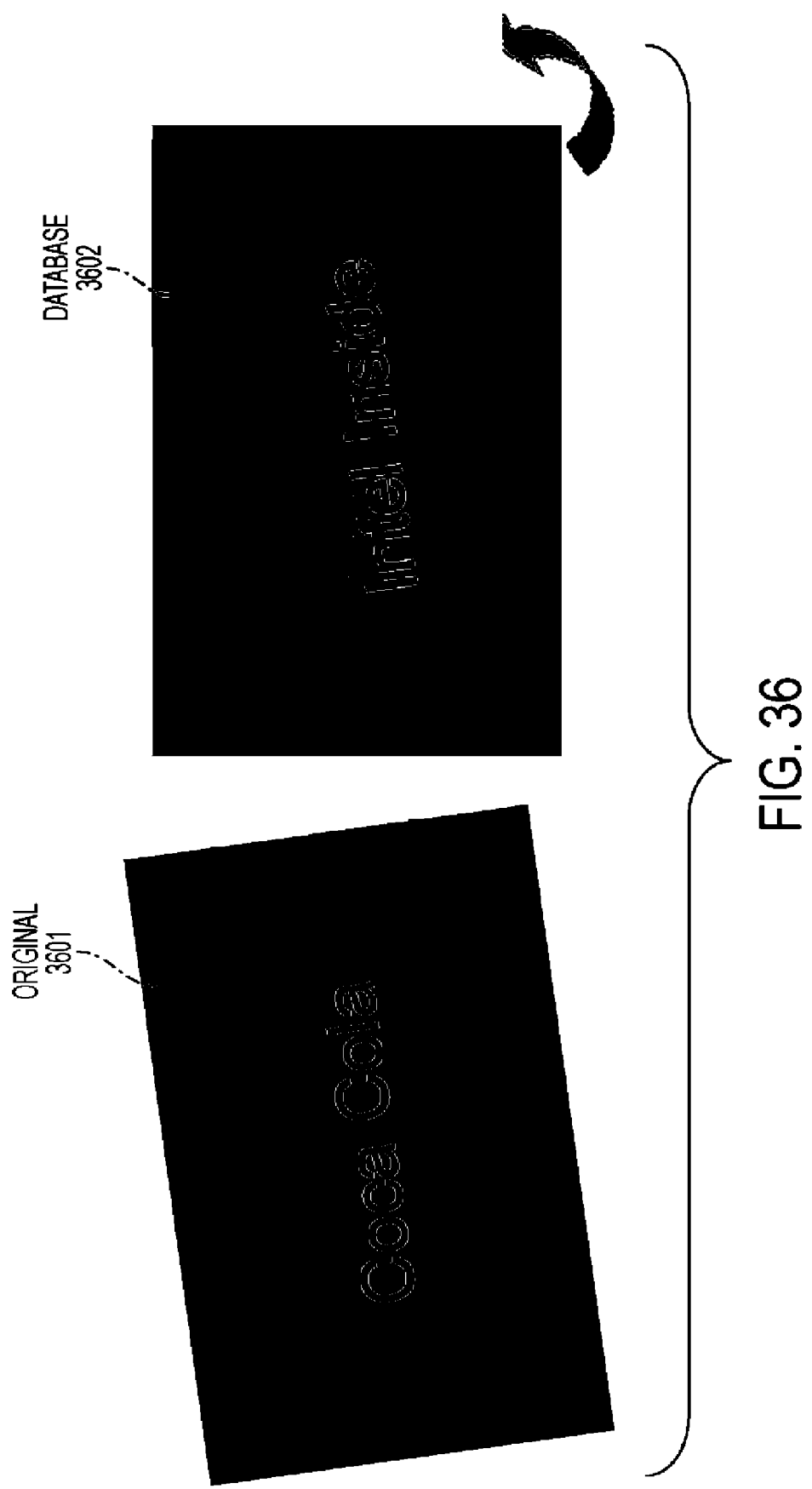
FIG. 36 illustrates geometrical correction for database candidates according to an exemplary embodiment of the present invention.

Parameter 4.2: The geometrical parameters scale, rotation, and aspect ratio of the candidates should be the same as that of the symbol. Transformation should be applied. See FIG. 36. The geometric properties of the image of interest element 3601 are applied to the database image element 3602. In this illustration, only rotation is shown, but every linear, perspective and non-linear transform, such as fish-eye deformation, can be applied in the same way.

Figure 37:
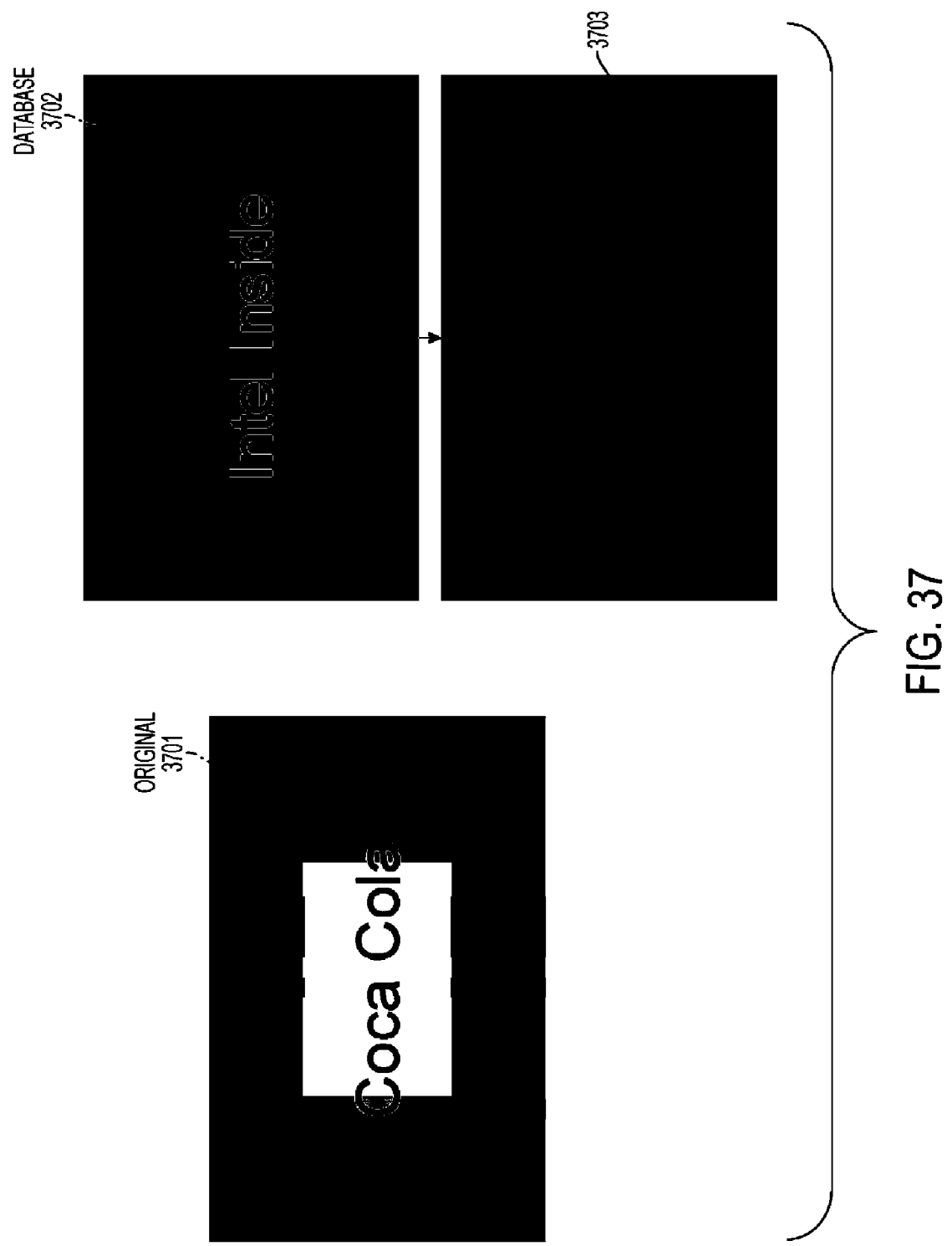
FIG. 37 illustrates histogram correction for database candidates according to an exemplary embodiment of the present invention.

Parameter 4.3: The overall histogram of the candidates should be equalized to the overall histogram of the symbol. See FIG. 37. In this illustration, the database image element 3702 undergoes pixel-wise transformation. The resulting image 3703 has the same mean graylevel value as the image of interest in element 3701.

Figure 38:
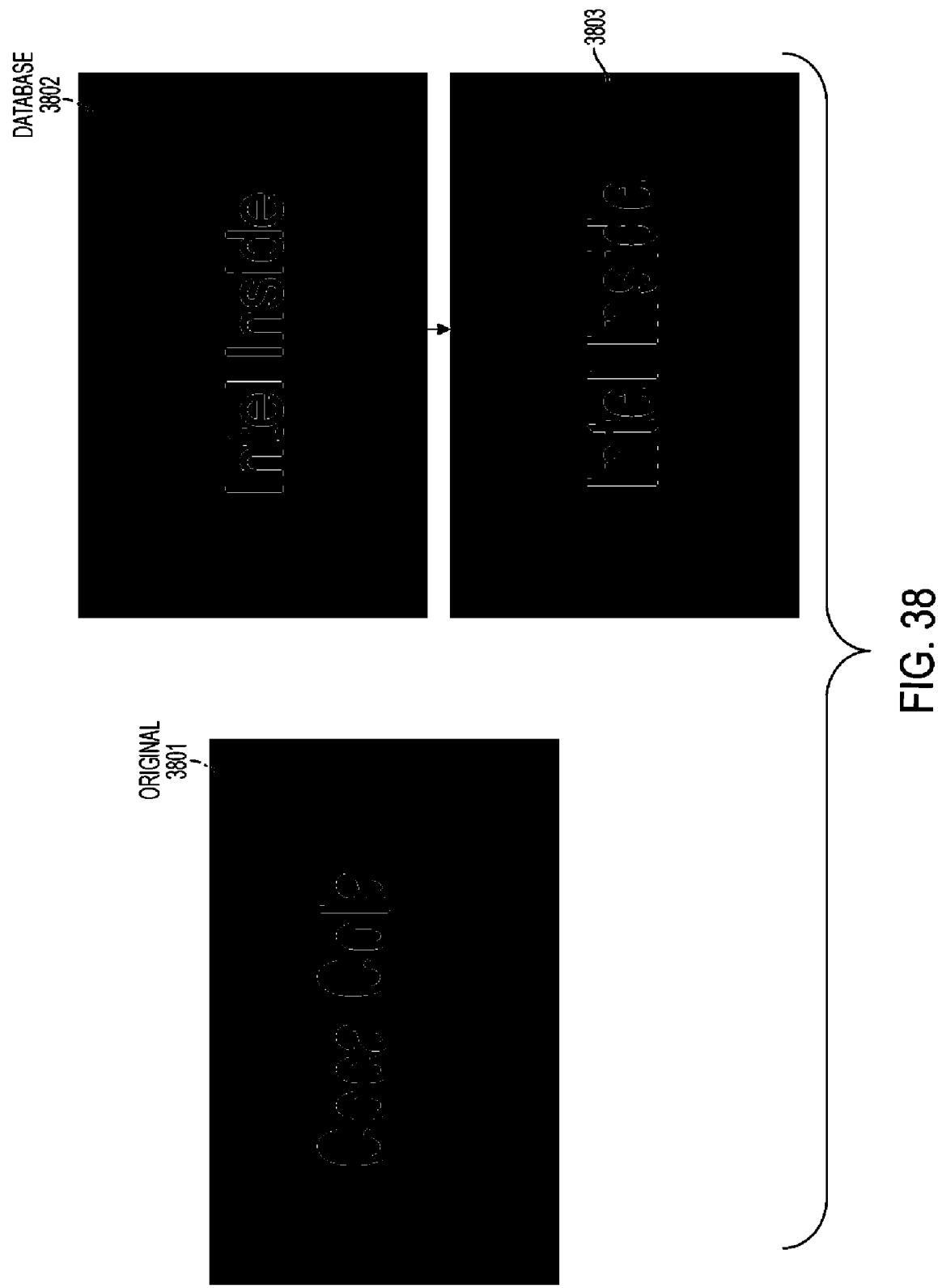
FIG. 38 illustrates focus/resolution correction for database candidates according to an exemplary embodiment of the present invention.

Parameter 4.4: The focus of the candidates should be the same as that of the symbol, e.g., smoothing filter applied. See FIG. 38. In this illustration, the database image element 3802 undergoes blur resulting in appearance of ghost image. The resulting image 3803 has the same mean blur parameters as the image of interest in element 3801.

Note that in some cases it is possible to construct a valid candidate from multiple less accurate candidates using image fusion techniques, reference "Blind multichannel reconstruction of high-resolution images using wavelet fusion", El- Khamy S E, Hadhoud M M, Dessouky M I, Salam B M, Abd-El-Samie F E., Appl Opt. 2005 Dec. 1; 44 (34):7349-56.

Figure 24:
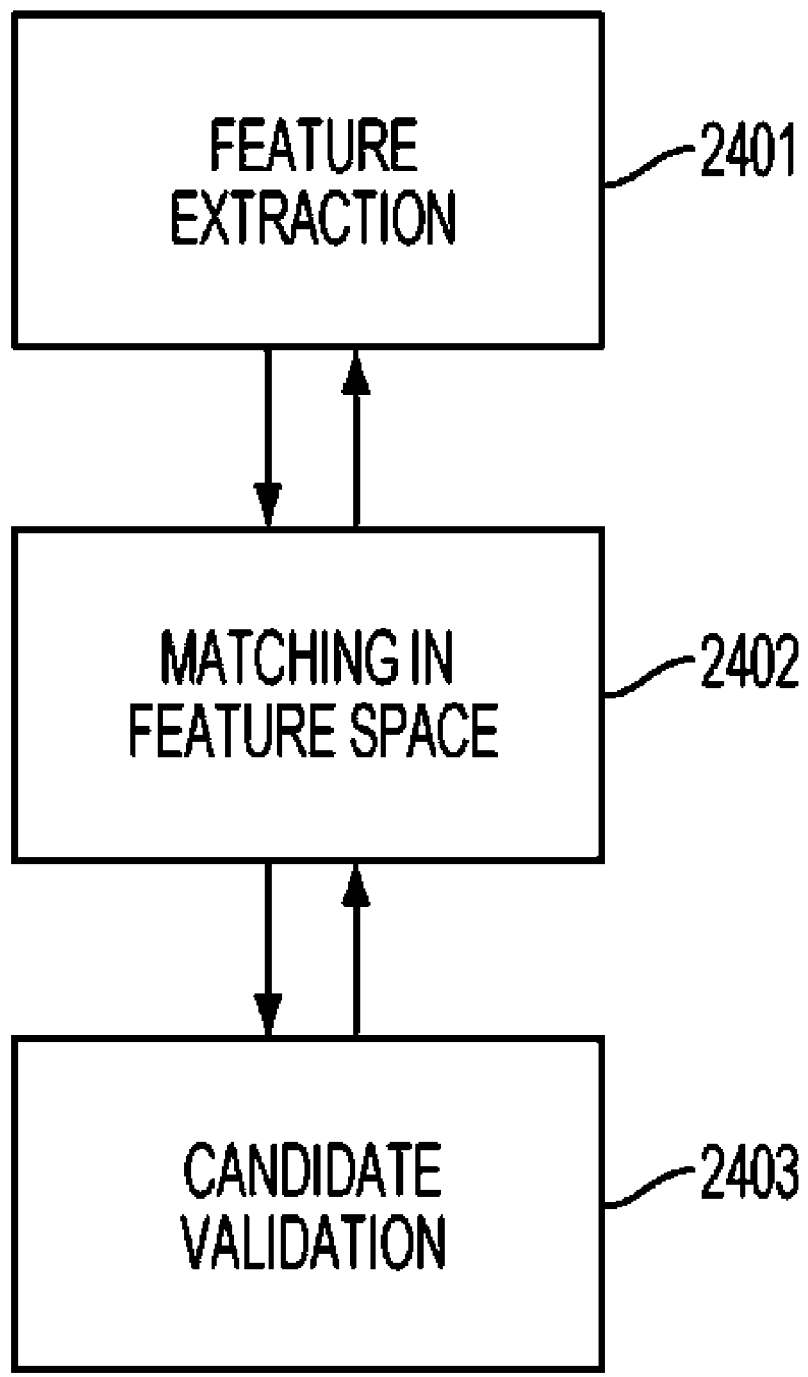
FIG. 24 shows the accurate symbol recognition according to an exemplary embodiment of the present invention.

FIG. 24 illustrates the accurate recognition stages. Accurate recognition allows choosing a single symbol among similar symbols from the database to be used as the recognition results.

Stage 1 element 2401: Feature extraction 2401 is applied both to the symbol of interest and to the normalized candidates from the database, to get the most accurate estimation for the feature space under the specific imaging conditions. This stage 2401 is similar to 2301, except that:

Property 1: More features and more complex features can be used in 2401 during the accurate recognition, than during coarse recognition, since there are only few candidates left after operation of FIG. 23.

Property 2: Due to 2304, the features in 2401 are not sensitive to imaging conditions.

Stage 2 element 2402: The score between candidate and symbol of interest is matched in the new feature space 2402. This step is similar to 2302, except for properties 1-3 of 2401, as mentioned immediately above.

Stage 3 element 2403: Candidate validation is performed using some kind of rule-sets, such as hard-coded, configurable, or adaptive via training mechanism. Candidate validation allows selection of a single output based on complex criteria. Such criteria may include:

Criterion 1: the ratio of candidate scores from 2402,

Criterion 2: imaging conditions, e.g., sizes of overexposed areas,

Criterion 3: application parameters;

Criteria 4: the distance of the candidate from the image center; and

Criteria 5: human input

As a result of applying internal logic rules in 2403, the following output can be given to the user:

Output 1: The link is successfully recognized in good position; or

Output 2: More than one valid candidate, so user decision is required; or

Output 3: A possible link candidate found, but user verification of the result is required; or Output 4: No link candidate found, so the user must repeat the scan.

Figure 25:
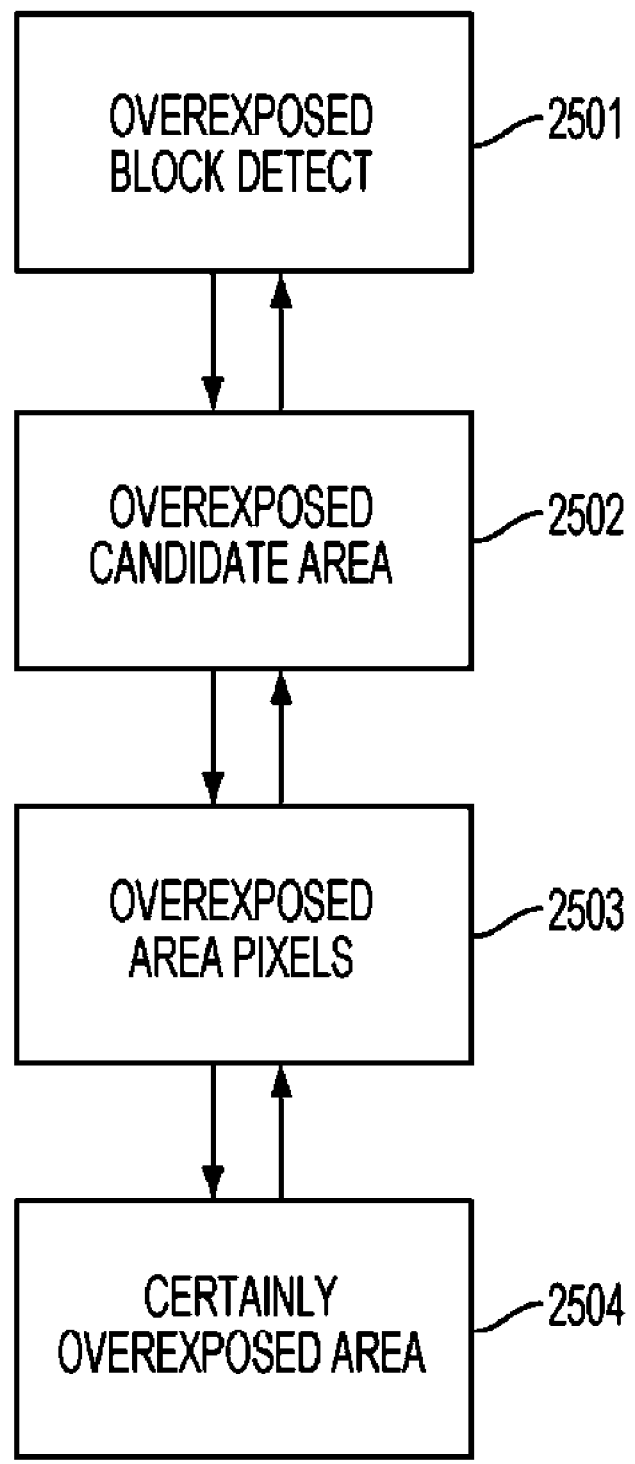
FIG. 25 shows overexposed areas detection algorithm according to an exemplary embodiment of the present invention.
Figure 29:
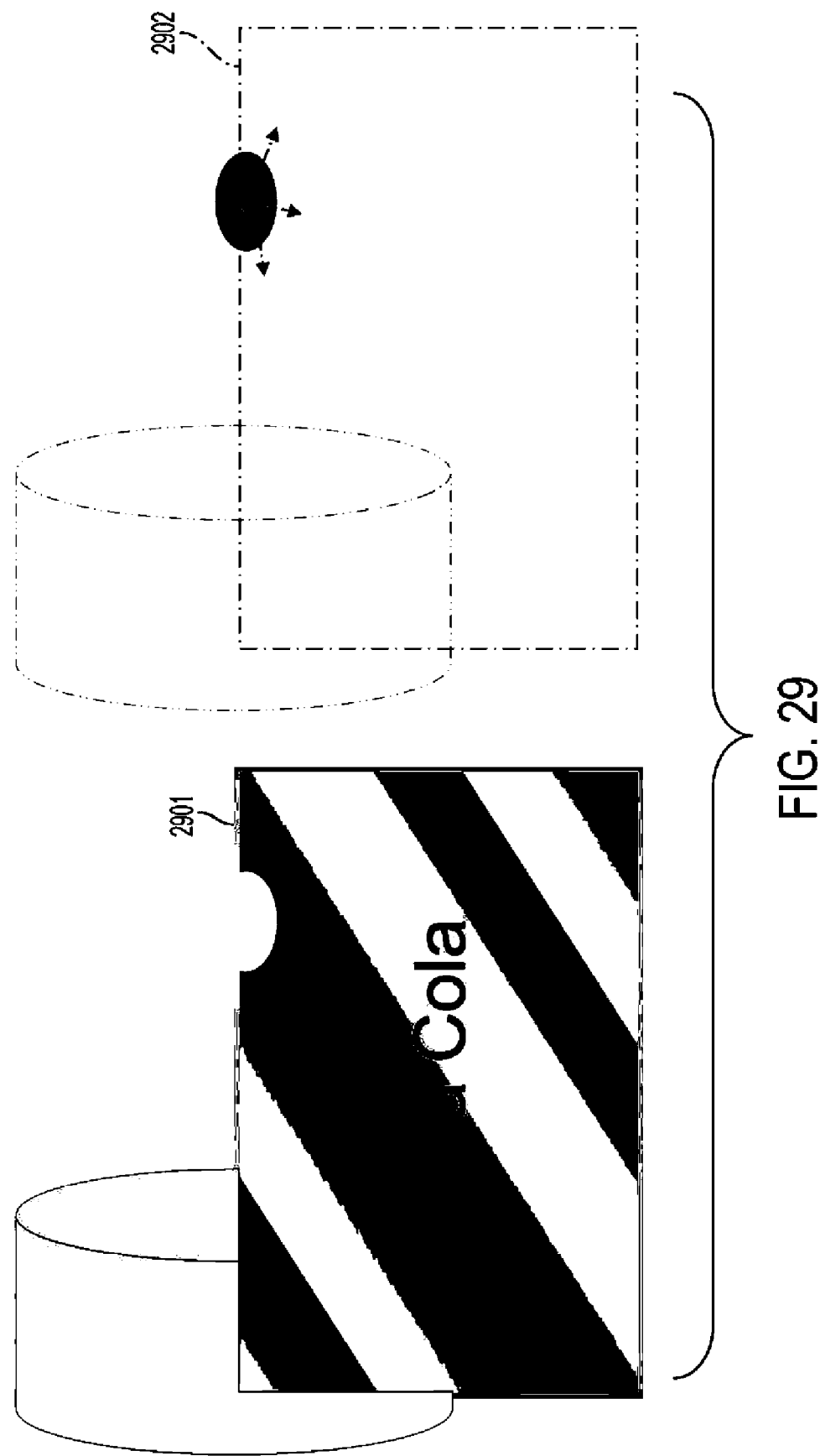
FIG. 29 illustrates overexposed area detection according to an exemplary embodiment of the present invention.

The general overexposed areas detection algorithm is depicted in FIG. 25 and illustrated in FIG. 29.

Stage 1 element 2501: Overexposed block detection 2501 is implemented by detection of saturated white blocks, e.g., 8×8 pixels in the image.

Stage 2 element 2502: Overexposed candidate area 2502 is detected by:

Phase 2.1: Dilation of the overexposed area by a kernel of say 16×16 pixels.

Phase 2.2: Using watershed or active contours to decrease the overexposed candidate area.

Stage 3 element 2503: Overexposed pixels 2503 are detected by testing the graylevel of the pixels inside the overexposed candidate area 2502 for being almost white or low contrast, against some image noise distribution e.g., erf(255−value).

Stage 4 element 2504: Certainly overexposed area 2504 is found from overexposed pixels 2503 by statistical filtering using Markov random field filters, or by alternating morphological close and open operators.

It would now be useful to highlight some of the points illustrated on FIGS. 10-25 and 27:

Highlighted Point 1: Illumination correction. The illumination correction is performed in several (perhaps) various stages, with increasing detail level:

Stage 1.1, element 1503: General illumination correction interpolated throughout the whole image. Contrast correction based on smoothed block-wise statistics recommended. As the result of this operation, some of the illumination-caused artifacts of 2701 in FIG. 27 will be removed, resulting in more uniform image 2702.

Stage 1.2, element 2102: Overexposed areas detection using white points on frame and watershed algorithm. Partial shadow removal using active contour for shadow contour estimation and surface fit based on local minima and maxima on each continuous area. As the result of this operation, some of the non-smooth illumination-caused artifacts of 2702 will be removed, resulting in smoother image 2703.

Stage 1.3, element 2304: Illumination correction performed via histogram equalization. As the result, the image should become smooth, as illustrated in 2704.

Highlight 2: Overexposed area detection. It is useful to implement a dedicated overexposed areas detection mechanism as depicted in FIG. 25. The overexposed areas, as illustrated in FIG. 29, are treated in the following stages:

Stage 2.1, elements 1501-1502: Overexposed areas get low validity grade and are replaced from other images if available.

Stage 2.2, elements 1503-1505: Overexposed areas having zero contrast require special treatment and are generally masked out for black reference and saturated for white reference.

Stage 2.3, elements 1904, 2101: Overexposed areas are used to fill-in the holes in the neighboring clusters. It is recommended to use this procedure with parametric fit, active contours, or morphological techniques, in order to preserve the geometry of the clusters.

Stage 2.4, elements 2301-2303: Overexposed areas are treated the same way as partially obstructed areas, that is, no features are calculated over these areas.

Stages 2.5, element 2304: Overexposed areas are introduced to the database candidates to eliminate the difference in the illumination conditions between the symbol image and database images.

As the result of Stages 2.1-2.5 the various levels of overexposure in FIG. 29, element 2901, are detected, as illustrated in 2902.

Figure 28:
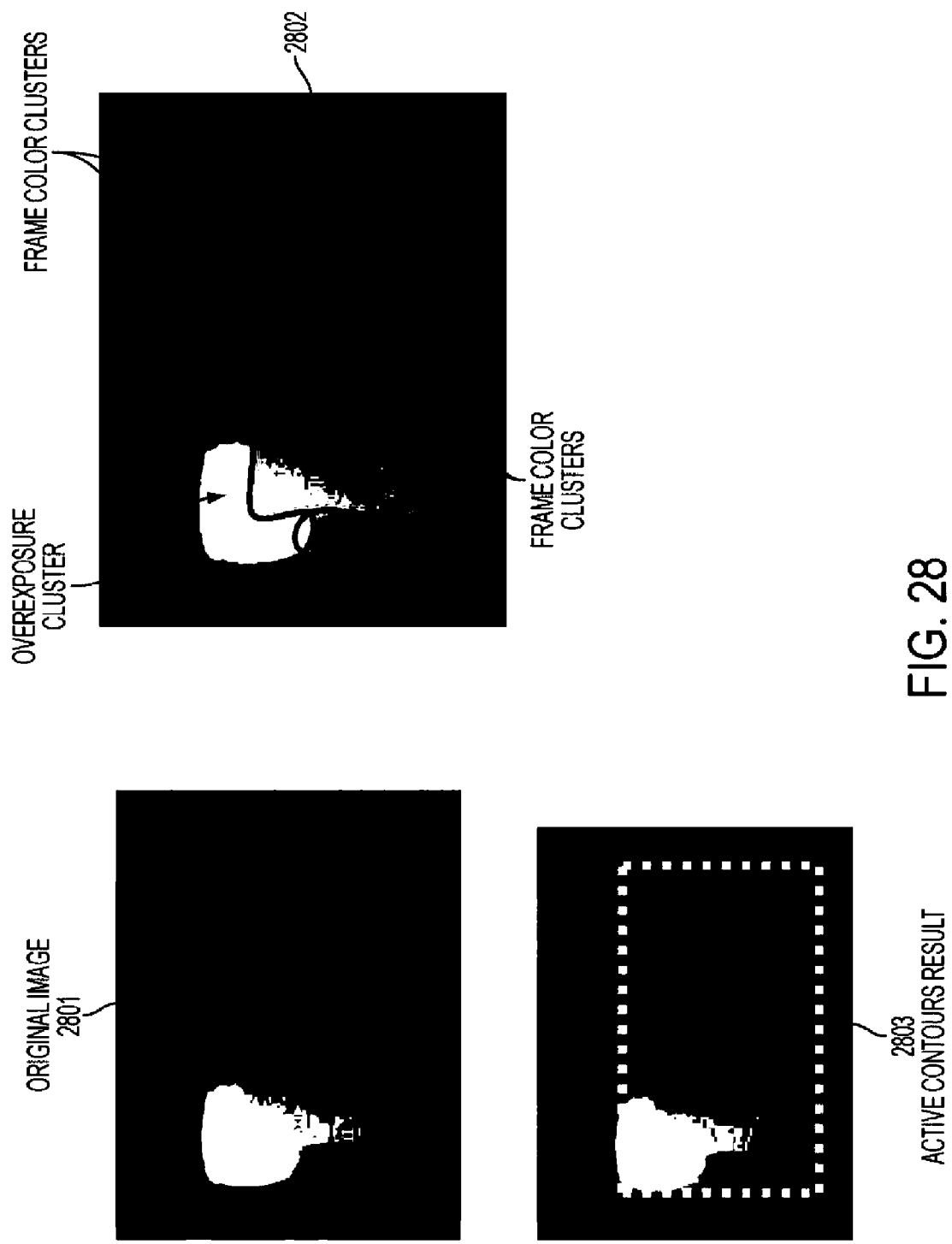
FIG. 28 illustrates various stages of frame detection according to an exemplary embodiment of the present invention.

Highlight 3: Frame detection as illustrated on FIG. 28. Frame detection of link 2801 is performed on various levels with increasing geometric accuracy:

Stage 3.1, elements 1504, 1505, 1901: Pixel-wise frame candidate detection. For each pixel, the probability that it belongs to the frame analyzed.

Stage 3.2, elements 1902-1905: Cluster-wise frame candidate detection is performed, based on groups of pixels that belong to a frame. The result of Stage 3.2 is illustrated in 2802.

Stage 3.3, elements 1903, 2101: Fitting a geometric shape to the frame. It is recommended that active contour techniques are used for these stages. The result of Stage 3.3 is illustrated in 2803.

Highlight 4: Artificial intelligence. Although there are many places within the algorithm where artificial intelligence (such as neural networks) can be used, it is recommended to use artificial intelligence, at least off-line, for the feature space classification 2302.

Highlight 5: Feature extraction and classification. The image identification process as described in this exemplary embodiment of the invention, can be used in conjunction with common classification techniques. For large databases, the classification if successful saves significant computational effort. In this case, the final identification is performed on a small number of images/logos. Simple classification can be based on a small number of features. The features can be selected globally across the image or locally across image parts/segments, using the following techniques:

Feature 1: Image histogram. The histogram is almost invariant to the geometric transformation, but depends on illumination and focus. It is possible to use this feature on the images after adaptive smoothing and illumination correction.

Feature 2: Aspect ratio. This feature is sensitive only to geometric transformations, and can be used if the frame detection is successful.

Feature 3: Text density distribution. After binarization of the image, the distribution of black and white dots along the image is calculated. This calculation may be used on the image after illumination correction and geometry correction.

Feature 4: Distribution of control points. Some kinds of edges (such as 90 degree corner) and shapes (such as the trademark ™ symbol) commonly appear in various images. Location of the control point on the image can be used for image classification.

In a more general case, one can use classification based on support vector machines and principal component analysis (for the database).

It is reasonable to expect that in many cases the classification attempt will fail due to poor focusing or inferior imaging conditions. In such a scenario, full identification will have to be performed across the database.

Highlight 6: Focus, blur and resolution measure. The focus-related parameters in this exemplary embodiment of the invention are measured for various needs, including:

Stage 6.1, element 1501: The image resolution data of each block in a video frame is evaluated for image fusion in stage 1502. The image resolution can be estimated from the camera motion estimation between frames, as described in U.S. patent application Ser. No. 11/353,151, previously cited.

Stage 6.2, element 1503: The image PSF (point spread function) can be estimated to be used with the Lucy-Richardson deconvolution algorithm using Technique 3 from Stage 6.3, element 2103. To this end, Gaussian blur is assumed. Alternatively, any other blind deconvolution algorithm can be used.

Stage 6.4, element 2103: Here the additional information of frame position can be used to estimate and correct the image PSF. If there is a wide rectangular color frame surrounded by wide white area, the PSF can be accurately calculated directly from the frame edges by averaging the edge profiles:

Stage 6.5, elements 1004 and 1005: Here the PSF as well as the resolution (calculated via the symbol's area in pixels) can be used to limit the database search to stored images with similar imaging conditions. Moreover, image fusion can be used to produce images with imaging conditions most similar to the symbol of interest.

Phase 6.5.1: Get two entries in the database most similar to the symbol of interest. If, for example, the size of the symbol of interest I is approximately 175 pixels (resized to 256), and there are stored data of images S1 and S2 with symbol size 150 and 200 (resized to 6), then the image (S1+S2)/2 will be most similar to the image I.

Phase 6.5.2: Since the symbol is bounded by a quadrant rather than rectangle, these weights are calculated pixel-wise:

Step 6.5.2.1: Calculate the scaling parameters of the projective transform for each 8×8 pixels block (or some other size) of the original quadrant.

Step 6.5.2.2: Calculate scaling mark for each block in the original quadrant.

Step 6.5.2.3: Interpolate the scaling mark pixel-wise in the original quadrant.

Step 6.5.2.4: Apply projective transform on scaling marks.

Step 6.5.2.5: Calculate weights for the two images in the database based on scaling marks.

Phase 6.5.3. Apply weighted average of the images in the database with weights calculated in step 6.5.2.5.

Below is a list of potential applications for the exemplary embodiments of the present invention. This list is non-exhaustive, and one skilled in the art will recognize that there are other ways in which the exemplary embodiments of the present invention may be applied.

Application 1 of the Exemplary Embodiments of the Present Invention: Content and Service Access: The cellular phone serves as a hardware token for proving the user's identity and presence at a certain position in a certain point in time. The image on the page or screen shows the type of content the user wants to access, and/or the service the user wants to login to, e.g., a ringtone, a video, a downloadable game, an email service, a banking service. etc. The image may also contains some unique symbol or information related to the location and/or the time, such as, for example, the date of publication, the time, the IP address of the terminal, or some mathematically unique code that is a function of similar such parameters. Some notable specific examples of content or service access are:

Example 1 of Content or Service Access: Content Download/Service access by imaging a logo or icon printed in a newspaper or magazine, or on a billboard, envelope, plastic card, TV advertisement, or product packaging, etc.

Example 2 of Content or Service Access: Content Download/Service access by imaging the screen of another phone or device containing the logo or icon referencing the desired content. For example, a user could get the wallpaper/ringtone used by another user by taking a picture of the other user's cell phone screen.

Example 3 of Content or Service Access: Content download/Service access by imaging the screen displaying a Web page, WAP page, Flash site, or similar such virtual page.

Application 2 of the Exemplary Embodiments of the Present Invention: Forms Processing: The service logo/picture, in conjunction with other information printed/displayed next to it, can serve to recognize the form the user is accessing and direct the user to other services or to further processing the image. Some examples would include:

Example 1 of Forms Processing: Bill payment. The user receives a bill, and takes a picture of the logo of the service (e.g., the Electricity Company's logo). By recognizing the logo of the service, the servers direct the information (e.g., the date of the bill, the amount of the bill, or other information) for further processing to the proper on-line server.

Example 2 of Forms Processing: Coupon loading/prepaid card loading. The user images the card/coupon and the logo/picture in conjunction with a printed serial number/barcode. The image will be used to direct the rest of the processing of the image/video call.

Example 3 of Forms Processing: New Service Subscription with detail filling. The user images the logo/picture of the service, while additionally filling by hand writing some fields in the form. Then the picture/video clip of both the image and handwriting are processed, where the type of service to subscribe to is first recognized by the logo/picture.

Application 3 of the Exemplary Embodiments of the Present Invention: Service Membership: The user takes a photo of a screen/printed material as an expression of his/her wish to enroll into a special service or to join a certain club as a member. Some prime examples include a user joining a consumer club by taking a photo of a printed receipt, or of the TV during a commercial, or of a web page showing a new promo. (This application is similar to Application 2, Example 3, above, but here there are no extra details filled in a form by the user).

Application 4 of the Exemplary Embodiments of the Present Invention: Worker cards/work hours registration. In many businesses (such as the distribution of newspapers or food) monitoring the worker presence is required, but it is difficult to pass the employee's card in a conventional device because of the worker's mobility. Using the recognition functions of logos/pictures and/or OCR or machine readable code reading, the employee can take a picture/video clip of himself/herself, of his employee card (with his/her details such as employee number), or other picture/logos 1associated with the employee card (such as a special mark printed on the card) or with a specific location (such as a special sign printed on a post at the pick-up point). Using the technology described herein, a local manager can easily take a photograph of the worker and a photograph of his/hers worker card. The time of the photograph is automatically recorded in the system, and the worker card can be relatively easily identified due to large degree of control over its format. If there is some kind of question or concern later regarding the worker's presence or location, the photograph of the worker will serve as a second defense against any possible fraud.

Application 5 of the Exemplary Embodiments of the Present Invention: Location Based Services. A certain area, counter, or spot is tagged by a printed label or by a screen showing information. The user can take a picture on the spot to indicate his/her interest in the displayed goods or service, or interest in getting special offers related to the displayed goods or service. Some examples include:

Example 1 of Location Based Services: An item in a retail store, in which the purpose of the user's photo taking could be to check for special offers or coupons to which he/she is entitled. The user could take the photo of a sign near a display at the window or in the store, thereby indicating his/her interest in the specific offer. This allows accuracy in gauging the user's intentions, an accuracy that standard LBS systems cannot provide.

Example 2 of Location Based Services: A request for information or offers based on a promotional sign, such as the accessing of promotional material for a new musical near the ticket office. Again, the fact that the user has initiated the process, coupled with the exact knowledge of his interest, provide a fertile background for active advertising and special offers to be sent to the user via his cellular device.

Application 6 of the Exemplary Embodiments of the Present Invention: Marketing promotion campaigns. With the suggested technology, it is easy to print some form of electronic coupons in the shape of icons. Once these icons are sent to the server in some sequence, the user will be provided with some form of information or financial compensation (such as discounts, ringtones, coupons, etc.). One possible use of such application is booking of tickets for cinema, the theater, or restaurants.

Application 7 of the Exemplary Embodiments of the Present Invention: Rating the media. By monitoring access to the electronic coupons, it is relatively easy to provide information regarding numbers, reading habits, demographics, ratings, etc., of users with camera-enabled devices. This information is very important for the media owners, since it helps to determine the commercial strategy of the media.

Application 8 of the Exemplary Embodiments of the Present Invention: Shopping based on a catalog or shopping in a store, where the user takes photos of the items to be purchased, or of pictures of these items in a catalog, or of printed tags attached to the items to be purchased or printed on the items themselves (much like present day barcodes).

Application 9 of the Exemplary Embodiments of the Present Invention: Electronic tokens. Once the icon is available on one electronic device with display, it is possible to take its image via a camera-enabled device. Due to image recognition capabilities and knowledge of the source and recipient information, it is easy to pass this way electronic tokens and vouchers. It is possible, for example, to pass between users the right to download ringtones or other information. In essence, this application enables and facilitates the creation of data exchange and peer-to-peer salesmanship.

Application 10 of the Exemplary Embodiments of the Present Invention: On line voting, where the user's location near a screen showing content, potentially coupled with the identity of the user and with other information on the screen such as a serial number of the item/person to be voted for, the time, etc., are used to indicate the user's wish to "vote" for the displayed person/item. This will make voting faster and easier for some people.

Application 11 of the Exemplary Embodiments of the Present Invention: Interplay between free/public info and paid/non-public information. Since the user can select a piece of displayed/printed information, this information can serve as the access point to more information, which may be public, paid, and/or privileged information. Some examples are:

Example 1 of Interplay of Public and Non-Public Information: A user sees a picture of an attractive person in a magazine. By pointing the camera phone or 3G videophone at the image (which for present purposes could be considered a logo/icon/picture), the user will access images of the attractive person in other clothing, with no clothing (which might be considered either artistic or erotic), in video clips, with a picture and biography, or with other information about the person of interest.

Example 2 of Interplay of Public and Non-Public Information: By taking the picture of a printed puzzle, or of part of a sentence, or of a question, the user will gain access to the solution, end of the sentence, or answer, respectively.

Example 3 of Interplay of Public and Non-Public Information: By taking the image of a printed/displayed word/logo/photo, the user will receive a translation of that word/object into the user's default language of choice. Or of course the user may specify a different target language to which the translation will be made.

Figure 39:
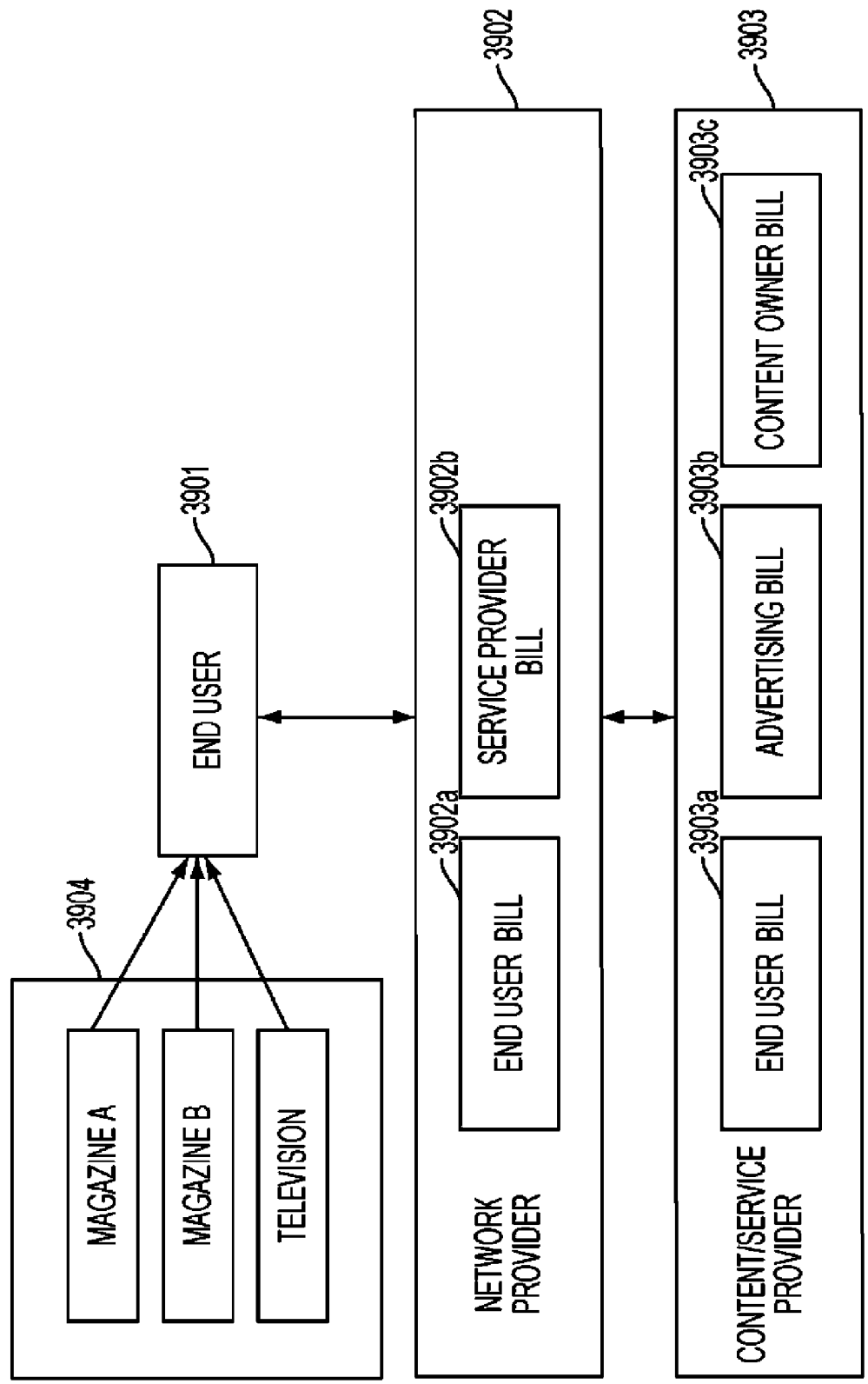
FIG. 39 illustrates a method by which a bill will be generated and sent to the user according to an exemplary embodiment of the present invention.

FIG. 39 illustrates some of the business model aspects of the exemplary embodiments of the present invention. Illustrated is a process of content recognition and retrieval that provides value to several entities in the value chain:

The End User 3901: The end user, who performs the imaging and receives the content, is obviously using a service. The user may be billed for any combination of service and content received. Billing can be based on the "call time" (in case of a video call), or on the actual sending of a picture message to be recognized (e.g., a Premium MMS message), or a fixed service fee per time, or by some combination of these methods. On the other hand, some services may be provided free to the end user (such as, for example, the viewing of a trailer to a movie or an advertisement) and in some cases the user may even get benefits or cash for using the service (e.g., when scanning a lottery card or a bonus coupon).

The Network Provider 3902: The network provider (typically the carrier) receives income in the form of telecommunication charges borne by the user for the service 3902a. The network provider may also receive a fee 3902b from the content provider for the billing services it provides to the content provider. Alternatively, the network provider may subsidize certain services for the end user and/or the content provider. (For example, the network provider may share with the content provider the revenues from video calls made by the end users).

The Content/Service Provider 3903: The content/service provider may charge the end user for the content/service 3903a. In other cases, such as with promotional content for example, the content/service provider may alternatively subsidize the telecommunication charges for the end-user. or give the end user other bonuses or money. The content/service provider may also use the visual information that the end user provides as part of the service to determine specifically which information has generated the user's request, and use this information for accounting purposes or for general measurements of the effectiveness of advertising. For example, a certain graphic design depicting a new product might be printed on billboards, in newspapers, in magazines, on websites, and in television ads. The content/service provider can analyze the images and videos taken from the end users' interaction with the service to determine how effective the relative different media 3904 are in generating traffic. This information about the effectiveness of the various advertising media can also be used to affect the payment to the different advertising channels 3903b. Furthermore, the owner or creator of the content may receive payment 3903c which is related to both the type of content consumed and/or the location or media type which generated the end users' interest. For example, the rights' owner of a specific music video clip may receive a certain fee when users requested this clips as a result of seeing it on the web, and a different fee when the users requested this clip as a result of seeing the cover of the CD in a store. Thus, a business model which is similar in concept to the banner "click-thru" model widely used in the Internet advertising industry, is for the first time enabled by the exemplary embodiments of the present invention for Banners which are printed or displayed in other media.

Figure 40:
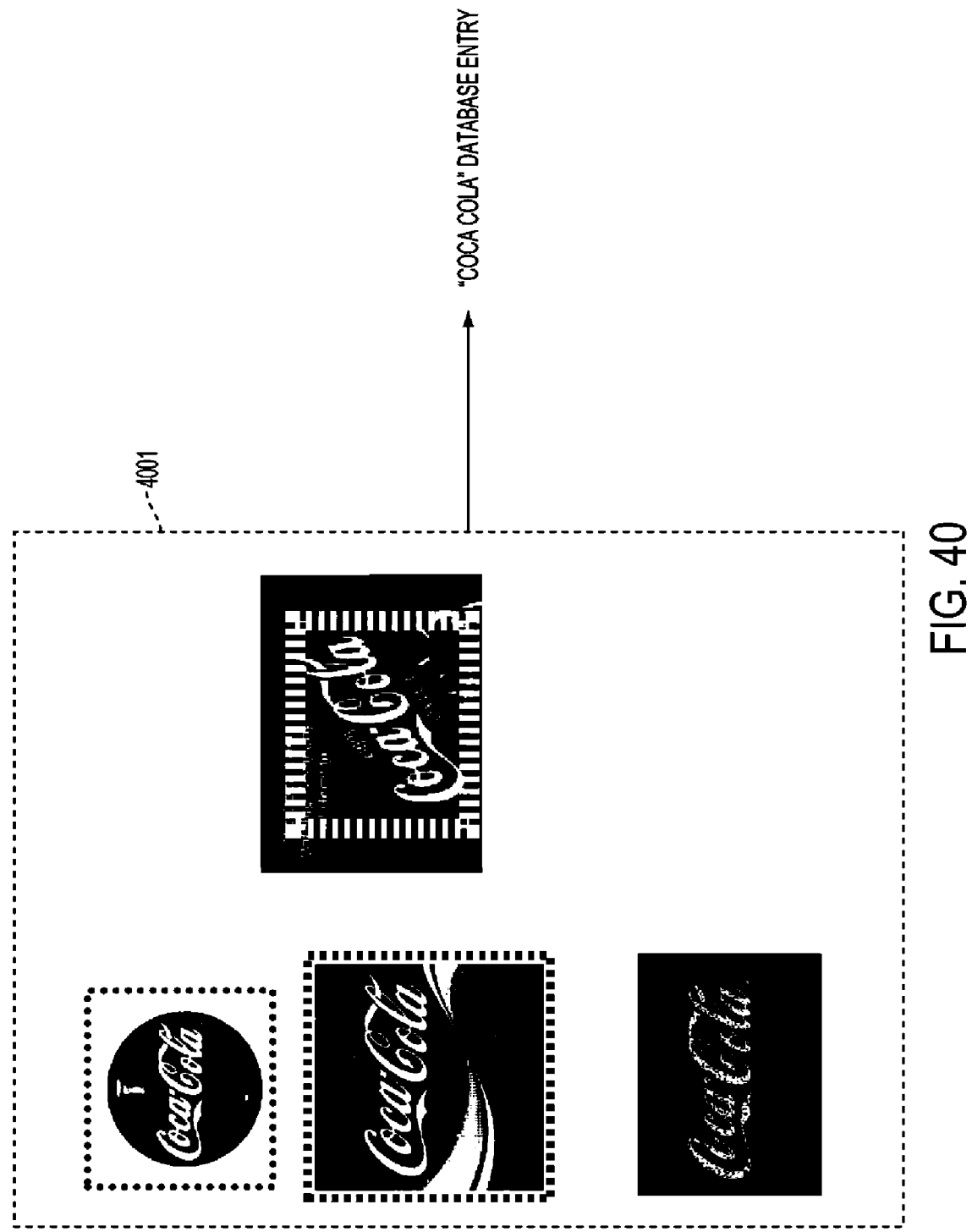
FIG. 40 illustrates how different banners can be used to link to a single service/content according to an exemplary embodiment of the present invention.

FIG. 40 illustrates how different banners can be used to link to a single service/content. In many cases, different graphic designs apply to a single brand, or denote a single product or service. Since the comparison algorithms described in the exemplary embodiments of the present invention do not provide "image understanding" like that of humans, they need to work based on precise entries in the banner database which cover all those different graphic designs. Alternatively, if all of the designs employ a particular feature that is unique to that brand, such as, in 4001, the particular writing of the phrase "Coca-Cola", the banner database may be keyed to that feature in order to identify the brand selected. However, in order to identify the specific advertisement which attracted the user and which caused the user to request the product or service, identification will be required not just of the common handwriting "Coca-Cola", but also of the details in the entire advertisement, and in that case the banner database must include all of the different graphic designs.

What is claimed is:

1. A method to use part of a printed or displayed medium for identifying a reference and using the reference to access at least one of information, services, and content related to the reference, the method comprising:

capturing an image of the reference with an imaging device;

sending the image via a communications network to a processing center;

pre-processing by the processing center to identify at least one relevant frame within the image and to perform general purpose enhancement operations;

detecting most relevant frame within the image and frame properties comprising at least one of pixels, axis ratio, and illumination characteristics;

applying geometric, illumination, and focus correction on the most relevant frame;

using color, aspect ration, and frame color, to perform a coarse recognition and thereby limit a number of possible identifications of the reference within the most relevant frame; and using rescaling, histogram equalization, block labeling, edge operation, and normalized cross correlation, to identify the reference within the image.

2. The method of claim 1, wherein:

the identified reference is correlated with stored information related to the reference; and said stored information is sent via the communication network to a user of the imaging device.

3. The method of claim 2, wherein:

the reference is one of a plurality of banners and logos associated with the stored information;

the stored information is accessed via any of the plurality of banners and logos; and the stored information is sent to the user via the communication network.

4. The method of claim 2, wherein:

relative sizes of various data within the image are used to identify the reference.

5. The method of claim 1, wherein:

the identified reference is a banner; and the stored information is sent to the user via the communication network.

6. The method of claim 5, wherein:

the identified reference is an electronic banner.

7. The method of claim 5, wherein:

the identified reference is a printed banner.

8. The method of claim 1, wherein:

the reference within the image is at least one of: a logo, a portrait or drawing of a person, a portrait or drawing of scenery, an advertising slogan, a graphical symbol, alphanumeric code, a customer designed frame, a representation of at least one texture.

9. The method of claim 8, wherein:

said at least one template is used to identify the reference within the image.

10. The method of claim 1 wherein:

if the at least one relevant frame containing the reference is not identified using automated techniques, then a message is sent to a user of the imaging device, asking the user to identify the at least one relevant frame within the image; and the user selects the at least one relevant frame within the image, and communicates the selection, using the communication network, to the processing center.

11. The method of claim 1 wherein:

if the reference within the most relevant frame is not identified using automated techniques, then a message is sent to a user of the imaging device, asking the user to identify the reference within the most relevant frame within the image; and the user selects the reference within the most relevant frame of the image, and communicates the selection, using the communication network, to the processing center.

12. The method of claim 1, wherein:
knowledge of a type of specific imaging device is used to detect the most relevant frame.

13. The method of claim 12, wherein:
the type of specific imaging device is identified by type of communication protocol used by the imaging device.

14. The method of claim 12, wherein:
the type of specific imaging device is identified by a specific identification number associated with the imaging device that is communicated to the processing center.

15. The method of claim 1, wherein:
knowledge of a type of specific imaging device is used to detect the reference.

16. The method of claim 15, wherein:
the type of specific imaging device is identified by type of communication protocol used by the imaging device.

17. The method of claim 15, wherein:
the type of specific imaging device is identified by a specific identification number associated with the imaging device that is communicated to the processing center.

18. The method of claim 1, wherein:
the reference is identified with an aid of at least one of normalized cross-correlation, multiple normalized cross-correlation, multiple color band analysis, aspect ratio analysis, image histograms, analysis of text density distribution, and analysis of control points.

19. The method of claim 1, which is further used to determine effectiveness of an advertising medium, the method further comprising:
a service provider captures and records information about images taken by a user of the imaging device:
the service provider analyzes said information to determine whether and when the user has reacted to images in at least one of billboards, newspapers, magazines, Web sites, television ads, and other communication media; and
the service provider sends said information to at least one provider of the images.

20. The method of claim 1, wherein the at least one relevant frame is not a generated bounding space.

21. A computer program product, comprising instructions for causing a computer to perform a method comprising:
capturing an image of a reference with an imaging device;
sending the image via a communications network to a processing center;
pre-processing by the processing center to identify at least one relevant frame within the image and to perform general purpose enhancement operations;
detecting most relevant frame within the image, and frame properties comprising at least one of pixels, axis ratio, and illumination characteristics;
applying geometric, illumination, and focus correction on the most relevant frame;
using color, aspect ratio, and frame color, to perform a coarse recognition and thereby limit a number of possible identifications of the reference within the most relevant frame; and
using specific techniques of rescaling, histogram equalization, block labeling, edge operation, and normalized cross correlation, to identify the reference within the image.

* * * * *